United States Patent
Li et al.

(10) Patent No.: US 11,847,992 B2
(45) Date of Patent: Dec. 19, 2023

(54) CONTROL METHOD BASED ON VERTICAL SYNCHRONIZATION SIGNAL AND ELECTRONIC DEVICE

(71) Applicant: Huawei Device Co., Ltd., Guangdong (CN)

(72) Inventors: Yu Li, Shanghai (CN); Liang Wang, Shanghai (CN); Jian Chen, Shanghai (CN); Xin Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 49 days.

(21) Appl. No.: 17/622,165

(22) PCT Filed: Jun. 23, 2020

(86) PCT No.: PCT/CN2020/097565
§ 371 (c)(1),
(2) Date: Dec. 22, 2021

(87) PCT Pub. No.: WO2020/259457
PCT Pub. Date: Dec. 30, 2020

(65) Prior Publication Data
US 2022/0415282 A1 Dec. 29, 2022

(30) Foreign Application Priority Data

Jun. 25, 2019 (CN) .......................... 201910557287.0
Sep. 19, 2019 (CN) .......................... 201910889445.2

(51) Int. Cl.
*G09G 5/00* (2006.01)
*G06F 3/041* (2006.01)
*H04N 5/08* (2006.01)

(52) U.S. Cl.
CPC ......... *G09G 5/006* (2013.01); *G06F 3/04186* (2019.05); *H04N 5/08* (2013.01)

(58) Field of Classification Search
CPC ....... G09G 5/006; G06F 3/04186; H04N 5/08
See application file for complete search history.

(56) References Cited

U.S. PATENT DOCUMENTS

2013/0139115 A1  5/2013  Thiruvillamalai et al.
2013/0271420 A1  10/2013  Chen et al.
(Continued)

FOREIGN PATENT DOCUMENTS

CN  101635844 A  1/2010
CN  101742350 A  6/2010
(Continued)

*Primary Examiner* — Afroza Chowdhury
(74) *Attorney, Agent, or Firm* — Huawei Technologies Co., Ltd.

(57) ABSTRACT

Embodiments of this application provide a control method based on a vertical synchronization signal and an electronic device, to shorten a response delay of the electronic device and improve fluency of the electronic device without increasing load of the electronic device. The method may include: drawing, by an electronic device including a display screen, one or more layers in response to a first vertical synchronization signal; refreshing and displaying an image frame in response to a second vertical synchronization signal; adjusting the first vertical synchronization signal, so that the adjusted first vertical synchronization signal is delayed by first delay time relative to the second vertical synchronization signal; and drawing one or more layers in response to the adjusted first vertical synchronization signal.

13 Claims, 37 Drawing Sheets

(56) References Cited

U.S. PATENT DOCUMENTS

| | | | |
|---|---|---|---|
| 2016/0216839 A1 | 7/2016 | Park et al. | |
| 2016/0372081 A1* | 12/2016 | Mihara | G06F 3/1446 |
| 2017/0163898 A1* | 6/2017 | Shiohara | H04N 5/06 |
| 2018/0261145 A1* | 9/2018 | Peng | G06F 1/3203 |

FOREIGN PATENT DOCUMENTS

| | | |
|---|---|---|
| CN | 101968728 A | 2/2011 |
| CN | 103593155 A | 2/2014 |
| CN | 105677107 A | 6/2016 |
| CN | 105913371 A | 8/2016 |
| CN | 106462275 A | 2/2017 |
| CN | 106843859 A | 6/2017 |
| CN | 107077252 A | 8/2017 |
| CN | 107220019 A | 9/2017 |
| CN | 107995974 A | 5/2018 |
| CN | 109474768 A | 3/2019 |
| CN | 110609645 A | 12/2019 |
| CN | 104903832 B | 9/2020 |
| EP | 2620843 A1 | 7/2013 |
| EP | 3056983 A1 | 8/2016 |
| JP | 2014032396 A | 2/2014 |
| WO | 2017152355 A1 | 9/2017 |

\* cited by examiner

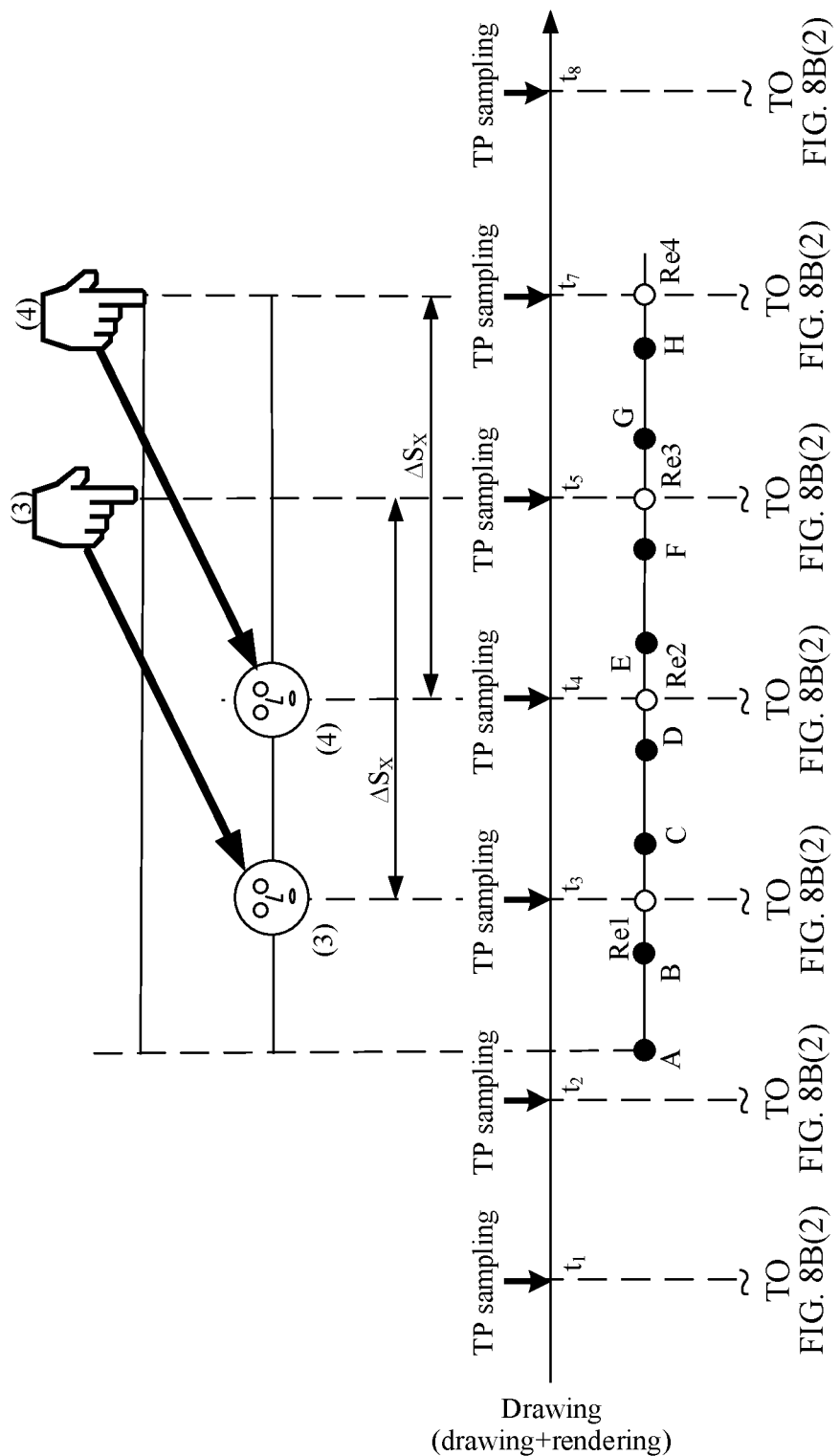

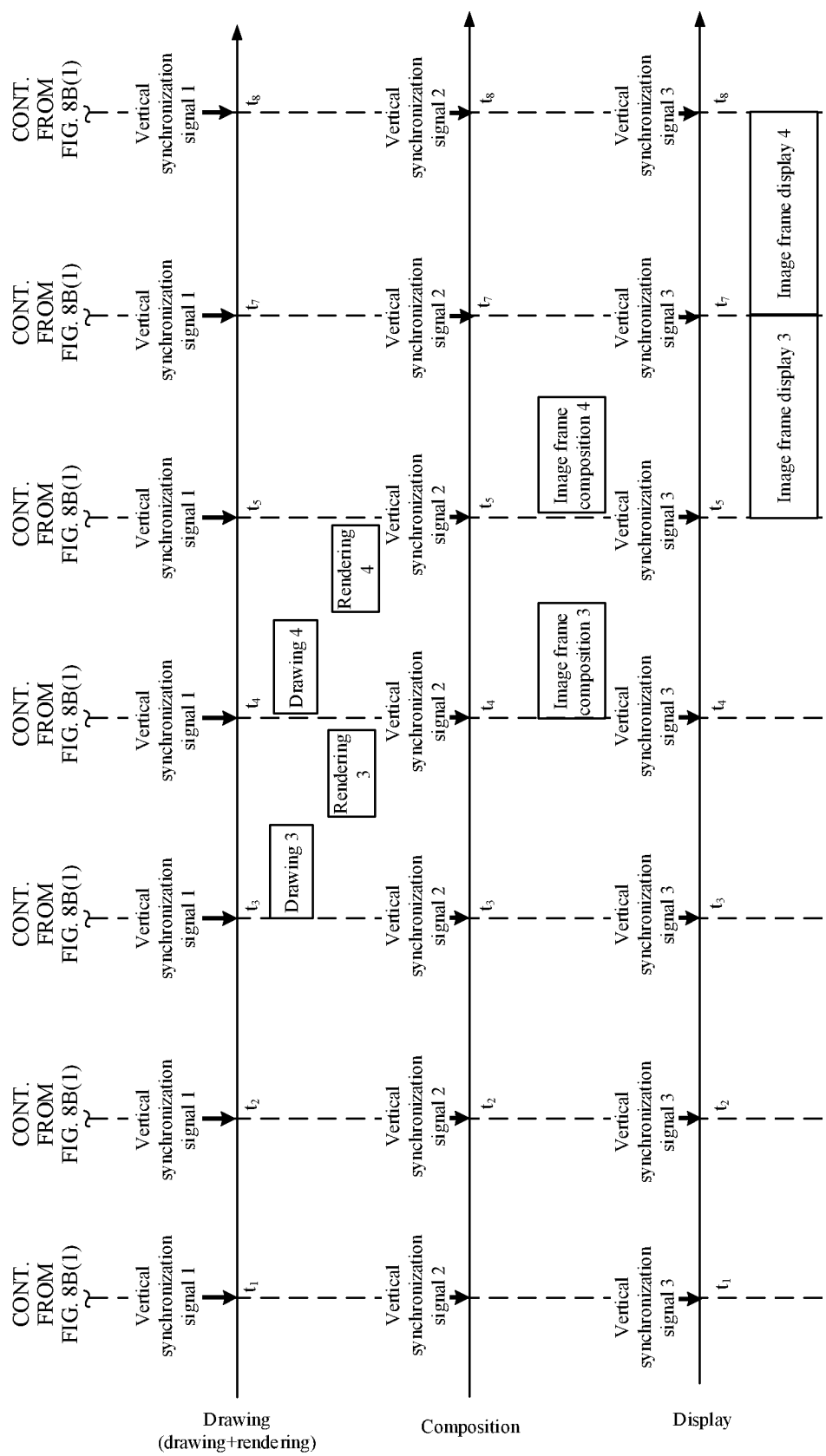
FIG. 8B(2)

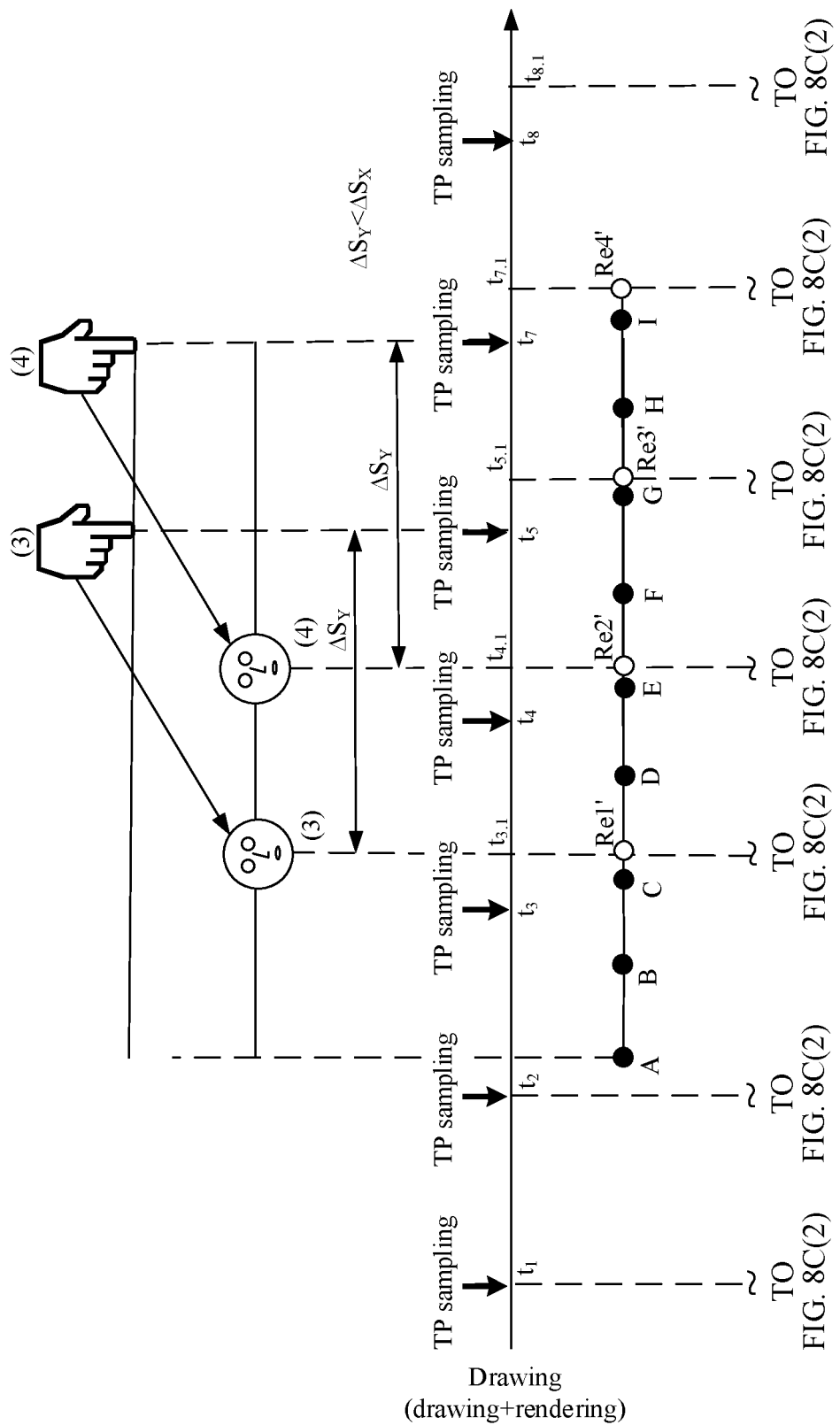
FIG. 8C(1)

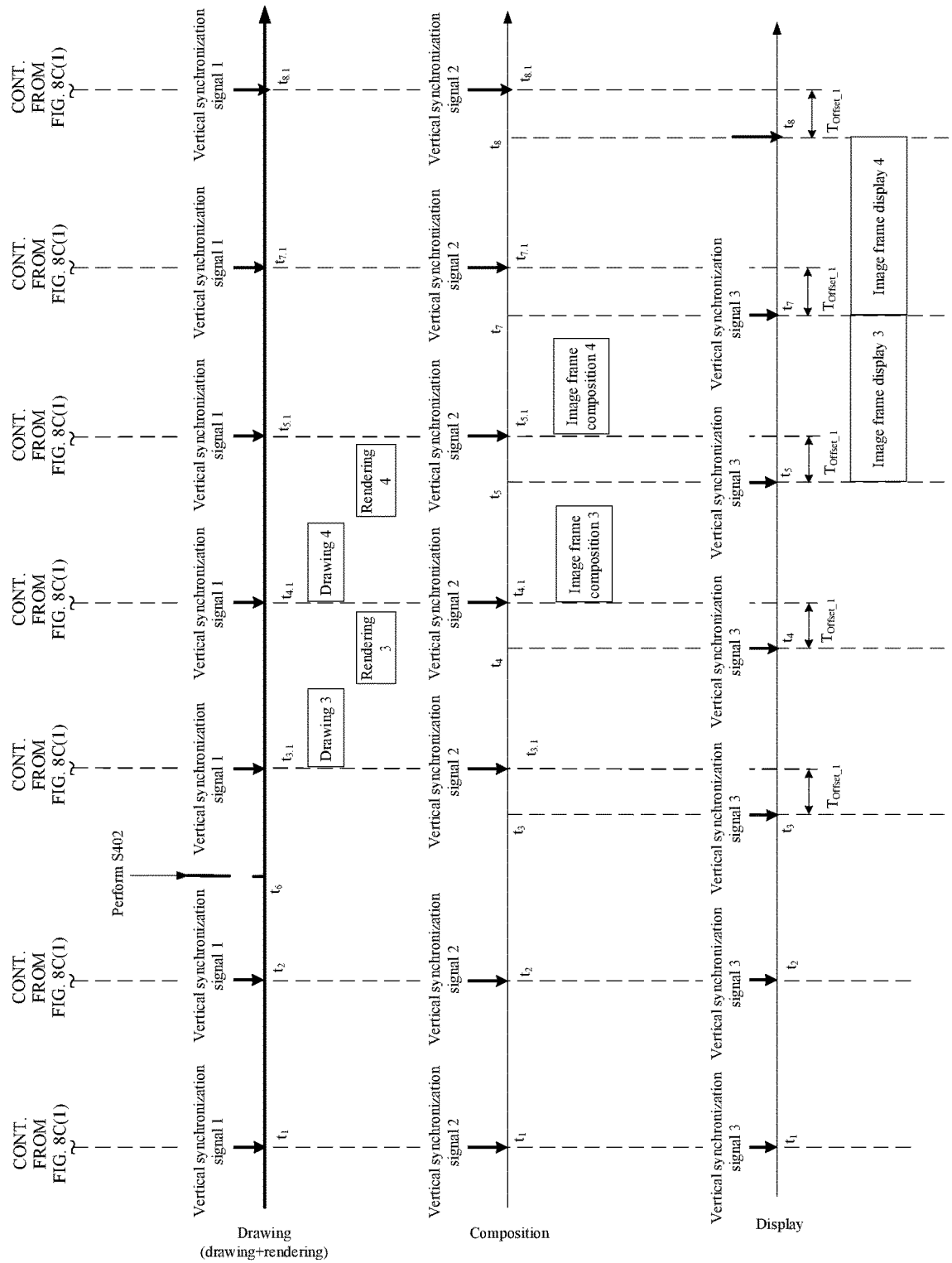
FIG. 8C(2)

US 11,847,992 B2

CONTROL METHOD BASED ON VERTICAL SYNCHRONIZATION SIGNAL AND ELECTRONIC DEVICE

CROSS-REFERENCE TO RELATED APPLICATIONS

This application is a National Stage of International Application No. PCT/CN2020/097565, filed on Jun. 23, 2020, which claims priority to Chinese Patent Application No. 201910557287.0, filed on Jun. 25, 2019, and Chinese Patent Application No. 201910889445.2, filed on Sep. 19, 2019. All of the aforementioned applications are hereby incorporated by reference in their entireties.

TECHNICAL FIELD

Embodiments of this application relate to the field of image processing and display technologies, and in particular, to a control method based on a vertical synchronization signal and an electronic device.

BACKGROUND

With development of electronic technologies, performance of various electronic products (for example, mobile phones) is increasingly better. Consumers also have an increasingly high requirement on human-computer interaction performance of the electronic products. Fluency is a type of important human-computer interaction performance.

Fluency may be represented by a length of a delay from "a user inputs a user operation to an electronic product" to "the electronic product displays an image corresponding to the user operation". For example, the user operation may be an operation that is input by the user by using a mouse, a key, or the like. Alternatively, the user operation may be a touch operation performed by the user on a touchscreen. The foregoing delay time may be referred to as a response delay of the electronic device. For example, when the user operation is a touch operation, the delay time may be referred to as a touch response delay. Longer delay time indicates poorer fluency, and shorter delay time indicates better fluency. Therefore, how to shorten the delay time and improve the fluency of the electronic product is a problem to be resolved urgently.

Currently, in some solutions, the response delay is shortened by improving a working frequency (for example, a clock speed) of a processor of the mobile phone. It may be understood that a higher working frequency of the processor indicates a higher calculation speed of the processor. In this case, the mobile phone may respond to the touch operation of the user in relatively short time. In this way, the response delay can be shortened, and the fluency of the mobile phone can be improved.

Although the response delay can be shortened by improving the working frequency of the processor, a higher working frequency of the processor indicates larger power consumption. As a result, if the response delay is shortened by using the foregoing solution, the power consumption of the mobile phone may be increased, and load of the mobile phone may be increased.

SUMMARY

Embodiments of this application provide a control method based on a vertical synchronization signal and an electronic device, to shorten a response delay of the electronic device and improve fluency of the electronic device without increasing load of the electronic device.

To achieve the foregoing objective, the following technical solutions are used in this application.

According to a first aspect, this application provides a control method based on a vertical synchronization signal, applied to an electronic device including a display screen. The method may include: The electronic device draws one or more layers in response to a first vertical synchronization signal; refreshes and displays an image frame in response to a second vertical synchronization signal, where the first vertical synchronization signal is on a same frequency as the vertical synchronization signal; adjusts the first vertical synchronization signal, so that the adjusted first vertical synchronization signal is delayed by first delay time relative to the second vertical synchronization signal; and draws one or more layers in response to the adjusted first vertical synchronization signal.

In the method in this application, the first vertical synchronization signal may be adjusted, so that the adjusted first vertical synchronization signal is delayed by the first delay time relative to the second vertical synchronization signal. In this way, after completing image frame composition, the electronic device can promptly perform image frame refresh to display an image frame. In the method, a response delay of the electronic device can be shortened and fluency of the electronic device can be improved without increasing load of the electronic device.

With reference to the first aspect, in a possible design manner, the first delay time is less than a signal period of the second vertical synchronization signal. The signal period of the second vertical synchronization signal and a signal period of the first vertical synchronization signal each are referred to as a synchronization period. The synchronization period is equal to a reciprocal of a screen refresh rate of the electronic device.

With reference to the first aspect, in another possible design manner, the method may further include: The electronic device performs layer composition on one or more drawn layers in response to a third vertical synchronization signal, to obtain an image frame; adjusts the third vertical synchronization signal, so that the adjusted third vertical synchronization signal is delayed by second delay time relative to the second vertical synchronization signal; and performs layer composition on one or more drawn layers in response to the adjusted third vertical synchronization signal, to obtain an image frame. The third vertical synchronization signal is on a same frequency as the second vertical synchronization signal.

With reference to the first aspect, in another possible design manner, in response to the adjusted first vertical synchronization signal, the electronic device may perform interpolation calculation based on a touch point closest to an arrival moment of the adjusted first vertical synchronization signal, to obtain a resample point. The electronic device draws the one or more layers for the resample point.

With reference to the first aspect, in another possible design manner, when detecting a user operation or detecting that a user interface (user interface, UI) event occurs in the electronic device, the electronic device may draw the one or more layers in response to the first vertical synchronization signal. The user operation may be used to trigger the electronic device to update an interface.

With reference to the first aspect, in another possible design manner, the second delay time may be equal to the first delay time.

With reference to the first aspect, in another possible design manner, the first delay time is preset duration. In other words, the first delay time is fixed duration that is set on the electronic device.

With reference to the first aspect, in another possible design manner, the electronic device may determine a third surface flinger (surface flinger, SF) frame length in a statistical period based on a plurality of first SF frame lengths in the statistical period. Then, the electronic device may adjust the first vertical synchronization signal when the third SF frame length is less than a preset frame length threshold. The third SF frame length is an average value of the plurality of first SF frame lengths or a maximum value in the plurality of first SF frame lengths.

With reference to the first aspect, in another possible design manner, the electronic device may adjust the first vertical synchronization signal when a plurality of first SF frame lengths in a statistical period fluctuate greatly. Specifically, the electronic device may calculate an expected value of the plurality of first SF frame lengths in the statistical period, and calculate a weighted standard deviation of the plurality of first SF frame lengths. The weighted standard deviation of the plurality of first SF frame lengths is used to represent fluctuation of the plurality of first SF frame lengths. Then, the electronic device may calculate a standard deviation threshold of the plurality of first SF frame lengths based on the signal period of the second vertical synchronization signal, a preset delay gain value, and the expected value. Finally, the electronic device may adjust the first vertical synchronization signal when the weighted standard deviation of the plurality of first SF frame lengths is less than the standard deviation threshold. If the weighted standard deviation of the plurality of first SF frame lengths is less than the standard deviation threshold, it indicates that the plurality of first SF frame lengths fluctuate greatly.

With reference to the first aspect, in another possible design manner, the electronic device may determine the first delay time based on a foreground application. Specifically, the first delay time may be preset delay time corresponding to the foreground application. The foreground application is an application corresponding to an interface currently displayed on the electronic device.

It may be understood that a plurality of applications may be installed on the electronic device. Each application may correspond to one or more pieces of preset delay time. When the electronic device runs different applications in foreground, time (namely, an SF frame length) required for performing layer composition is different. Therefore, fixed preset delay time may be set for each application. A larger SF frame length required when the electronic device runs an application in foreground indicates shorter preset delay time corresponding to the application. A smaller SF frame length required when the electronic device runs an application in foreground indicates longer preset delay time corresponding to the application. The foreground application is a user-level application.

With reference to the first aspect, in another possible design manner, processors of different electronic devices have different capabilities, for example, a maximum working frequency of a processor of an electronic device is 800 megahertz (MHz), and a maximum working frequency of a processor of another electronic device is 600 MHz. Therefore, preset delay time corresponding to a same application on different electronic devices may also be different.

In this application, considering that SF frame lengths required when the electronic device runs different applications in foreground are different, different preset delay time may be set for different applications. In this way, when running different applications in foreground, the electronic device can adjust a vertical synchronization signal by using different preset delay time. This can improve user experience.

With reference to the first aspect, in another possible design manner, the foregoing one or more layers may include a layer drawn by the electronic device by executing a drawing task corresponding to one or more applications. The one or more applications may include at least one of one or more system-level applications and one or more user-level applications. The system-level application is an application that cannot be offloaded and that is installed on the electronic device at delivery of the electronic device. For example, the system-level application may include an application such as a status bar, a launcher, a navigation bar, a wallpaper, "settings", "phone", and "messages". The user-level application may be an application that can be offloaded and that is installed on the electronic device. The user-level application may include an application that can be offloaded and that is installed on the electronic device at delivery of the electronic device, and a third-party application that is on the electronic device and that can be downloaded from an application store in response to a user operation. For example, the third-party application may include an application such as "WeChat", "Alipay", and "Baidu Map".

With reference to the first aspect, in another possible design manner, the electronic device may collect statistics about time consumed by the electronic device for performing a plurality of times of layer composition, to dynamically adjust the first delay time. Specifically, the method in this application may further include: obtaining a plurality of first surface flinger (SF) frame lengths in a statistical period, where each first SF frame length is time consumed for performing one time of layer composition, and time consumed for performing all times of layer composition is the same or different; and determining the first delay time based on the plurality of first SF frame lengths.

It may be understood that the first delay time determined based on the plurality of first SF frame lengths in the statistical period is used to adjust the first vertical synchronization signal and the third vertical synchronization signal in a next statistical period of the statistical period.

The electronic device dynamically adjusts the first delay time based on a plurality of SF frame lengths in a statistical period, so that the response delay of the electronic device can be shortened when it is ensured that the display screen of the electronic device normally displays a picture.

With reference to the first aspect, in another possible design manner, the method for determining the first delay time based on the plurality of first SF frame lengths may include: determining a predicted SF frame length based on the plurality of first SF frame lengths, where the predicted SF frame length is predicted time required for performing layer composition next time; and calculating a difference between the synchronization period and the predicted SF frame length, to obtain the first delay time.

With reference to the first aspect, in another possible design manner, if the predicted SF frame length is relatively small, the first delay time obtained by calculating the difference between the synchronization period and the predicted SF frame length is relatively large. As a result, an image frame is easily lost. To reduce a frame loss possibility of the image frame, the predicted SF frame length may be a maximum first SF frame length in a corresponding statistical period.

With reference to the first aspect, in another possible design manner, the electronic device may calculate a delay gain value existing in a statistical period after the first vertical synchronization signal is adjusted by using each piece of delay time in a preset time set, and then determine delay time corresponding to a maximum delay gain value as the first delay time. In this way, the response delay of the electronic device can be shortened to a maximum degree. Specifically, the determining the first delay time based on the synchronization period and the plurality of first SF frame lengths includes: obtaining a delay gain value existing in the statistical period after the first vertical synchronization signal is adjusted based on each piece of delay time in a preset time set; and determining, as the first delay time, delay time that corresponds to a maximum delay gain value and that is in the preset time set. The preset time set includes a plurality of pieces of delay time.

For example, the preset time set includes a plurality of pieces of delay time with a value range of $[T_{Offset\_D}, T_Z)$. $T_Z$ is the synchronization period. $T_{Offset\_D}$ is current delay time, and the current delay time is delay time of the first vertical synchronization signal currently relative to the second vertical synchronization signal in a synchronization period.

A delay gain value corresponding to a piece of delay time is a product of the delay time and a frame lossless ratio corresponding to the delay time. A sum of the frame lossless ratio and a frame loss ratio that correspond to the delay time is 1.

For example, in this application, a delay gain value f (offset) corresponding to a piece of delay time (offset) may be calculated by using the following formula (1): $f(offset)=(offset)*(1-P_{offset})$. $P_{offset}$ is a frame loss ratio corresponding to the delay time (offset), and $1-P_{offset}$ is frame lossless ratio corresponding to the delay time (offset).

The frame loss ratio corresponding to the delay time is a ratio that is of a quantity of frame loss times of an image frame to a total quantity of times in the statistical period and that exists after the first vertical synchronization signal is adjusted based on the delay time. The frame loss ratio corresponding to the delay time is obtained based on the delay time, the plurality of first SF frame lengths, and the synchronization period.

In a preset time set, a delay gain value gradually increases as delay time increases. When the delay gain value increases to a specified value, the delay gain value gradually decreases as the delay time increases. In this embodiment of this application, the electronic device starts to gradually increase delay time from minimum delay time in the preset time set by using a preset stride, to find delay time corresponding to a maximum delay gain value, and use the delay time as an optimal value (namely, the first delay time) to adjust the first vertical synchronization signal. In this way, the response delay of the electronic device can be shortened to a maximum degree, and the fluency of the electronic device can be improved.

With reference to the first aspect, in another possible design manner, to reduce a frame loss ratio and ensure a specified frame lossless ratio, the first delay time may be delay time that corresponds to a maximum delay gain value and that is in delay time, in the preset time set, corresponding to a frame loss ratio less than a preset threshold.

With reference to the first aspect, in another possible design manner, to prevent a ping-pong phenomenon of delay time adjustment from occurring when the first vertical synchronization signal is adjusted after each statistical period ends, the electronic device may determine the first delay time based on delay time that corresponds to each statistical period in N consecutive statistical periods, that is in a preset time set, and that corresponds to a maximum delay gain value. Specifically, the determining the first delay time based on the synchronization period and the plurality of first SF frame lengths may include: performing step 1 and step 2 in each statistical period in N consecutive statistical periods, to obtain third delay time corresponding to each statistical period, where N≥2, and N is a positive integer; and determining shortest third delay time in the third delay time corresponding to the N statistical periods as the first delay time. The next statistical period is a next statistical period of the N statistical periods.

Step 1: Obtain a delay gain value existing in a statistical period after the first vertical synchronization signal is adjusted based on each piece of delay time in the preset time set. Step 2: Obtain third delay time corresponding to the statistical period, where the third delay time is delay time that corresponds to a maximum delay gain value and that is in the preset time set.

It should be noted that for detailed descriptions of the preset time set in step 1, a delay gain value corresponding to a piece of delay time, and a frame lossless ratio and a frame loss ratio that correspond to the delay time, refer to related content in the foregoing possible design manners. Details are not described again in this embodiment of this application.

With reference to the first aspect, in another possible design manner, to reduce a frame loss ratio and ensure a specified frame lossless ratio, the third delay time is delay time that corresponds to a maximum delay gain value and that is in delay time, in the preset time set, corresponding to a frame loss ratio less than a preset threshold.

With reference to the first aspect, in another possible design manner, the determining shortest third delay time in the third delay time corresponding to the N statistical periods as the first delay time may include: if the third delay time corresponding to the N statistical periods is all greater than current delay time, determining the shortest third delay time in the third delay time corresponding to the N statistical periods as the first delay time. In this way, a frame loss possibility of an image frame can be reduced. Therefore, the response delay of the electronic device can be shortened to a maximum degree and the fluency of the electronic device can be improved when it is ensured that the LCD of the electronic device normally displays a picture.

With reference to the first aspect, in another possible design manner, if the third delay time corresponding to the N statistical periods is all less than current delay time, longest third delay time in the third delay time corresponding to the N statistical periods is determined as the first delay time. In this way, the response delay of the electronic device can be shortened and the fluency of the electronic device can be improved when it is ensured that the electronic device normally displays a picture.

With reference to the first aspect, in another possible design manner, SF frame lengths in some statistical periods may fluctuate greatly. Therefore, a change amplitude of first delay time in the statistical period may be greater than a change amplitude of first delay time in another statistical period. To ensure stability of an amplitude of the first delay time used when the electronic device adjusts the first vertical synchronization signal, the electronic device determines the first delay time based on a related parameter in a statistical period only when changes of a plurality of SF frame lengths (namely, first SF frame lengths) in the statistical period are relatively stable.

Specifically, before the obtaining a delay gain value existing in a statistical period after the first vertical synchronization signal is adjusted based on each piece of delay time in the preset time set, the method in this application may further include: calculating an expected value of the plurality of first SF frame lengths, calculating a weighted standard deviation of the plurality of first SF frame lengths, and calculating a standard deviation threshold of the plurality of first SF frame lengths based on the synchronization period, a preset delay gain value, and the expected value. If the weighted standard deviation is less than the standard deviation threshold, it indicates that SF frame lengths in a corresponding statistical period fluctuate slightly, and the first vertical synchronization signal may be adjusted based on a related parameter in the statistical period. Specifically, if the weighted standard deviation is less than the standard deviation threshold, a delay gain value existing in the statistical period after the first vertical synchronization signal is adjusted based on each piece of delay time in the preset time set may be obtained.

With reference to the first aspect, in another possible design manner, if the weighted standard deviation is greater than or equal to the standard deviation threshold, it indicates that SF frame lengths in a corresponding statistical period fluctuate greatly, and an exception protection mechanism may be started to adjust the first vertical synchronization signal, so that the first vertical synchronization signal is not delayed relative to the second vertical synchronization signal.

With reference to the first aspect, in another possible design manner, the weighted standard deviation of the plurality of first SF frame lengths in the statistical period may be calculated in the following manner: calculating a standard deviation σ of the plurality of first SF frame lengths in the statistical period, and calculating the weighted standard deviation $\sigma_{JQ}$ based on the standard deviation σ, a standard deviation $\sigma_S$ in a previous statistical period of the statistical period, and a preset weighted value a by using the following formula (3):

$$\sigma_{JQ}=a*\sigma+(1-a)*\sigma_S \quad \text{formula (3)}$$

With reference to the first aspect, in another possible design manner, the standard deviation threshold of the plurality of first SF frame lengths may be calculated in the following manner: calculating the standard deviation threshold $\sigma_M$ of the plurality of first SF frame lengths based on the synchronization period $T_Z$, the preset delay gain value S, and the expected value μ by using the following formula (4):

$$\sigma_M=(T_Z-S-\mu)/3 \quad \text{formula (4)}$$

With reference to the first aspect, in another possible design manner, the adjusting the first vertical synchronization signal, so that the adjusted first vertical synchronization signal is delayed by first delay time relative to the second vertical synchronization signal may include: if a predicted SF frame length is less than a second SF frame length in a next statistical period, adjusting the first vertical synchronization signal, so that the first vertical synchronization signal is delayed by the first delay time relative to the second vertical synchronization signal. The predicted SF frame length is a difference between the synchronization period and the first delay time. The second SF frame length is time required for performing layer composition most recently in the next statistical period.

With reference to the first aspect, in another possible design manner, after the adjusting the first vertical synchronization signal, so that the first vertical synchronization signal is not delayed relative to the second vertical synchronization signal, the method in this application may further include: The electronic device does not adjust the first vertical synchronization signal within preset penalty time.

According to a second aspect, this application provides an electronic device, where the electronic device includes a touchscreen, a memory, and one or more processors, the touchscreen, the memory, and the processor are coupled, the memory is configured to store computer program code, the computer program code includes computer instructions, and when the processor executes the computer instructions, the electronic device performs the method in any one of the first aspect or the possible design manners of the first aspect.

According to a third aspect, this application provides a chip system, where the chip system is applied to an electronic device including a touchscreen, the chip system includes one or more interface circuits and one or more processors, the interface circuit and the processor are interconnected by using a line, and the interface circuit is configured to: receive a signal from a memory of the electronic device, and send the signal to the processor, where the signal includes computer instructions stored in the memory, and when the processor executes the computer instructions, the electronic device performs the method in any one of the first aspect or the possible design manners of the first aspect.

According to a fourth aspect, this application provides a computer storage medium, where the computer storage medium includes computer instructions, and when the computer instructions are run on an electronic device, the electronic device is enabled to perform the method in any one of the first aspect or the possible design manners of the first aspect.

According to a fifth aspect, this application provides a computer program product, where when the computer program product is run on a computer, the computer is enabled to perform the method in any one of the first aspect or the possible design manners of the first aspect.

It may be understood that, for beneficial effects that can be achieved by the electronic device in the second aspect, the chip system in the third aspect, the computer storage medium in the fourth aspect, and the computer program product in the fifth aspect that are provided above, refer to beneficial effects in any one of the first aspect or the possible design manners of the first aspect. Details are not described herein again. As further described below, in the embodiments of this application, a vertical synchronization signal 1 (for example, VSYNC_APP) can be described as a first vertical synchronization signal, a vertical synchronization signal 2 (for example, VSYNC_SF) can be described as a third vertical synchronization signal, and a vertical synchronization signal 3 (HW_VSYNC) can be described as a second vertical synchronization signal.

BRIEF DESCRIPTION OF DRAWINGS

FIG. 8B(1) and FIG. 8B(2) are a schematic diagram of another vertical synchronization signal adjustment principle according to an embodiment of this application;

FIG. 8C(1) and FIG. 8C(2) are a schematic diagram of another vertical synchronization signal adjustment principle according to an embodiment of this application;

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of this application, unless otherwise stated, "multiple" means two or more than two.

The embodiments of this application provide a control method based on a vertical synchronization signal. The method may be applied to an electronic device including a touchscreen. Specifically, the method may be applied to a process in which the electronic device displays an image on the touchscreen in response to a touch operation performed by the user on the touchscreen. In the method in the embodiments of this application, a response delay of the electronic device can be shortened, fluency of the electronic device can be improved, and user experience can be improved.

Figure 1A:
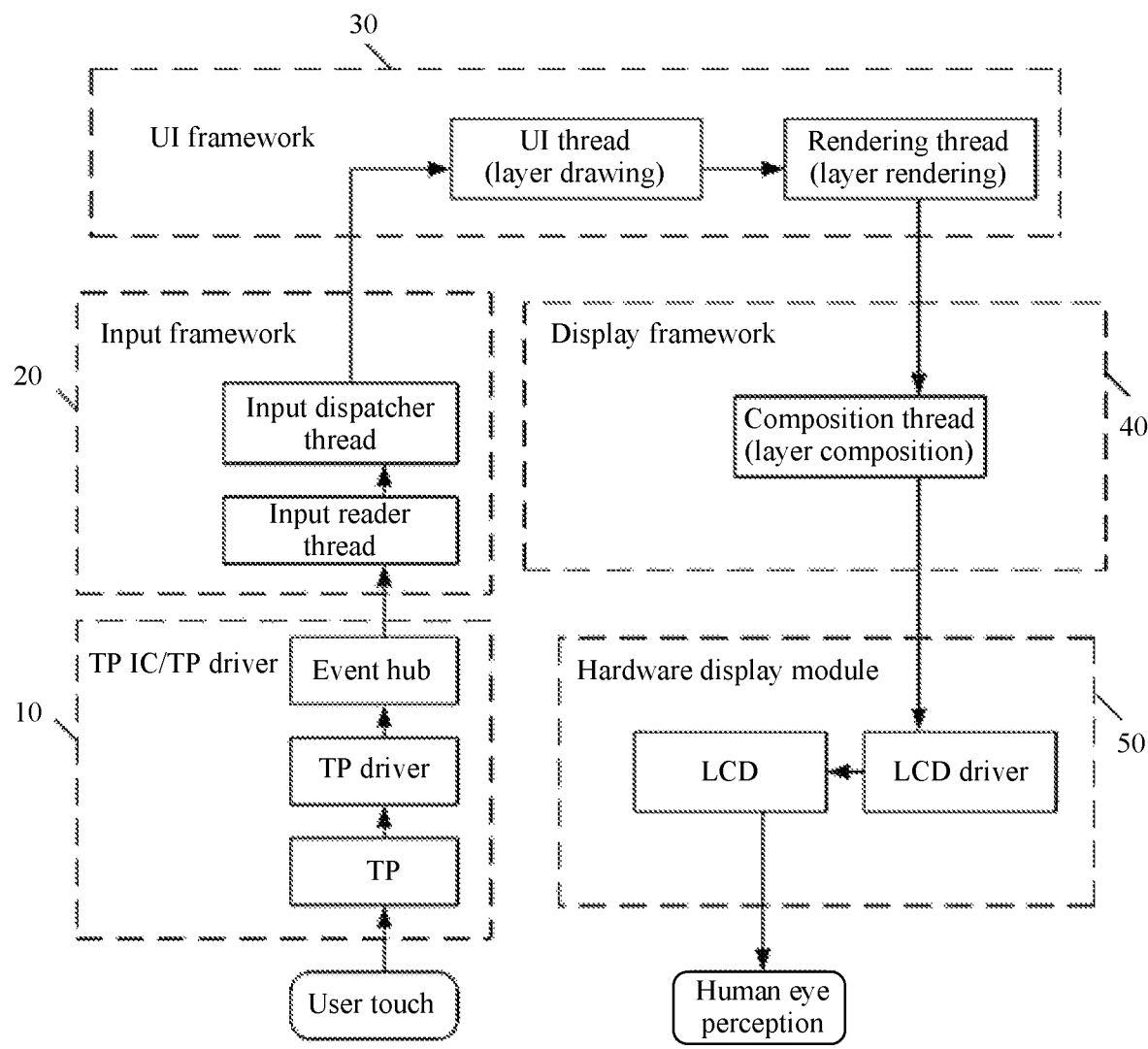
FIG. 1A is a schematic diagram of a software processing procedure in which an electronic device displays an image in response to a touch operation according to an embodiment of this application.

Referring to FIG. 1A, an example in which the foregoing user operation is a touch operation is used. FIG. 1A is a schematic diagram of a software processing procedure of an electronic device in a process from "a user inputs a touch operation on a touchscreen" to "the touchscreen displays an image corresponding to the touch operation". As shown in FIG. 1A, the electronic device may include a touch panel (touch panel, TP)/TP driver (driver) 10, an input framework (input framework) 20, a UI framework (UI framework) 30, a display framework (display framework) 40, and a hardware display module 50.

As shown in FIG. 1A, the software processing procedure of the electronic device may include the following step (1) to step (5).

Step (1): After a TP in the TP IC/TP driver 10 collects a touch operation performed by the user (for example, a touch object such as a user finger or a stylus) on the TP of the electronic device, a TP driver reports a corresponding touch event to an event hub.

Step (2): An input reader thread in the input framework 20 may read the touch event from the event hub, and then send the touch event to an input dispatcher thread, so that the input dispatcher thread uploads the touch event to a UI thread (for example, a doFrame) in the UI framework 30.

Step (3): The UI thread in the UI framework 30 draws one or more layers corresponding to the touch event, and a rendering thread (for example, drawFrame) performs layer rendering on the one or more layers.

Step (4): A composition thread in the display frame 40 performs layer composition on the one or more drawn layers (namely, the one or more rendered layers) to obtain an image frame.

Step (5): A liquid crystal display (liquid crystal display, LCD) driver in the hardware display module 50 may receive the image frame obtained through composition, and an LCD displays the image frame obtained through composition. After the LCD displays the image frame, an image displayed on the LCD can be perceived by human eyes.

In this embodiment of this application, a principle of shortening a response delay of the electronic device is briefly described by analyzing the processing procedure of the electronic device in the process from "a user inputs a touch operation on a touchscreen" to "an image that is displayed by on the touchscreen and that corresponds to the touch operation is perceived by the human eyes".

Figure 1B:
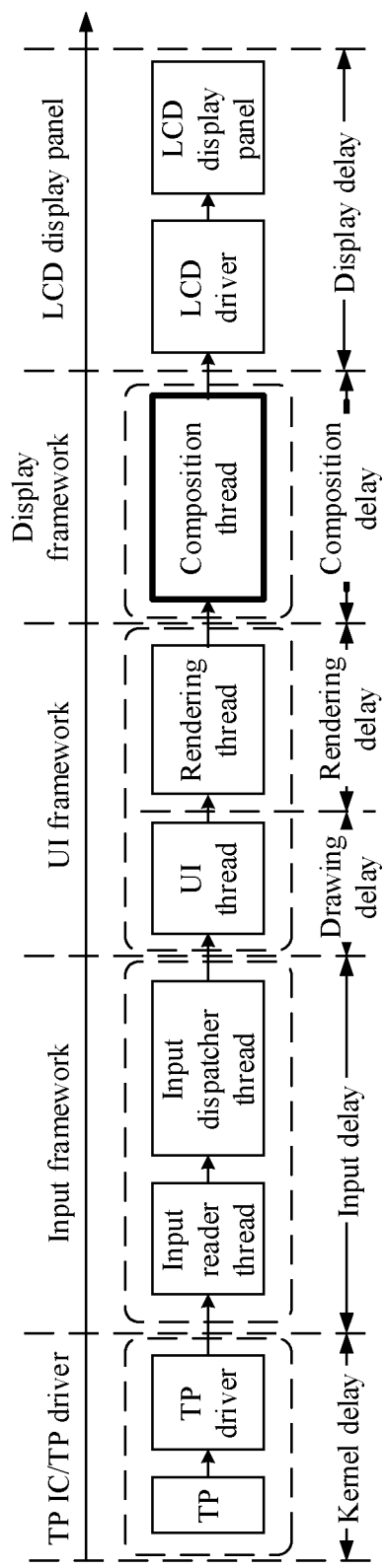
FIG. 1B is a schematic diagram of a delay in the software processing procedure shown in FIG. 1A.

In the foregoing step (1), a kernel delay shown in FIG. 1B may exist in a process in which the TP IC/TP driver 10 collects the touch operation and reports the touch event to the input framework 20. In the foregoing step (2), an input delay shown in FIG. 1B may exist in a process in which the input framework 20 processes the touch event and inputs the touch event into the UI framework. In the foregoing step (3), a drawing delay (also referred to as a UI thread delay) shown in FIG. 1B may exist when the UI thread in the UI framework draws the one or more layers corresponding to the touch event, and a rendering delay shown in FIG. 1B may exist when the rendering thread performs layer rendering. In the foregoing step (4), a composition delay shown in FIG. 1B may exist when the composition thread in the display framework 40 performs layer composition. In the foregoing step (5), a display delay shown in FIG. 1B may exist in a process in which the hardware display module 50 displays the image frame obtained through composition.

In the control method based on a vertical synchronization signal provided in the embodiments of this application, the "composition delay" shown in FIG. 1B may be shortened, to shorten the response delay of the electronic device and improve the fluency of the electronic device.

For example, the electronic device in the embodiments of this application may be a device including a touchscreen, for example, a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific form of the electronic device is not specifically limited in the embodiments of this application.

The following describes the implementations of the embodiments of this application in detail with reference to accompanying drawings.

Figure 2:
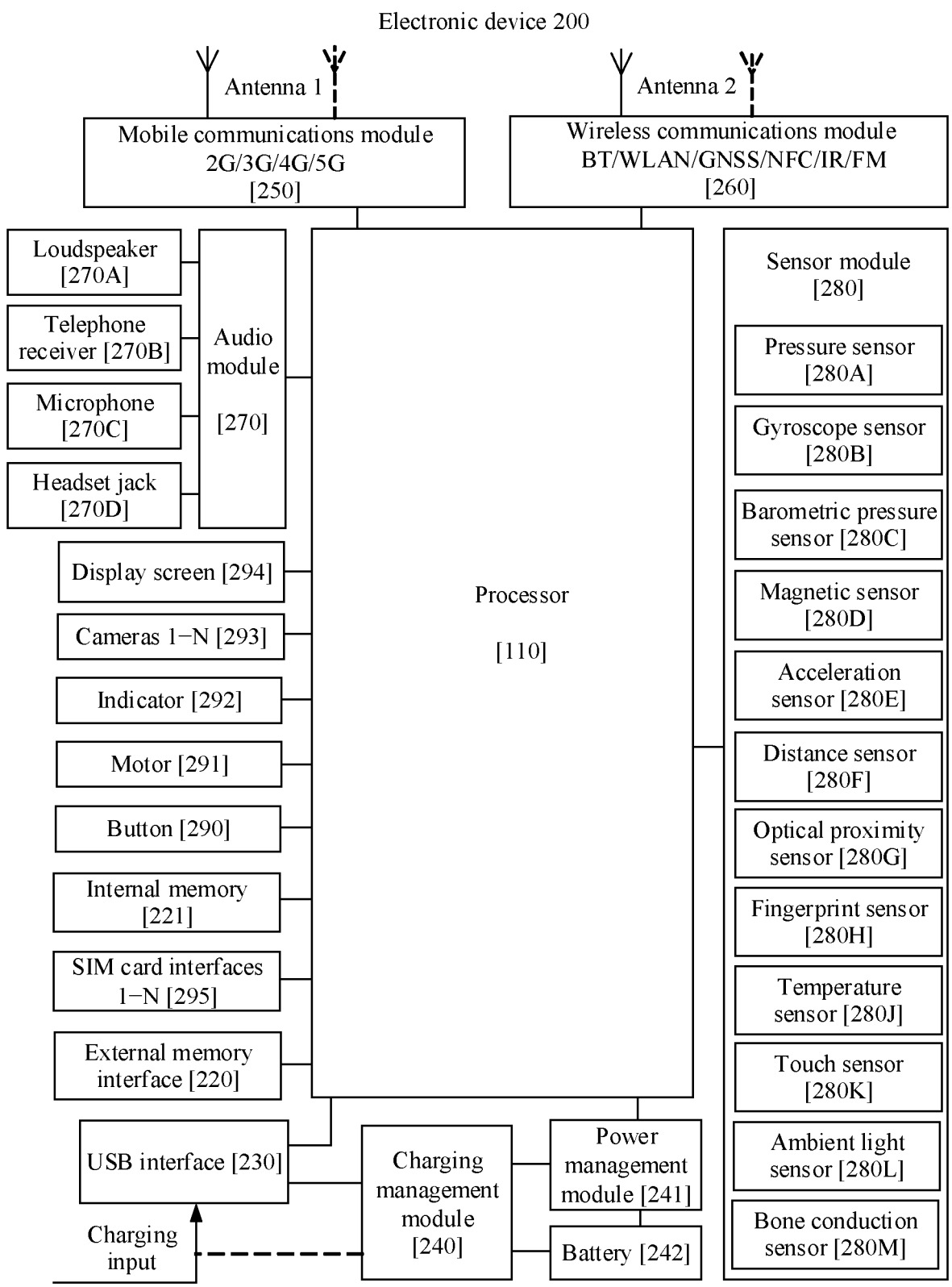
FIG. 2 is a schematic diagram of a hardware structure of an electronic device according to an embodiment of this application.

FIG. 2 is a schematic structural diagram of an electronic device 200 according to an embodiment of this application. As shown in FIG. 2, the electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a loudspeaker 270A, a telephone receiver 270B, a microphone 170C, a headset jack 270D, a sensor module 280, a button 290, a motor 291, an indicator 292, a camera 293, a display screen 294, a subscriber identity module (subscriber identity module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the schematic structure in this embodiment constitutes no specific limitation on the electronic device 200. In some other embodiments, the electronic device 200 may include more or fewer components than those shown in the figure, or combine some components, or split some components, or have different component arrangements. The components shown in the figure may be implemented by using hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 200. The controller may generate an operation control signal based on instruction operation code and a timing signal, to complete control of instruction reading and instruction execution.

A memory may be further disposed in the processor 210, to store instructions and data. In some embodiments, the memory in the processor 210 is a cache. The memory may store instructions or data that are/is just used or cyclically used by the processor 210. If the processor 210 needs to use the instructions or the data again, the processor 210 may directly invoke the instructions or the data from the memory, to avoid repeated access, and reduce waiting time of the processor 210. This improves system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is illustrated in this embodiment is merely an example for description, and constitutes no limitation on the structure of the electronic device 200. In some other embodiments, the electronic device 200 may alternatively use an interface connection manner different from that in the foregoing embodiment, or use a combination of a plurality of interface connection manners.

The charging management module 240 is configured to receive charging input from a charger. When charging the battery 242, the charging management module 240 may further supply power to the electronic device by using the power management module 241.

The power management module 241 is configured to connect the battery 242, the charging management module 240, and the processor 210. The power management module 241 may receive input of the battery 242 and/or the charging management module 240, to supply power to the processor 210, the internal memory 221, an external memory, the display screen 294, the camera 293, the wireless communications module 260, and the like. In some other embodiments, the power management module 241 may be alternatively disposed in the processor 210. In some other embodiments, the power management module 241 and the charging management module 240 may be alternatively disposed in a same component.

A wireless communication function of the electronic device 200 may be implemented by using the antenna 1, the antenna 2, the mobile communications module 250, the wireless communications module 260, the modem processor, the baseband processor, and the like.

The antenna 1 and the antenna 2 are configured to transmit and receive an electromagnetic wave signal. Each antenna of the electronic device 200 may be configured to cover one or more communication frequency bands. Different antennas may be further multiplexed to improve utilization of the antennas. For example, the antenna 1 may be multiplexed as a diversity antenna of a wireless local area network.

The mobile communications module 250 may provide a solution to wireless communication such as 2G/3G/4G/5G applied to the electronic device 200. The mobile communications module 250 may include at least one filter, a switch, a power amplifier, a low noise amplifier (low noise amplifier, LNA), and the like. The mobile communications module 250 may receive an electromagnetic wave by using the antenna 1, perform processing such as filtering and amplification on the received electromagnetic wave, and transmit a processed electromagnetic wave to the modem processor for demodulation. The mobile communications module 250 may further amplify a signal modulated by the modem processor, and convert the signal into an electromagnetic wave for radiation by using the antenna 1.

The modem processor may include a modulator and a demodulator. The modulator is configured to modulate a to-be-sent low-frequency baseband signal into an intermediate/high-frequency signal. The demodulator is configured to demodulate a received electromagnetic wave signal into a low-frequency baseband signal. Subsequently, the demodulator transmits the low-frequency baseband signal obtained through demodulation to the baseband processor for processing. After the low-frequency baseband signal is processed by the baseband processor, the low-frequency baseband signal is transmitted to the application processor. The application processor outputs a sound signal by using an audio device (which is not limited to the loudspeaker 270A, the telephone receiver 270B, and the like), or displays an image or a video by using the display screen 294.

The wireless communications module 260 may provide a solution to wireless communication applied to the electronic device 200, for example, a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communications module 260 may be one or more components into which at least one communication processing module is integrated. The wireless communications module 260 receives an electromagnetic wave by using the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation by using the antenna 2.

In some embodiments, the antenna 1 and the mobile communications module 250 of the electronic device 200 are coupled, and the antenna 2 and the wireless communications module 260 are coupled, so that the electronic device 200 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), a BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation system, SBAS).

The electronic device 200 implements a display function by using the GPU, the display screen 294, the application processor, and the like. The GPU is a microprocessor for image processing, and connects the display screen 294 and the application processor. The GPU is configured to perform mathematical and geometrical calculation, and is configured to perform graphics rendering. The processor 210 may include one or more GPUs that execute program instructions to generate or change display information.

The display screen 294 is configured to display an image, a video, and the like. The display screen 294 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), and the like.

The display screen 294 in this embodiment of this application may be a touchscreen.

That is, the touch sensor 280K is integrated into the display screen 294. The touch sensor 280K may also be referred to as a "touch panel". In other words, the display screen 294 may include a display panel and a touch panel, and the touch sensor 280K and the display screen 294 constitute a touchscreen that is also referred to as a "touchscreen". For example, the display screen 294 may be integrated with functions of the hardware display module 50 and the TP/TP driver 10 that are shown in FIG. 1A. The touch sensor 280K is configured to detect a touch operation performed on or near the touch sensor 280K. After the touch sensor 280K detects the touch operation, a driver (for example, the TP driver) at a kernel layer may transfer the touch operation to an upper layer to determine a touch event type. The display screen 294 may be used to provide visual output related to the touch operation. In some other embodiments, the touch sensor 280K may be alternatively disposed on a surface of the electronic device 200, and is at a location different from that of the display screen 294.

The electronic device 200 may implement a photographing function by using the ISP, the camera 293, the video codec, the GPU, the display screen 294, the application processor, and the like. The ISP is configured to process data sent by the camera 293. The camera 293 is configured to capture a still image or a video. The digital signal processor is configured to process a digital signal, and may further process another digital signal in addition to a digital image signal. The video codec is configured to compress or decompress a digital video. The electronic device 200 may support one or more video codecs. In this way, the electronic device 200 may play or record videos in a plurality of encoding formats, for example, moving picture experts group-1 (moving picture experts group-1, MPEG-1), MPEG-2, MPEG-3, and MPEG-4.

The NPU is a neural-network (neural-network, NN) computing processor, and quickly processes input information by using a biological neural network structure such as a transmission mode between human-brain neurons, and may further constantly perform self-learning. The NPU may be used to implement an application such as intelligent cognition of the electronic device 200, for example, image recognition, facial recognition, voice recognition, and text understanding.

The external memory interface 220 may be configured to connect to an external storage card such as a micro SD card, to extend a storage capability of the electronic device 200. The external storage card communicates with the processor 210 by using the external storage interface 220, to implement a data storage function, for example, to store a file such as music or a video into the external storage card. The internal memory 221 may be configured to store computer executable program code, and the executable program code includes instructions. The processor 210 runs the instructions stored in the internal memory 221, to perform various function applications of the electronic device 200 and data processing. For example, in this embodiment of this application, the processor 210 may execute the instructions stored in the internal memory 221, and the internal memory 221 may include a program storage area and a data storage area. The program storage area may store an operating system, an application program required by at least one function (such as a voice play function and an image play function), and the like. The data storage area may store data (for example, audio data and a phone book) and the like created in a process of using the electronic device 200. In addition, the internal memory 221 may include a high-speed random access memory, and may further include a non-volatile memory such as at least one magnetic disk memory, a flash memory, or a universal flash storage (universal flash storage, UFS).

The electronic device 200 may implement an audio function such as music playing or recording by using the audio module 270, the loudspeaker 270A, the telephone receiver 270B, the microphone 170C, the headset jack 270D, the application processor, and the like.

The audio module 270 is configured to convert digital audio information into an analog audio signal output, and is further configured to convert an analog audio input into a digital audio signal. The audio module 270 may be further configured to encode and decode an audio signal. The loudspeaker 270A, also referred to as a "speaker", is configured to convert an audio electrical signal into a sound signal. The telephone receiver 270B, also referred to as a "receiver", is configured to convert an audio electrical signal into a sound signal. The microphone 170C, also referred to as a "mic" or "mike", is configured to convert a sound signal into an electrical signal. The headset jack 270D is configured to connect to a wired headset.

The pressure sensor 280A is configured to sense a pressure signal, and may convert the pressure signal into an electrical signal. In some embodiments, the pressure sensor 280A may be disposed in the display screen 294. There are a plurality of types of pressure sensors 280A, for example, a resistive pressure sensor, an inductive pressure sensor, and a capacitive pressure sensor. The capacitive pressure sensor may include at least two parallel plates made of conductive materials. When force is exerted on the pressure sensor 280A, capacitance between electrodes changes. The electronic device 200 determines strength of pressure based on a change of the capacitance. When a touch operation is performed on the display screen 294, the electronic device 200 detects strength of the touch operation by using the pressure sensor 280A. The electronic device 200 may further calculate a touch location based on a detection signal of the pressure sensor 280A. In some embodiments, touch operations that are performed at a same touch location but have different touch operation strength may correspond to different operation instructions. In this embodiment of this application, the electronic device 200 may obtain pressing strength of a touch operation of a user by using the pressure sensor 280A.

The button 290 includes a power button, a volume button, and the like. The button 290 may be a mechanical button, or may be a touch button. The electronic device 200 may receive button input, and generate button signal input related to user setting and function control of the electronic device 200. The motor 291 may generate a vibration prompt. The motor 291 may be configured to provide a vibration prompt for an incoming call, and may be further configured to provide a touch vibration feedback. The indicator 292 may be an indicator light, may be configured to indicate a charging state and a battery change, and may be further configured to indicate a message, a missed call, a notification, and the like. The SIM card interface 295 is configured to connect to a SIM card. The SIM card may be inserted into the SIM card interface 295 or removed from the SIM card interface 295, to implement contact with and removal from the electronic device 200. The electronic device 200 may support one or N SIM card interfaces, and N is a positive integer greater than 1. The SIM card interface 295 may support a nano-SIM card, a micro-SIM card, a SIM card, and the like.

Methods in the following embodiments may be all implemented in the electronic device 200 having the foregoing hardware structure.

Terms in the embodiments of this application are described below.

A vertical synchronization signal 1 is, for example, VSYNC_APP. The vertical synchronization signal 1 may be used to trigger drawing of one or more layers. It should be noted that in the embodiments of this application, "the vertical synchronization signal 1 may be used to trigger drawing of one or more layers" specifically means that the vertical synchronization signal 1 may be used to trigger drawing of one or more layers and trigger rendering of the one or more layers. In other words, in the embodiments of this application, one or more drawn layers are one or more rendered layers. In the embodiments of this application, in response to the vertical synchronization signal 1, the electronic device may draw one or more layers for each application by using each drawing thread in a plurality of drawing threads. In other words, in response to the vertical synchronization signal 1, the electronic device may simultaneously execute a drawing task for one or more applications, to draw one or more layers corresponding to each application. For detailed descriptions of the foregoing one or more applications, refer to related content in the following embodiments. Details are not described in the embodiments of this application.

A vertical synchronization signal 2 is, for example, VSYNC_SF. The vertical synchronization signal 2 may be used to trigger layer composition of the one or more drawn layers to obtain an image frame.

A vertical synchronization signal 3 is, for example, HW_VSYNC. The vertical synchronization signal 3 may be used to trigger hardware to refresh and display the image frame.

In the embodiments of this application, the vertical synchronization signal 1 (for example, VSYNC_APP) is a first vertical synchronization signal, the vertical synchronization signal 2 (for example, VSYNC_SF) is a third vertical synchronization signal, and the vertical synchronization signal 3 (HW_VSYNC) is a second vertical synchronization signal.

It should be noted that a vertical synchronization signal may have different names in different systems or architectures. For example, in some systems or architectures, a name of the vertical synchronization signal (namely, the vertical synchronization signal 1) used to trigger drawing of one or more layers may not be VSYNC_APP. However, regardless of the name of the vertical synchronization signal, a synchronization signal having a similar function shall fall within the protection scope of this application, provided that the signal complies with a technical idea of the method provided in the embodiments of this application.

In addition, the foregoing vertical synchronization signal may also have different definitions in different systems or architectures. For example, in some other systems or architectures, a definition of the vertical synchronization signal 1 may be that the vertical synchronization signal 1 may be used to trigger rendering of one or more layers, a definition of the vertical synchronization signal 2 may be that the vertical synchronization signal 2 may be used to trigger generation of an image frame based on the one or more layers, and a definition of the vertical synchronization signal 3 may be that the vertical synchronization signal 3 may be used to trigger display of the image frame. In the embodiments of this application, the definition of the vertical synchronization signal is not limited. However, regardless of the definition of the vertical synchronization signal, a synchronization signal having a similar function shall fall within the protection scope of this application, provided that the signal complies with the technical idea of the method provided in the embodiments of this application.

Figure 3:
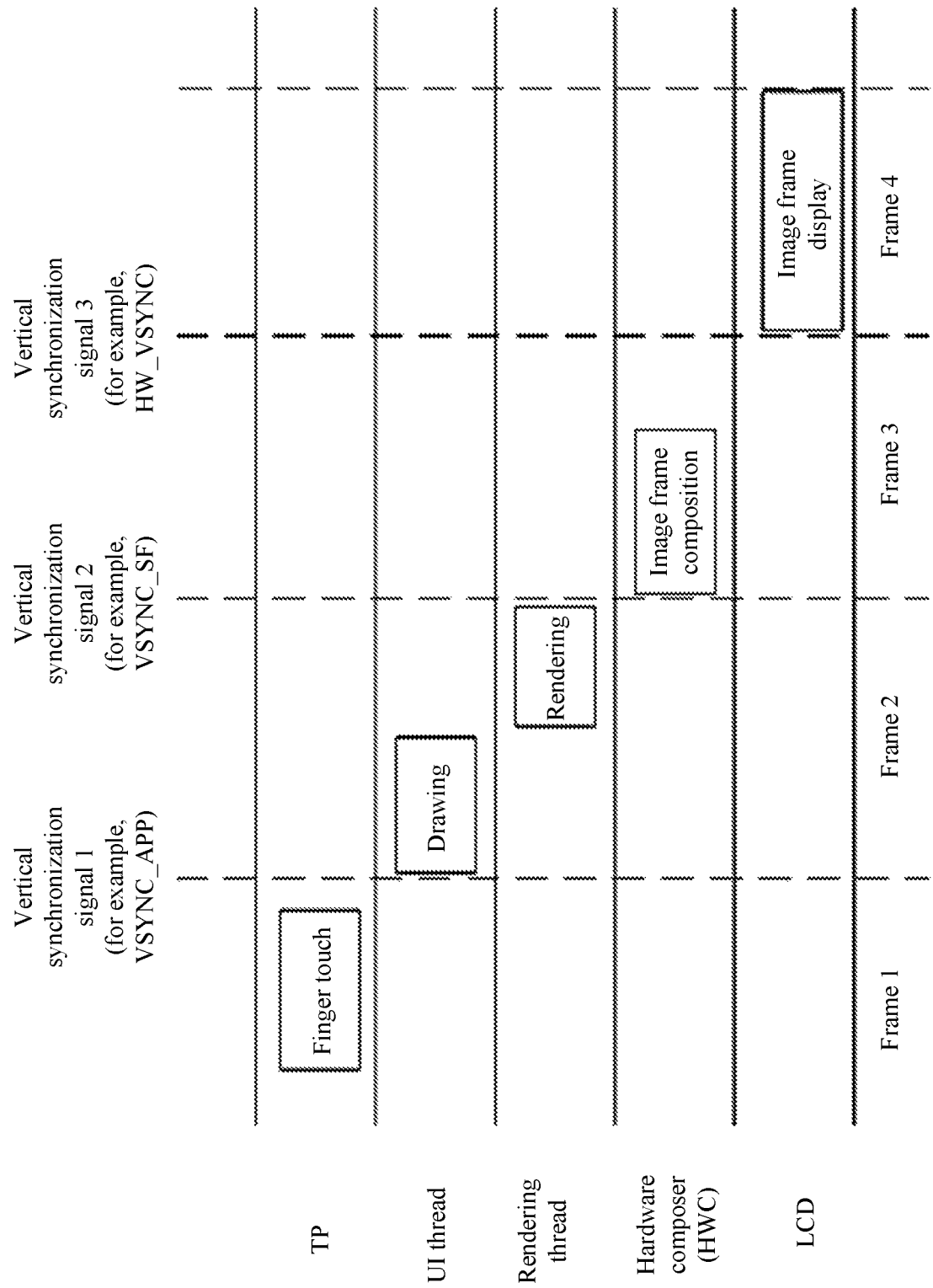
FIG. 3 is a schematic diagram of an image processing procedure according to an embodiment of this application.

With reference to FIG. 1A, in response to a user operation (for example, a touch operation performed by the user on the TP, for example, as shown in FIG. 3, a finger touches the TP) or a UI event occurring in the electronic device, the UI framework may invoke, at an arrival moment of the vertical synchronization signal 1, the UI thread to draw one or more layers corresponding to the touch event, and then invoke the rendering thread to render the one or more layers. For example, the user operation may alternatively be an operation that is input by the user by using a mouse, a key, or the like. The electronic device may also respond to the user operation that is input by the user by using the mouse, the key, or the like, to improve fluency of the electronic device by using the method in the embodiments of this application.

Then, a hardware composer (hardware composer, HWC) (the composition thread in the display framework 40 shown in FIG. 1A) may invoke, at an arrival moment of the vertical synchronization signal 2, the composition thread to perform layer composition on the one or more drawn layers (namely, the one or more rendered layers) to obtain an image frame. Finally, the hardware display module 50 may refresh and display the foregoing image frame on the LCD (namely, a display screen such as the foregoing display screen 294, where the LCD is used as an example herein) at an arrival moment of the vertical synchronization signal 2. The UI event may be triggered by a touch operation performed by the user on the TP. Alternatively, the UI event may be automatically triggered by the electronic device. For example, when a picture of a foreground application on the electronic device is automatically switched, the UI event may be triggered. The foreground application is an application corresponding to an interface currently displayed on the display screen of the electronic device.

It should be noted that the UI framework periodically performs layer drawing and rendering based on the vertical synchronization signal 1. The hardware composer (HWC) periodically performs layer composition based on the vertical synchronization signal 2. The LCD periodically performs image frame refresh based on the vertical synchronization signal 3.

The vertical synchronization signal 3 is a hardware signal triggered by a display driver of the electronic device. A signal period T3 of the vertical synchronization signal 3 (for example, HW_VSYNC) is determined based on a screen refresh rate of the display screen of the electronic device. Specifically, the signal period T3 of the vertical synchronization signal 3 is a reciprocal of the screen refresh rate of the display screen (for example, the LCD) of the electronic device.

For example, the screen refresh rate of the display screen of the electronic device may be any value such as 60 hertz (Hz), 70 Hz, 75 Hz, or 80 Hz. An example in which the screen refresh rate is 60 Hz is used. The signal period of the vertical synchronization signal 3 is T3=1/60=0.01667 second (s)=16.667 milliseconds (ms). It should be noted that the electronic device may support a plurality of different screen refresh rates. For example, it is assumed that a maximum screen refresh rate supported by the electronic device is 80 Hz. In this case, the electronic device may support a screen refresh rate of 80 Hz, 60 Hz, 40 Hz, or the like. The screen refresh rate in the embodiments of this application is a screen refresh rate currently used by the electronic device. In other words, the signal period T3 of the vertical synchronization signal 3 is a reciprocal of the screen refresh rate currently used by the electronic device.

Figure 5A:
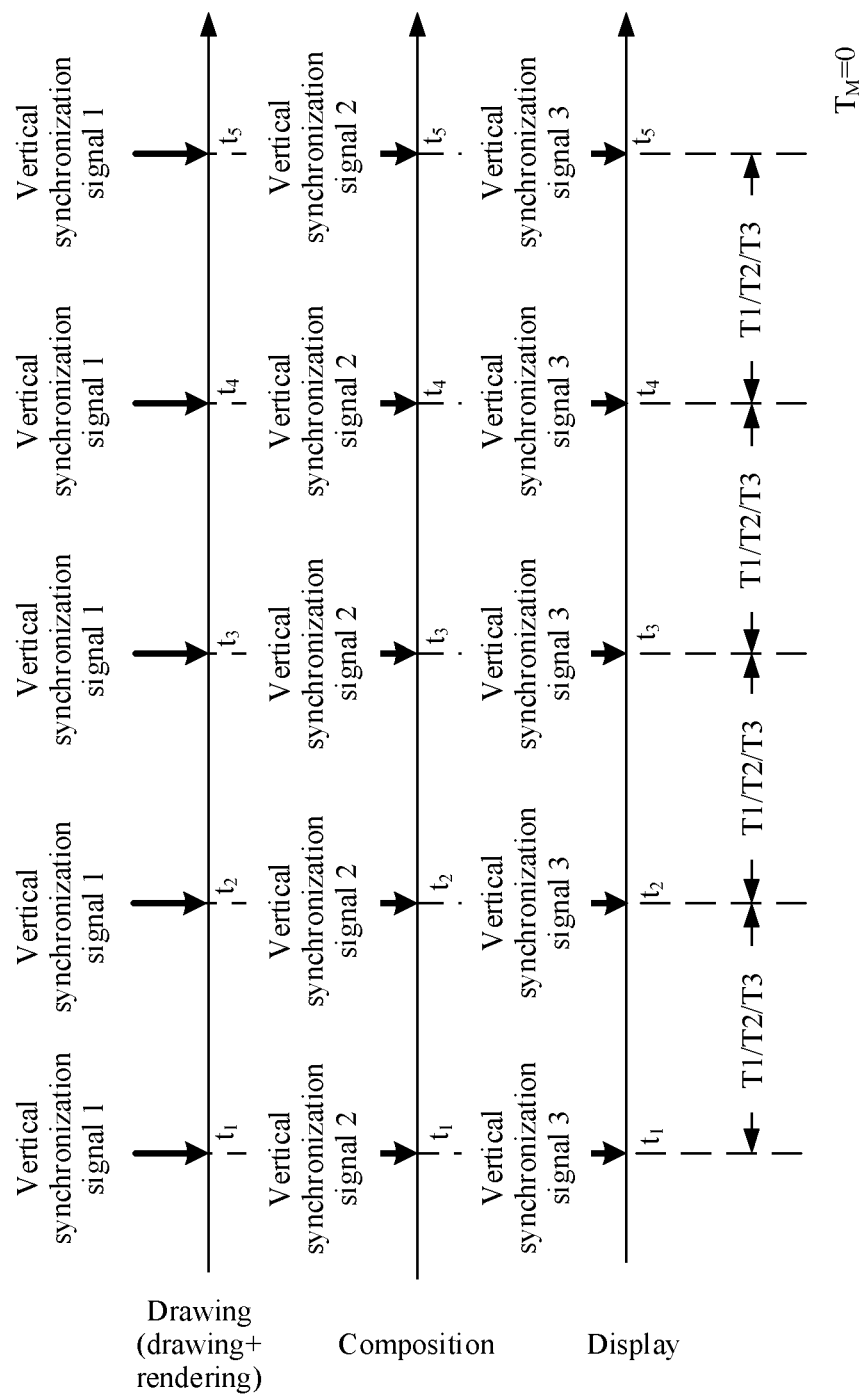
FIG. 5A(a) and FIG. 5A(b) are a schematic diagram of a vertical synchronization signal adjustment principle according to an embodiment of this application.
Figure 5A:
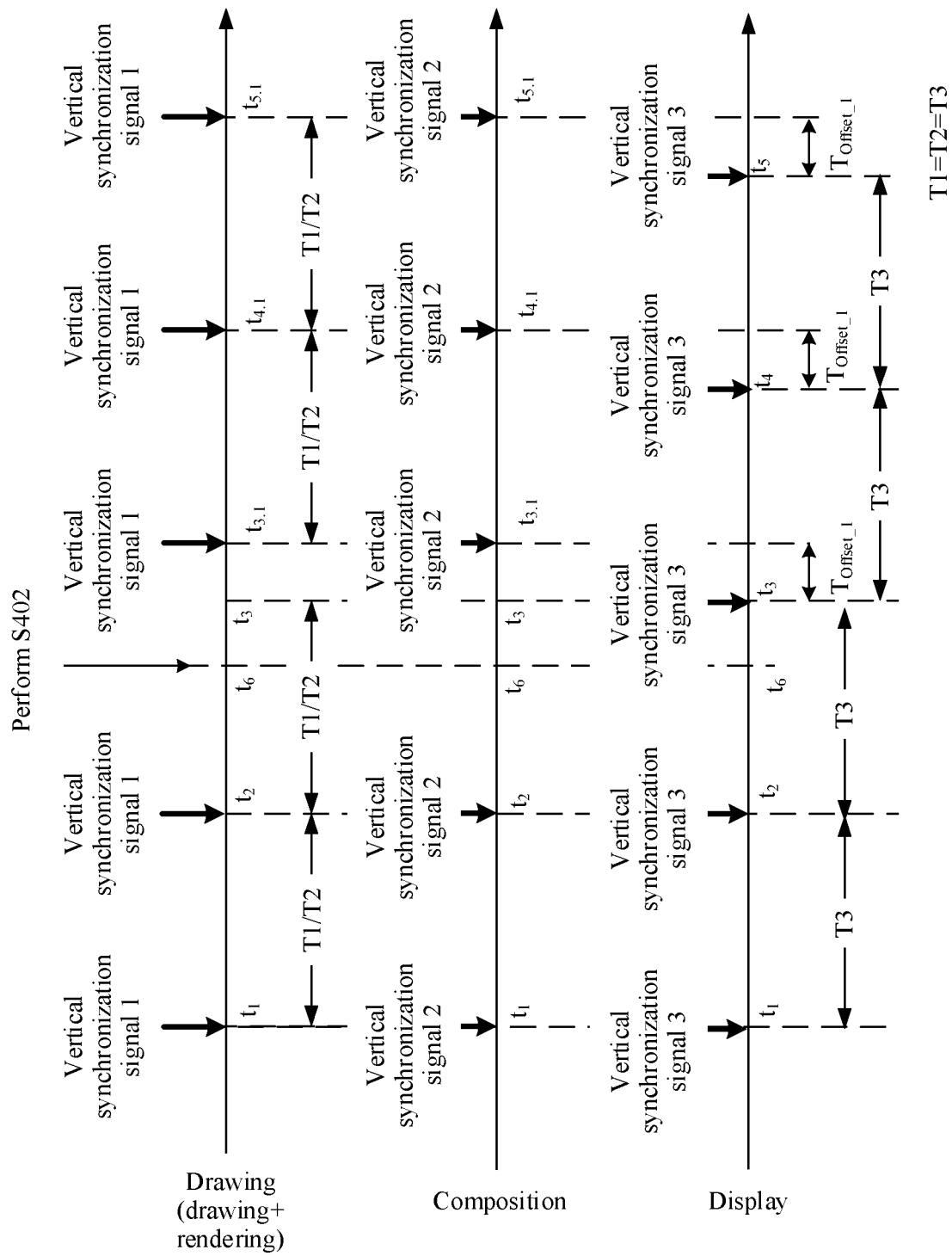

It should be noted that the vertical synchronization signal 3 in the embodiments of this application is a periodic discrete signal. For example, as shown in FIG. 5A(a), a vertical synchronization signal 3 triggered by a hardware driver exists in each signal period (for example, T3).

The vertical synchronization signal 1 and the vertical synchronization signal 2 are generated based on the vertical synchronization signal 3. That is, the vertical synchronization signal 3 may be signal sources of the vertical synchronization signal 1 and the vertical synchronization signal 2. Alternatively, the vertical synchronization signal 1 and the vertical synchronization signal 2 are synchronized with the vertical synchronization signal 3. Therefore, signal periods of the vertical synchronization signal 1 and the vertical synchronization signal 2 are the same as the signal period of the vertical synchronization signal 3, and phases are consistent. For example, as shown in FIG. 5A(a), the signal period T1 of the vertical synchronization signal 1, the signal period T2 of the vertical synchronization signal 2, and the signal period T3 of the vertical synchronization signal 3 are the same. In other words, T1=T2=T3. In addition, as shown in FIG. 5A(a), the phases of the vertical synchronization signal 1, the vertical synchronization signal 2, and the vertical synchronization signal 3 are consistent. It may be understood that, in an actual implementation process, there may be a phase error between the vertical synchronization signal 1, the vertical synchronization signal 2, and the vertical synchronization signal 3 due to various factors (for example, processing performance). It should be noted that the phase error is ignored when the method in the embodiments of this application is understood.

It should be noted that the vertical synchronization signal 1 and the vertical synchronization signal 2 are also periodic discrete signals. For example, as shown in FIG. 5A(a), a vertical synchronization signal 1 exists in each signal period (for example, T1), and a vertical synchronization signal 2 exists in each signal period (for example, T2). That is, a plurality of vertical synchronization signals 1 that appear in FIG. 5A(a) sequentially arrive based on the signal period T1 of the vertical synchronization signal 1, and a plurality of vertical synchronization signal 2 that appears in FIG. 5A(a) sequentially arrive based on the signal period T2 of the vertical synchronization signal 2. Therefore, the vertical synchronization signal 3, the vertical synchronization signal 1, and the vertical synchronization signal 2 may be all considered as periodic discrete signals.

The vertical synchronization signal 1, the vertical synchronization signal 2, and the vertical synchronization signal 3 are all periodic signals. Therefore, in the embodiments of this application, "a vertical synchronization signal arrives" (for example, the vertical synchronization signal 1 arrives) means that a pulse edge of the vertical synchronization signal arrives, and "in response to a vertical synchronization signal" (for example, in response to the vertical synchronization signal 1) means "in response to a pulse edge of the vertical synchronization signal". For example, as shown in FIG. 5, "a vertical synchronization signal 1 arrives at a moment $t_1$" means that a pulse edge of the vertical synchronization signal 1 arrives at the moment $t_1$, and "in response to the vertical synchronization signal 1 at the moment $t_1$" means "in response to the pulse edge of the vertical synchronization signal 1 at the moment $t_1$".

The pulse edge is an edge, of a pulse, that is figuratively observed from an oscilloscope or an observing system. In different systems, the pulse edge may be a rising edge, a falling edge, or both a rising edge and a falling edge. In an actual system, the pulse edge may be implemented in a manner such as timer rollover or an interrupt signal.

In the embodiments of this application, the signal periods of the vertical synchronization signal 1, the vertical synchronization signal 2, and the vertical synchronization signal 3 may be all referred to as synchronization periods $T_Z$. In other words, T1=T2=T3=$T_Z$. In other words, the synchronization period in the embodiments of this application is the reciprocal of the screen refresh rate of the display screen of the electronic device. A frame 1, a frame 2, a frame 3, and a frame 4 that are shown in FIG. 3 are all synchronization periods. For example, the screen refresh rate of the display screen of the electronic device may be any value such as 60 hertz (Hz), 70 Hz, 75 Hz, or 80 Hz. An example in which the screen refresh rate may be 60 Hz is used. The synchronization period is $T_Z$=1/60=0.01667 second (s)=16.667 milliseconds (ms), in other words, T1=T2=T3=$T_Z$=16.667 ms.

The TP is a touch panel, and the TP may be integrated into the display screen 294. The TP may periodically detect a touch operation of the user. After detecting the touch operation, the TP may wake up the vertical synchronization signal 1 and the vertical synchronization signal 2, to trigger the UI framework to perform layer drawing and rendering based on the vertical synchronization signal 1, and trigger the hardware composer (HWC) to perform layer composition based on the vertical synchronization signal 2. A detection period in which the TP detects the touch operation is the same as the signal period T3 of the vertical synchronization signal 3 (for example, HW_VSYNC).

It may be understood that the LCD periodically performs image frame refresh based on the vertical synchronization signal 3. Therefore, even if the hardware composer (HWC) has completed image frame composition, if no vertical synchronization signal 3 is detected, the LCD does not perform image frame refresh to display an image frame. The LCD performs image frame refresh only at the arrival moment of the vertical synchronization signal 3 to display the image frame obtained by the HWC through composition.

For example, as shown in FIG. 3, after the HWC completes image frame composition and delay time (offset) expires, the LCD performs image frame refresh only at the arrival moment of the vertical synchronization signal 3 to display the image frame obtained by the HWC through composition.

In the method provided in the embodiments of this application, the vertical synchronization signal 1 may be adjusted, so that the vertical synchronization signal 1 is delayed by specified time (for example, first delay time) relative to the vertical synchronization signal 3. In this way, after the HWC completes image frame composition, the LCD can promptly perform image frame refresh to display the image frame. Therefore, the "composition delay" shown in FIG. 1B can be shortened without increasing load of the electronic device, to shorten a response delay of the electronic device and improve fluency of the electronic device.

It should be noted that the vertical synchronization signal 1 is adjusted, so that the vertical synchronization signal 1 is delayed by the first delay time relative to the vertical synchronization signal 3. In this case, there is a phase difference between the vertical synchronization signal 1 and the vertical synchronization signal 3. The vertical synchronization signal 1 is adjusted, so that there is a phase difference between the vertical synchronization signal 1 and the vertical synchronization signal 3. In this case, the vertical synchronization signal 1 is delayed by specified time (for example, the first delay time) relative to the vertical synchronization signal 3 The vertical synchronization signal 1 is adjusted, so that there is a phase difference between the vertical synchronization signal 1 and the vertical synchronization signal 3. After the phase difference is converted into time, the phase difference may be represented as follows: The vertical synchronization signal 1 is delayed by the first delay time.

In conclusion, in the embodiments of this application, either "adjusting delay time of the vertical synchronization signal 1 relative to the vertical synchronization signal 3" within a specified range or "adjusting a phase of the vertical synchronization signal 1 relative to the vertical synchronization signal 3" within a specified range may be used to shorten the response delay of the electronic device in the embodiments of this application. In the following embodiments, the method in the embodiments of this application is described by using an example in which the vertical synchronization signal 1 is adjusted, so that the vertical synchronization signal 1 is delayed by the first delay time relative to the vertical synchronization signal 3.

The control method based on a vertical synchronization signal provided in the embodiments of this application may be performed by a vertical synchronization signal adjustment apparatus. The adjustment apparatus may be any one of the foregoing electronic devices (for example, the adjustment apparatus may be the electronic device 200 shown in FIG. 2). Alternatively, the adjustment apparatus may be a central processing unit (central processing unit, CPU for short) of the electronic device, or a control module that is in the electronic device and that is configured to perform the control method based on a vertical synchronization signal. In the embodiments of this application, an example in which the electronic device performs the control method based on a vertical synchronization signal is used to describe the control method based on a vertical synchronization signal provided in the embodiments of this application.

In the following embodiments, the method in the embodiments of this application is described by using an example in which the first vertical synchronization signal is the vertical synchronization signal 1 (for example, a VSYNC_APP signal), the third vertical synchronization signal is the vertical synchronization signal 2 (for example, a VSYNC_SF signal), and the second vertical synchronization signal is the vertical synchronization signal 3 (for example, an HW_VSYNC signal).

Embodiment 1

Figure 4A:
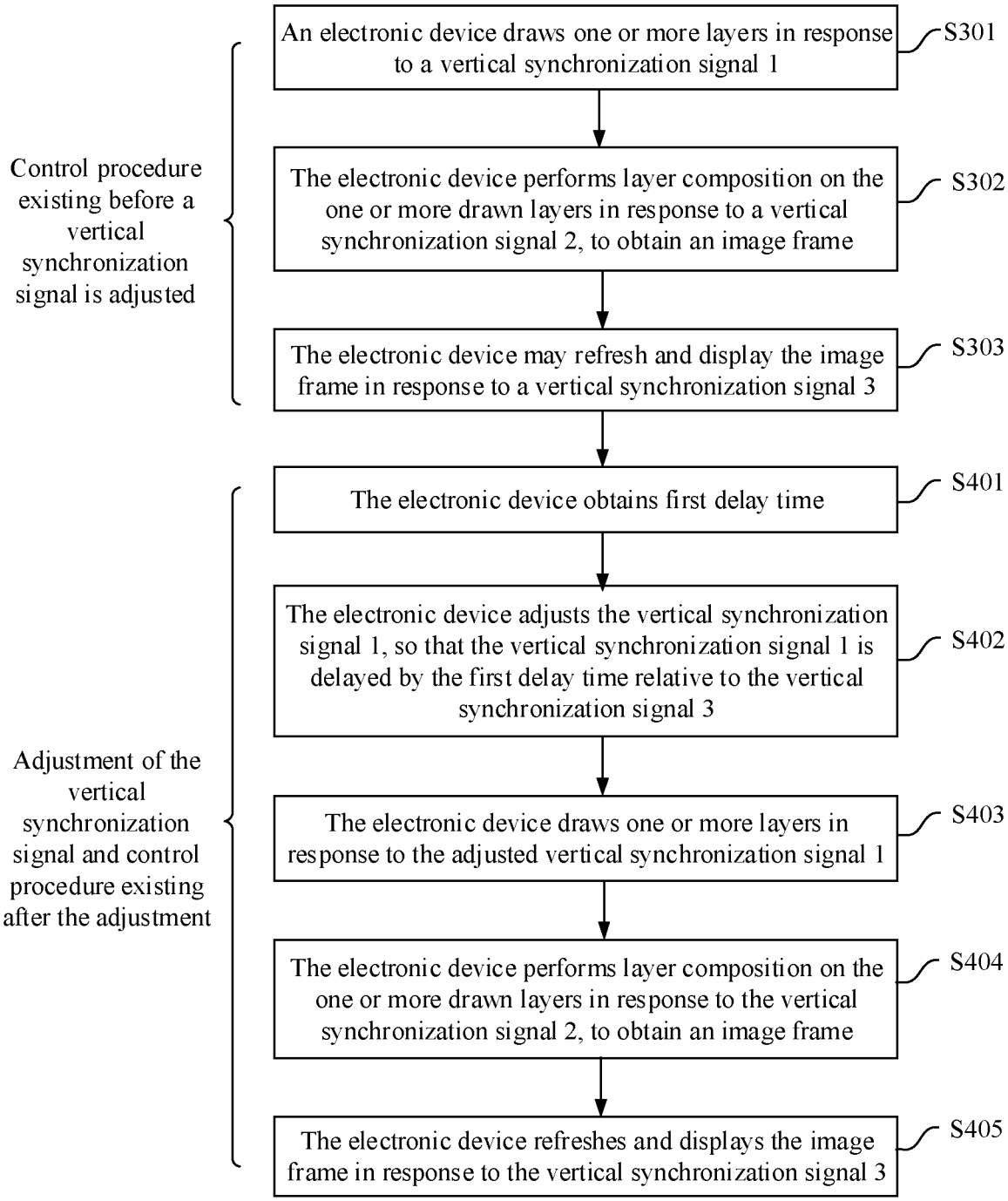
FIG. 4A is a flowchart of a control method based on a vertical synchronization signal according to an embodiment of this application.
Figure 4B:
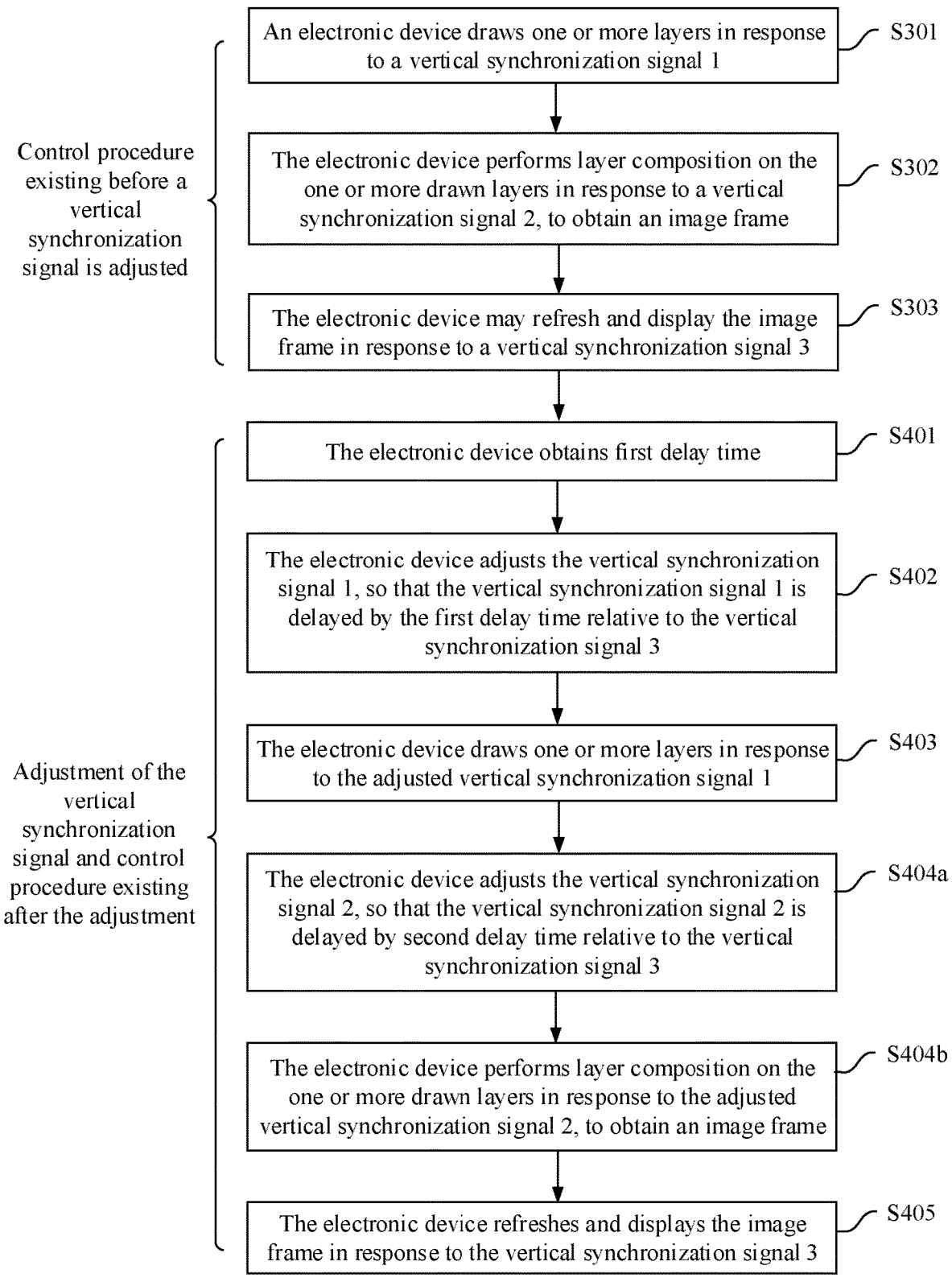
FIG. 4B is a flowchart of a control method based on a vertical synchronization signal according to an embodiment of this application.

This embodiment of this application provides a control method based on a vertical synchronization signal. The method may be applied to an electronic device including a display screen. As shown in FIG. 4A or FIG. 4B, the control method based on a vertical synchronization signal may include "a control procedure existing before a vertical synchronization signal is adjusted" and "adjustment of the vertical synchronization signal and a control procedure existing after the adjustment".

As shown in FIG. 4A or FIG. 4B, "a control procedure existing before a vertical synchronization signal is adjusted" described above may include S301 to S303.

S301. The electronic device draws one or more layers in response to a vertical synchronization signal 1.

S302. The electronic device performs layer composition on the one or more drawn layers in response to a vertical synchronization signal 2, to obtain an image frame.

S303. The electronic device may refresh and display the image frame in response to a vertical synchronization signal 3.

Generally, delay time of the vertical synchronization signal 1 relative to the vertical synchronization signal 3 is zero, and a phase difference is zero. For example, as shown in FIG. 5A(a), the delay time of the vertical synchronization signal 1 relative to the vertical synchronization signal 3 is zero, and the phase difference is zero. When a signal period T1 of the vertical synchronization signal 1 is the same as a signal period T3 of the vertical synchronization signal 3 (in other words, T1=T3=$T_Z$), that the delay time of the vertical synchronization signal 1 relative to the vertical synchronization signal 3 is zero may be specifically as follows: When a vertical synchronization signal 3 arrives, a vertical synchronization signal 1 also arrives.

For example, as shown in FIG. 5A(a), the vertical synchronization signal 1 and the vertical synchronization signal 3 simultaneously arrive at a moment $t_1$, the vertical synchronization signal 1 and the vertical synchronization signal 3 simultaneously arrive at a moment $t_2$, the vertical synchronization signal 1 and the vertical synchronization signal 3 simultaneously arrive at a moment $t_3$, the vertical synchronization signal 1 and the vertical synchronization signal 3 simultaneously arrive at a moment $t_4$, and the vertical synchronization signal 1 and the vertical synchronization signal 3 simultaneously arrive at a moment $t_5$.

As shown in FIG. 4A or FIG. 4B, "adjustment of the vertical synchronization signal and a control procedure existing after the adjustment" described above may include S401 to S403.

S401. The electronic device obtains first delay time.

In some embodiments, the first delay time $T_{Offset\_1}$ is preset duration. The preset duration may be preconfigured on the electronic device. Alternatively, the preset duration may be set by a user on the electronic device. For example, the preset duration may be any duration such as 2 milliseconds (ms), 2.5 ms, 3 ms, or 4 ms.

In some other embodiments, the electronic device may determine the first delay time $T_{Offset\_1}$ based on a synchronization period and time (namely, a plurality of SF frame lengths) consumed for performing a plurality of times layer composition within specified time (for example, a statistical period). In this embodiment, for a specific method for determining the first delay time $T_{Offset\_1}$ by the electronic device, refer to detailed descriptions of S801 to S803. Details are not described in this embodiment of this application.

S402. The electronic device adjusts the vertical synchronization signal 1, so that the vertical synchronization signal 1 is delayed by the first delay time relative to the vertical synchronization signal 3.

S403. The electronic device draws one or more layers in response to the adjusted vertical synchronization signal 1.

With reference to FIG. 5A(a), as shown in FIG. 5A(b), it is assumed that the electronic device performs S402 at a moment $t_6$. In this case, after the moment $t_6$ shown in FIG. 5A(b), the vertical synchronization signal 1 is delayed by the first delay time $T_{Offset\_1}$ relative to the vertical synchronization signal 3. Before the moment $t_6$, the delay time of the vertical synchronization signal 1 relative to the vertical synchronization signal 3 is zero.

For example, as shown in FIG. 5A(b), the vertical synchronization signal 1 and the vertical synchronization signal 3 simultaneously arrive at the moment $t_1$ before the moment $t_6$, and the vertical synchronization signal 1 and the vertical synchronization signal 3 simultaneously arrive at the moment $t_2$ before the moment $t_6$. However, the vertical synchronization signal 3 arrives at the moment $t_3$ after the moment $t_6$, the vertical synchronization signal 1 arrives at a moment $t_{3.1}$ after the moment $t_3$, and the moment $t_3$ is later than the moment $t_3$ by $T_{Offset\_1}$. The vertical synchronization signal 3 arrives at the moment $t_4$ after the moment $t_6$, the vertical synchronization signal 1 arrives at a moment $t_{4.1}$ after the moment $t_4$, and the moment $t_{4.1}$ is later than the moment $t_4$ by $T_{Offset\_1}$. The vertical synchronization signal 3 arrives at the moment is after the moment $t_6$, the vertical synchronization signal 1 arrives at a moment $t_{5.1}$ after the moment $t_5$, and the moment $t_{5.1}$ is later than the moment is by $T_{Offset\_1}$.

It should be noted that "the delay time of the vertical synchronization signal 1 relative to the vertical synchronization signal 3" in this embodiment of this application is delay time of a vertical synchronization signal 1, that arrives in one synchronization period starting from an arrival moment of any vertical synchronization signal 3, relative to the vertical synchronization signal 3.

For example, as shown in FIG. 5A(a), "the delay time of the vertical synchronization signal 1 relative to the vertical synchronization signal 3" may be a time difference between arrival moments of the vertical synchronization signal 3 at the moment $t_1$ and the vertical synchronization signal 1 at the moment $t_2$, namely, duration from the moment $t_1$ to the moment $t_2$, or may be a time difference between arrival moments of the vertical synchronization signal 3 at the moment $t_3$ and the vertical synchronization signal 1 at the moment $t_4$, namely, duration from the moment $t_3$ to the moment $t_4$.

For example, as shown in FIG. 5A(b), after a moment $t_7$, "the delay time of the vertical synchronization signal 1 relative to the vertical synchronization signal 3" may be a time difference between arrival moments of the vertical synchronization signal 3 at the moment $t_3$ and the vertical synchronization signal 1 at the moment $t_{3.1}$, namely, duration from the moment $t_3$ to the moment $t_{3.1}$, or may be a time difference between arrival moments of the vertical synchronization signal 3 at the moment $t_4$ and the vertical synchronization signal 1 at the moment $t_{4.1}$, namely, duration from the moment $t_4$ to the moment $t_{4.1}$.

In some embodiments, delay time of the vertical synchronization signal 1 relative to the vertical synchronization signal 2 is fixed, in other words, there is a fixed phase difference between the vertical synchronization signal 1 and the vertical synchronization signal 2. In this case, after the electronic device adjusts the vertical synchronization signal 1, the vertical synchronization signal 2 changes accordingly. For example, after S402, the vertical synchronization signal 2 is delayed by the first delay time relative to the vertical synchronization signal 3. In this embodiment, as shown in FIG. 4A, after S403, the method in this embodiment of this application may further include S404 and S405.

S404. The electronic device performs layer composition on the one or more drawn layers in response to the vertical synchronization signal 2, to obtain an image frame.

S405. The electronic device refreshes and displays the image frame in response to the vertical synchronization signal 3.

In some other embodiments, the delay time of the vertical synchronization signal 1 relative to the vertical synchronization signal 2 is not fixed. In this case, after performing S402, the electronic device may further adjust the vertical synchronization signal 2. In this embodiment, as shown in FIG. 4B, "adjustment of the vertical synchronization signal and a control procedure existing after the adjustment" described above may include S401, S402, S403, S404a, S404b, and S405.

S404a. The electronic device adjusts the vertical synchronization signal 2, so that the vertical synchronization signal 2 is delayed by second delay time relative to the vertical synchronization signal 3.

S404b. The electronic device performs layer composition on the one or more drawn layers in response to the adjusted vertical synchronization signal 2, to obtain an image frame.

Generally, delay time of the vertical synchronization signal 2 relative to the vertical synchronization signal 3 is zero, and a phase difference is zero. For example, as shown in FIG. 5A(a), the delay time of the vertical synchronization signal 2 relative to the vertical synchronization signal 3 is zero, and the phase difference is zero. When a signal period T2 of the vertical synchronization signal 2 is the same as the signal period T3 of the vertical synchronization signal 3 (in other words, T1=T3=$T_Z$), that the delay time of the vertical synchronization signal 2 relative to the vertical synchronization signal 3 is zero may be specifically as follows: When a vertical synchronization signal 3 arrives, a vertical synchronization signal 2 also arrives.

For example, as shown in FIG. 5A(a), the vertical synchronization signal 2 and the vertical synchronization signal 3 simultaneously arrive at the moment $t_1$, the moment $t_2$, the moment $t_3$, the moment $t_4$, and the moment $t_5$.

With reference to FIG. 5A(a), as shown in FIG. 5A(b), it is assumed that the electronic device performs S402 at the moment $t_6$. In this case, after the moment $t_6$ shown in FIG. 5A(b), the vertical synchronization signal 2 is delayed by the first delay time $T_{Offset\_1}$ relative to the vertical synchronization signal 3. Before the moment $t_6$, the delay time of the vertical synchronization signal 1 relative to the vertical synchronization signal 3 is zero.

For example, as shown in FIG. 5A(b), the vertical synchronization signal 2 and the vertical synchronization signal 3 simultaneously arrive at the moment $t_1$ before the moment $t_6$. However, the vertical synchronization signal 3 arrives at the moment $t_3$ after the moment $t_6$, the vertical synchronization signal 2 arrives at the moment $t_{3.1}$ after the moment $t_3$, and the moment $t_{3.1}$ is later than the moment $t_3$ by $T_{Offset\_1}$.

It should be noted that for detailed descriptions of "the delay time of the vertical synchronization signal 2 relative to the vertical synchronization signal 3" in this embodiment of this application, refer to descriptions of "the delay time of the vertical synchronization signal 1 relative to the vertical synchronization signal 3" in the foregoing embodiment. Details are not described again in this embodiment of this application.

Embodiment 2

In this embodiment, a principle that the electronic device performs the foregoing method for one or more applications in Embodiment 1 is described.

The foregoing one or more layers may include a layer drawn by the electronic device by executing a drawing task corresponding to one or more applications. The one or more applications may include at least one of one or more system-level applications and one or more user-level applications. The system-level application is an application that cannot be offloaded and that is installed on the electronic device at delivery of the electronic device. For example, the system-level application may include an application such as a status bar, a launcher, a navigation bar, a wallpaper, "settings", "phone", and "messages". The launcher is usually referred to as a desktop of an Android system. The user-level application may be an application that can be offloaded and that is installed on the electronic device. The user-level application may include an application that can be offloaded and that is installed on the electronic device at delivery of the electronic device, and a third-party application that is on the electronic device and that can be downloaded from an application store in response to a user operation. For example, the third-party application may include an application such as "WeChat", "Alipay", and "Baidu Map". The drawing task in this embodiment of this application includes "layer drawing" and "layer rendering".

A principle that the electronic device performs the method in this embodiment of this application for one or more applications to perform layer drawing, rendering, and composition, and image frame display is described below by using two application scenarios.

Application scenario (1): The foregoing one or more applications may include only one application. In this case, the foregoing one or more layers are a layer drawn by the electronic device by executing a drawing task corresponding to one application. That is, the electronic device may perform S301 or S403 for the application to draw (draw and render) one or more corresponding layers. Then, the electronic device may perform S302 and S404b to perform layer composition on the one or more layers drawn for the application.

For example, the application is an application I. The electronic device may perform S301 or S403 for the application I to obtain one or more drawn layers I. Then, the electronic device may perform S302 and S404b to perform layer composition on the one or more layers I drawn for the application I, to obtain an image frame I.

Figure 5B:
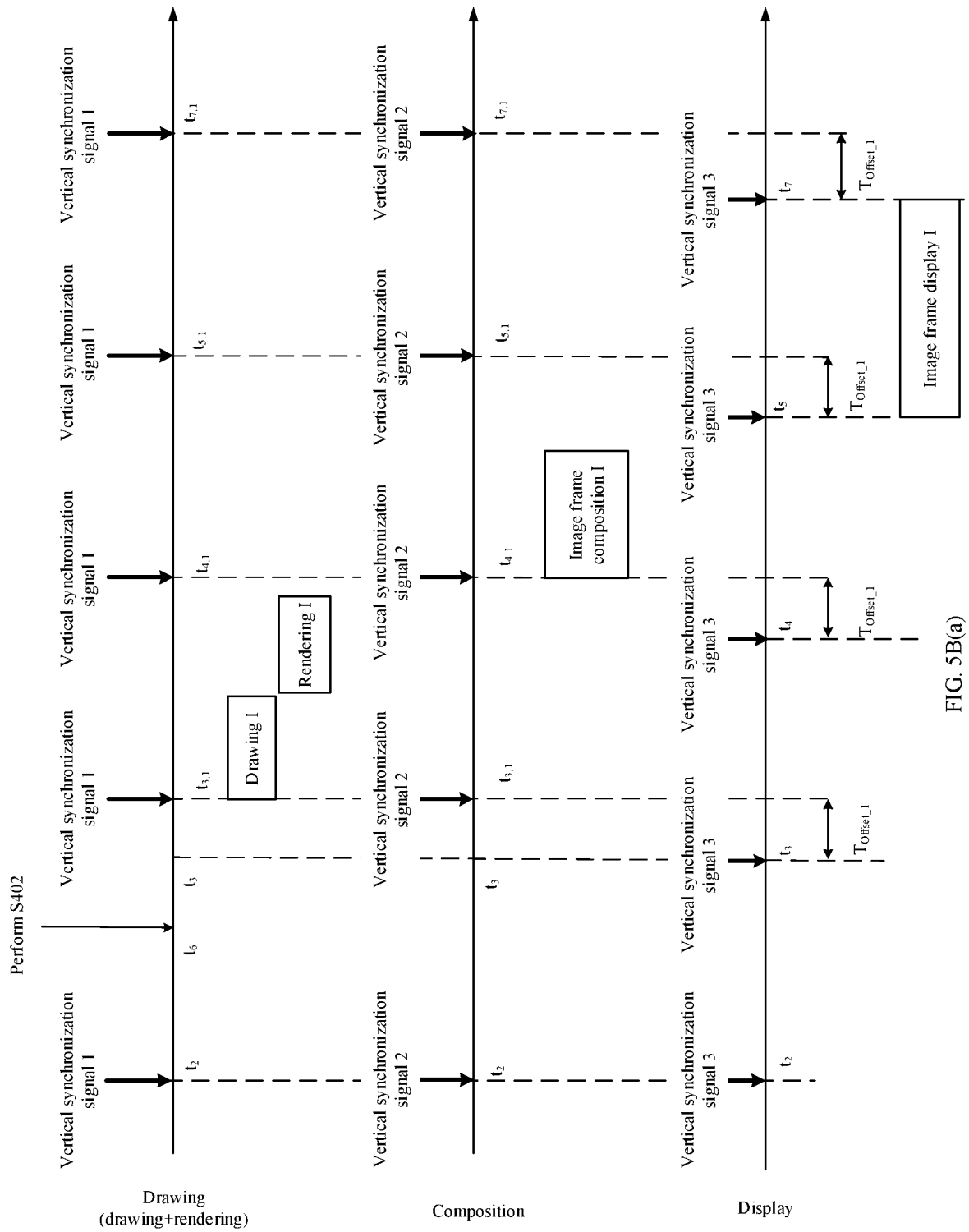
FIG. 5B(a) and FIG. 5B(b) are a schematic diagram of another vertical synchronization signal adjustment principle according to an embodiment of this application.
Figure 5B:
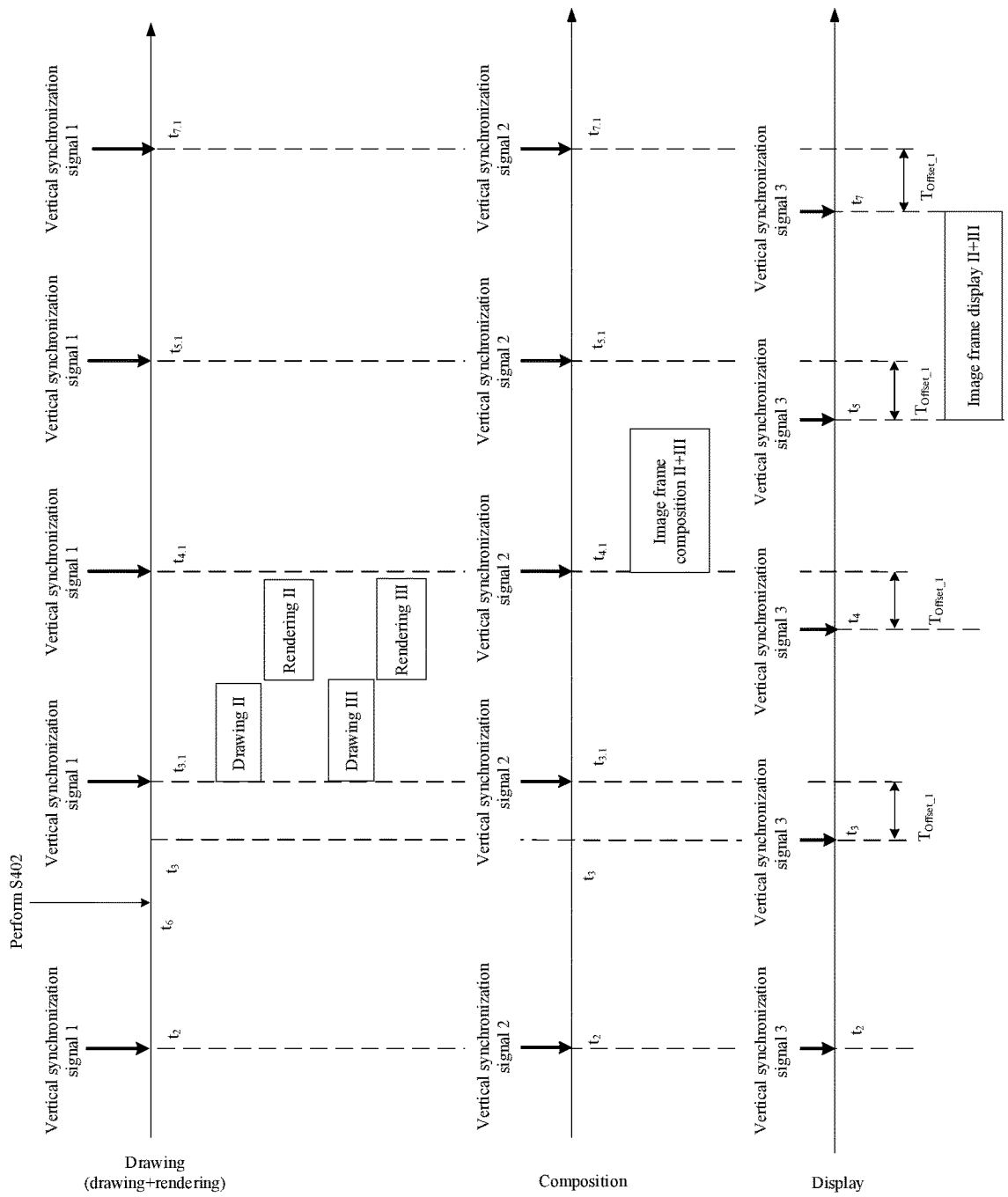

For example, the electronic device performs S403, S404b, and S405. As shown in FIG. 5B(a), the electronic device may perform drawing I and rendering I in response to a vertical synchronization signal 1 at a moment $t_{3\_1}$. The electronic device may perform image frame composition I in response to a vertical synchronization signal 2 at a moment $t_{4\_1}$, that is, perform layer composition on the one or more layers I obtained after the electronic device performs drawing I and rendering I, to obtain the image frame I. In response to a vertical synchronization signal 3 at a moment $t_5$, the electronic device may perform image frame display I to refresh and display the image frame I.

Application scenario (2): The foregoing one or more applications may include a plurality of applications. In this case, the foregoing one or more layers are layers drawn by the electronic device by executing drawing tasks corresponding to a plurality of applications. For example, the electronic device may display interfaces of the plurality of applications through screen split. In this case, the electronic device may separately execute the drawing tasks corresponding to the plurality of applications, and draw (draw and render) one or more layers for each application in the plurality of applications. That is, the electronic device may perform S301 or S403 for each application in the plurality of applications to draw (draw and render) one or more corresponding layers. Then, the electronic device may perform S302 and S404b to perform layer composition on the one or more layers separately drawn for the plurality of applications. In this case, in S302 and S404b, the one or more drawn layers may include layers obtained by the electronic device by executing the drawing tasks corresponding to the plurality of applications.

For example, the plurality of applications are two applications (including an application II and an application III). The electronic device may perform S301 or S403 for the application II to obtain one or more drawn layers II, and perform S301 or S403 for the application III to obtain one or more drawn layers III. Then, the electronic device may perform S302 and S404b to perform layer composition on the one or more layers II and the one or more layers III, to obtain an image frame II.

For example, the electronic device performs S403, S404b, and S405. As shown in FIG. 5B(b), in response to a vertical synchronization signal 1 at a moment $t_{3\_1}$, the electronic device may perform drawing II and rendering II for the application II to obtain the one or more layers II, and perform drawing III and rendering III for the application III to obtain the one or more layers III. The electronic device may perform image frame composition II+III in response to a vertical synchronization signal 2 at a moment $t_{4\_1}$, that is, perform layer composition on the one or more layers II obtained after the electronic device performs drawing II and rendering II and the one or more layers III obtained after the electronic device performs drawing III and rendering III, to obtain the image frame II. In response to a vertical synchronization signal 3 at a moment $t_5$, the electronic device may perform image frame display II+III to refresh and display the image frame II. It should be noted that "image frame composition II+III" shown in FIG. 5B(b) represents one time of layer composition. The electronic device also performs "image frame display II+III" to refresh and display one frame of image.

It may be learned from the foregoing descriptions that the method in this embodiment of this application may be applied to a scenario in which the electronic device displays an interface of an application in a single window, and may also be applied to a scenario in which the electronic device displays interfaces of a plurality of applications in a multi-window (for example, a split screen). For example, the method in this embodiment of this application may be applied to a scenario in which the electronic device displays a multi-window in a landscape mode, and may also be applied to a scenario in which an electronic device with a foldable screen displays interfaces of a plurality of applications in a multi-window. Details of a method for displaying the interface of the application by the electronic device in the single window or the multi-window are not described in this embodiment of this application.

It should be noted that, in the following embodiments, an example in which the electronic device performs the method in this embodiment of this application for one application is used for description. However, it does not indicate that in the method provided in this embodiment of this application, the electronic device cannot simultaneously perform layer drawing, rendering, and composition, and image frame display for a plurality of applications.

Embodiment 3

A principle and an effect of shortening a response delay of the electronic device in Embodiment 1 are analyzed in this embodiment.

In this embodiment of this application, with reference to FIG. 5A(a) and FIG. 5A(b), the principle and the effect of shortening the response delay of the electronic device after the electronic device perform S402 and S404a are analyzed and described.

(1) An example in which the electronic device completes layer drawing and rendering in one synchronization period is used to describe the principle and the effect of shortening the response delay in this embodiment of this application.

Figure 6A:
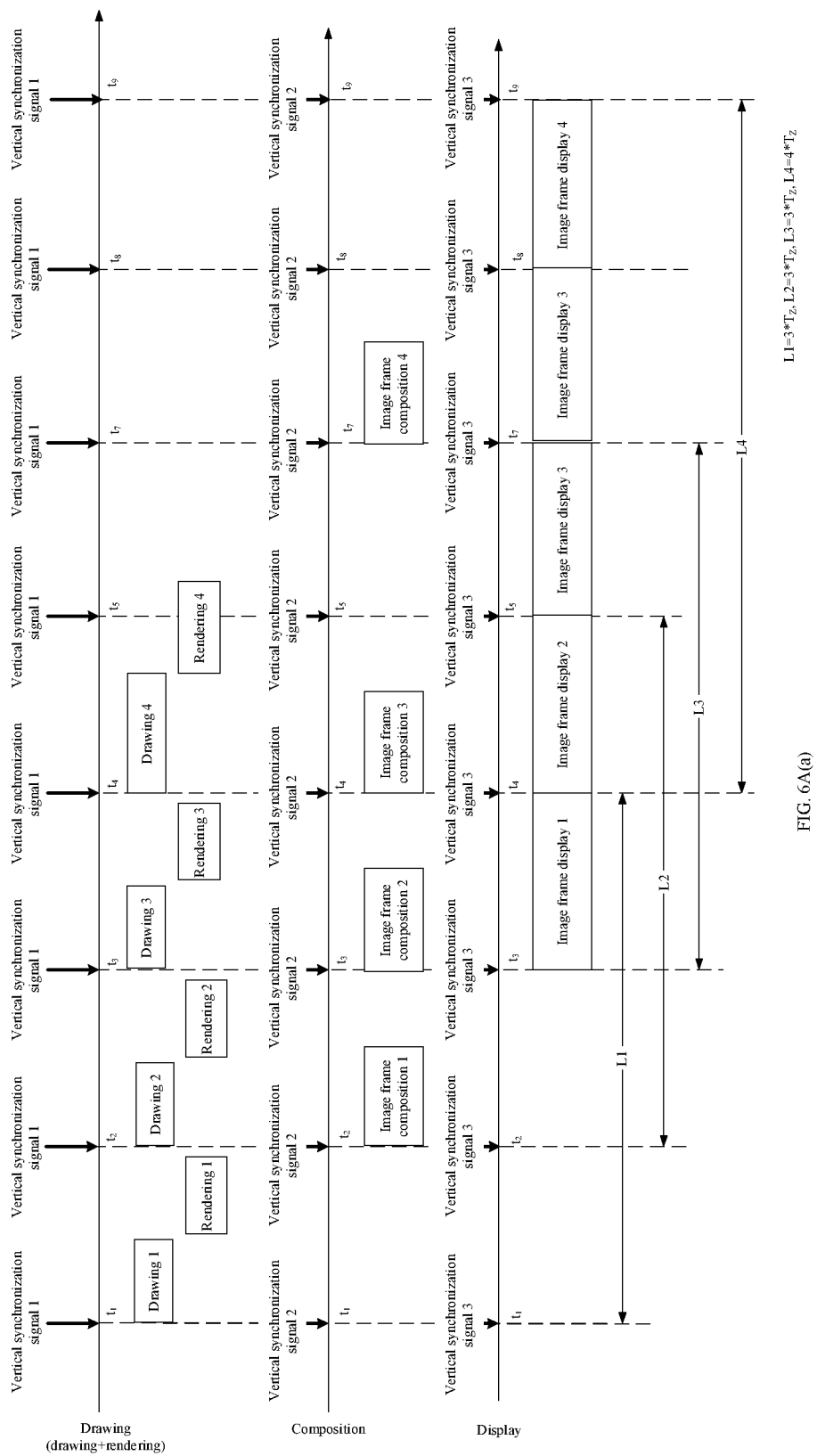
FIG. 6A(a) and FIG. 6A(b) are a schematic diagram of another vertical synchronization signal adjustment principle according to an embodiment of this application.
Figure 6A:
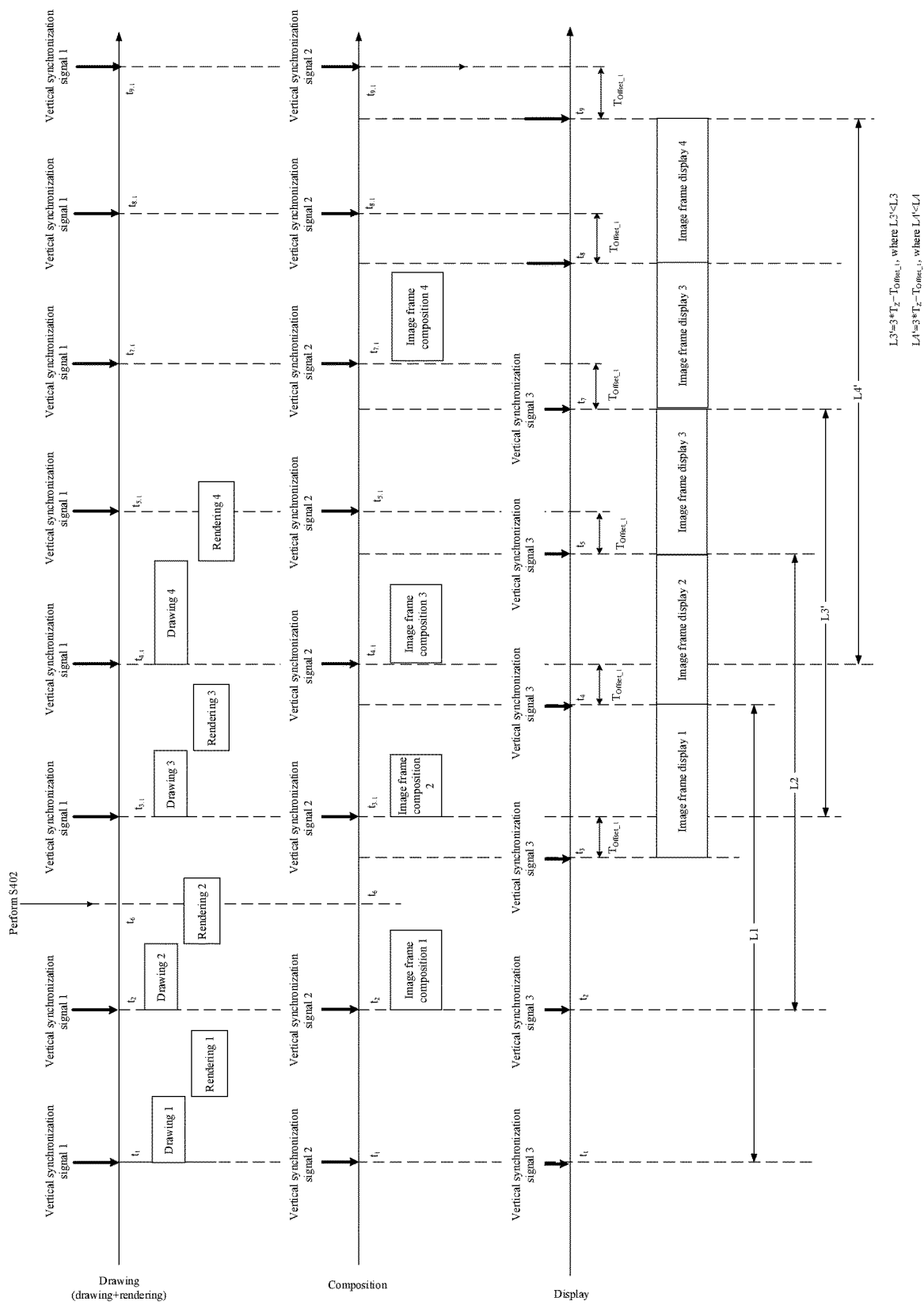

As shown in FIG. 6A(a), in response to a vertical synchronization signal 1 at a moment $t_3$, the electronic device (namely, a UI thread of the electronic device) may perform drawing 3 to draw one or more layers. Then, the electronic device (for example, a rendering thread of the electronic device) may perform rendering 3 to render the layer drawn by performing drawing 3. As shown in FIG. 6A(a), in response to a vertical synchronization signal 2 at a moment $t_4$, the electronic device (namely, a composition thread of the electronic device) may perform image frame composition 3, that is, perform layer composition on the layer obtained by performing drawing 3 and rendering 3, to obtain an image frame.

However, as shown in FIG. 6A(a), before S402 is performed, the electronic device (namely, an LCD of the electronic device) can perform image frame display 3 only in response to a vertical synchronization signal 3 at a moment $t_5$, to refresh and display the image frame obtained by performing image frame composition 3. In other words, as shown in FIG. 6A(a), the electronic device can only wait for arrival of the vertical synchronization signal 3 within time from a moment at which the electronic device completes image frame composition 3 to the moment $t_5$. As a result, a "composition delay" is additionally increased.

In the method in this embodiment of this application, as shown in FIG. 6A(b), the electronic device adjusts delay time of the vertical synchronization signal 1 and the vertical synchronization signal 2 relative to the vertical synchronization signal 3 at a moment $t_6$. Therefore, the electronic device performs drawing 3 and rendering 3 in response to a vertical synchronization signal 1 at a moment $t_{3\_1}$. The electronic device performs image frame composition 3 in response to a vertical synchronization signal 2 at a moment $t_{4\_1}$. The electronic device performs image frame display 3 in response to the vertical synchronization signal 3 at the moment $t_5$.

As shown in FIG. 6A(a), the electronic device can complete drawing 3, rendering 3, image frame composition 3, and image frame display 3 only within time (namely, L3, where $L3=3*T_Z$) from the moment $t_3$ to a moment $t_7$. As shown in FIG. 6A(b), the electronic device can complete drawing 3, rendering 3, image frame composition 3, and image frame display 3 within time (namely, L3', where $L3'=3*T_Z-T_{Offset\_1}$, and L3'<L3) from the moment $t_{3\_1}$ to the moment $t_7$. In other words, in the method in this embodiment of this application, the response delay of the electronic device can be shortened, and fluency of the electronic device can be improved.

(2) An example in which the electronic device cannot complete layer drawing and rendering in one synchronization period is used to describe the principle and the effect of shortening the response delay in this embodiment of this application.

In some cases, the electronic device may be unable to complete layer drawing and rendering in one synchronization period. For example, as shown in FIG. 6A(a), the electronic device may perform drawing 4 and rendering 4 in response to a vertical synchronization signal 1 at a moment $t_4$. However, the electronic device does not complete rendering 4 in a synchronization period from the moment $t_4$ to a moment $t_5$. Therefore, the electronic device does not perform image frame composition 4 at the moment $t_5$. As shown in FIG. 6A(a), the electronic device performs image frame composition 4 only in response to a vertical synchronization signal 2 at a moment $t_7$, that is, performs layer composition on a layer obtained by performing drawing 4 and rendering 4, to obtain an image frame. Finally, the electronic device can perform image frame display 4 only in response to a vertical synchronization signal 3 at a moment $t_8$, to refresh and display the image frame obtained by performing image frame composition 4. As shown in FIG. 6A(a), the electronic device can only wait for arrival of the vertical synchronization signal 3 within time from a moment at which the electronic device completes image frame composition 4 to the moment $t_8$. As a result, a "composition delay" is additionally increased.

In this case, in the method in this embodiment of this application, the "composition delay" that is additionally increased may also be shortened, to shorten the response delay of the electronic device and improve fluency of the electronic device. Specifically, as shown in FIG. 6A(b), the electronic device adjusts delay time of the vertical synchronization signal 1 and the vertical synchronization signal 2 relative to the vertical synchronization signal 3 at a moment $t_6$. Therefore, the electronic device performs drawing 4 and rendering 4 in response to a vertical synchronization signal 1 at a moment $t_{4\_1}$. The electronic device performs image frame composition 4 in response to a vertical synchronization signal 2 at a moment $t_{7\_1}$. The electronic device performs image frame display 4 in response to the vertical synchronization signal 3 at the moment $t_8$.

As shown in FIG. 6A(a), the electronic device can complete drawing 4, rendering 4, image frame composition 4, and image frame display 4 only within time (namely, L4, where $L4=4*T_Z$) from the moment $t_4$ to a moment $t_9$. As shown in FIG. 6A(b), the electronic device can complete drawing 4, rendering 4, image frame composition 4, and image frame display 4 within time (namely, L4', where $L4'=4*T_Z-T_{Offset\_1}$, and L4'<L4) from the moment $t_{4\_1}$ to the moment $t_9$. In other words, in the method in this embodiment of this application, the response delay of the electronic device can be shortened, and the fluency of the electronic device can be improved.

(3) An example in which the electronic device cannot complete layer composition in one synchronization period is used to describe the principle and the effect of shortening the response delay in this embodiment of this application.

Figure 6B:
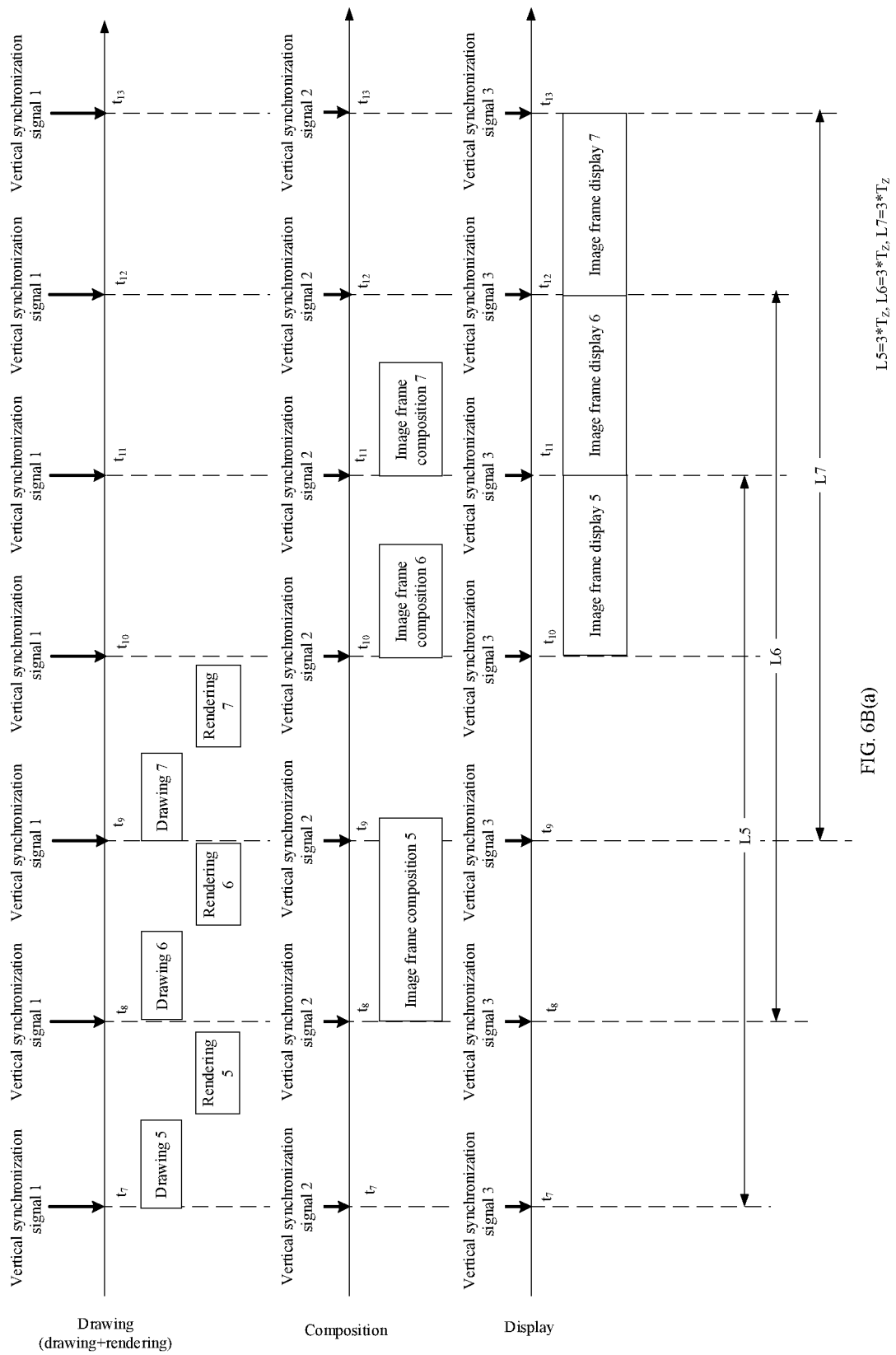
FIG. 6B(a) and FIG. 6B(b) are a schematic diagram of another vertical synchronization signal adjustment principle according to an embodiment of this application.
Figure 6B:
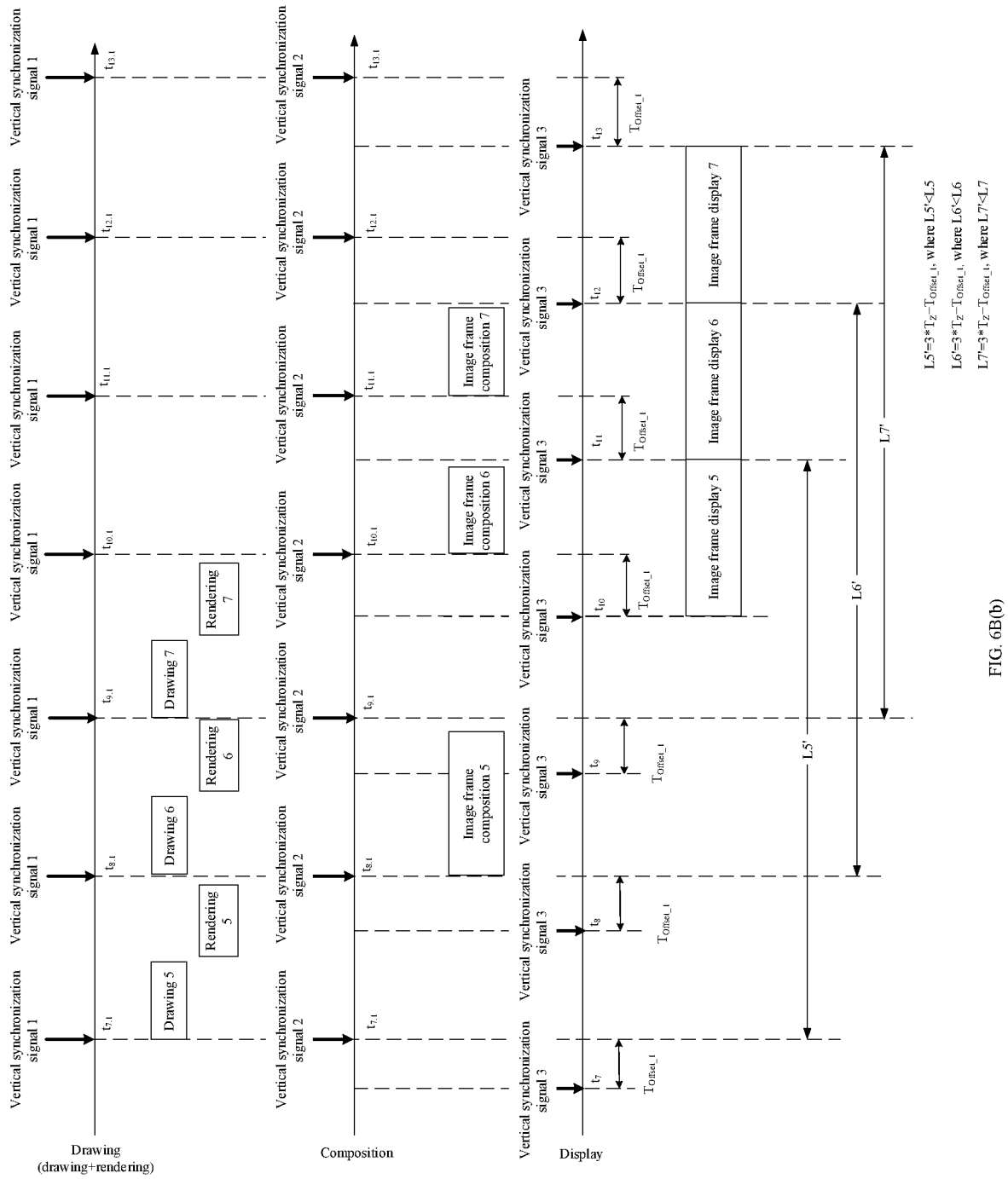

In some cases, the electronic device may be unable to complete layer composition (namely, image frame composition) in one synchronization period. For example, with reference to FIG. 6A(a), as shown in FIG. 6B(a), the electronic device may perform drawing 5 and rendering 5 in response to a vertical synchronization signal 1 at a moment $t_7$. The electronic device performs image frame composition 5 in response to a vertical synchronization signal 2 at a moment $t_8$. However, the electronic device does not complete image frame composition 5 in a synchronization period from the moment $t_8$ to a moment $t_9$. Therefore, the electronic device does not perform image frame display 5 at the moment $t_9$. As shown in FIG. 6B(a), the electronic device can perform image frame display 5 only in response to a vertical synchronization signal 3 at a moment $t_{10}$, to refresh and display an image frame obtained by performing image frame composition 5. As shown in FIG. 6B(a), the electronic device can only wait for arrival of the vertical synchronization signal 3 within time from a moment at which the electronic device completes image frame composition 5 to the moment $t_{10}$. As a result, a "composition delay" is additionally increased.

In this case, in the method in this embodiment of this application, the "composition delay" that is additionally increased may also be shortened, to shorten the response delay of the electronic device. Specifically, as shown in FIG. 6B(b), the electronic device adjusts delay time of the vertical synchronization signal 1 and the vertical synchronization signal 2 relative to the vertical synchronization signal 3 at the moment $t_6$ shown in FIG. 6A(b). Therefore, the electronic device performs drawing 5 and rendering 5 in response to a vertical synchronization signal 1 at a moment $t_{7\_1}$. The electronic device performs image frame composition 5 in response to a vertical synchronization signal 2 at a moment $t_{8\_1}$. The electronic device performs image frame display 5 in response to the vertical synchronization signal 3 at the moment $t_{10}$.

As shown in FIG. 6B(a), the electronic device can complete drawing 5, rendering 5, image frame composition 5, and image frame display 5 only within time (namely, L5, where $L5=4*T_Z$) from the moment $t_7$ to a moment $t_{11}$. As shown in FIG. 6B(b), the electronic device can complete drawing 5, rendering 5, image frame composition 5, and image frame display 5 within time (namely, L5', where $L5'=4*T_Z-T_{Offset\_1}$, and L5'<L5) from the moment $t_{7\_1}$ to the moment $t_{11}$. In other words, in the method in this embodiment of this application, the response delay of the electronic device can be shortened, and fluency of the electronic device can be improved.

It should be noted that, as shown in FIG. 6B(a), the electronic device does not complete image frame composition 5 at the moment $t_9$. Therefore, even if the electronic device has completed drawing 6 and rendering 6 at the moment $t_9$, the electronic device cannot perform image frame composition 6 in response to a vertical synchronization signal 2 at the moment $t_9$. Instead, after completing image frame composition 5, the electronic device performs image frame composition 6 in response to a vertical synchronization signal 2 at the moment $t_{10}$. In addition, even if the electronic device has completed drawing 7 and rendering 7 at the moment $t_{10}$, because the electronic device does not perform image frame composition 6, only after the electronic device performs image frame composition 6 in response to the vertical synchronization signal 2 at the moment $t_{10}$, the electronic device can perform image frame composition 7 in response to a vertical synchronization signal 2 at the moment $t_{11}$. In conclusion, the electronic device sequentially performs image frame composition on rendered layers in a sequence of completing layer rendering.

As shown in FIG. 6B(a), the electronic device can complete drawing 5, rendering 5, image frame composition 5, and image frame display 5 only within the time (namely, L5, where $L5=4*T_Z$) from the moment $t_7$ to the moment $t_{11}$. The electronic device can complete drawing 6, rendering 6, image frame composition 6, and image frame display 6 only within time (namely, L6, where $L6=4*T_Z$) from the moment $t_8$ to a moment $t_{12}$. The electronic device can complete drawing 7, rendering 7, image frame composition 7, and image frame display 7 only within time (namely, L7, where $L7=4*T_Z$) from the moment $t_9$ to a moment $t_{13}$. However, as shown in FIG. 6B(b), the electronic device can complete drawing 5, rendering 5, image frame composition 5, and image frame display 5 within the time (namely, L5', where $L5'=4*T_Z-T_{Offset\_1}$, and $L5'<L5$) from the moment $t_{7.1}$ to the moment $t_{11}$. The electronic device can complete drawing 6, rendering 6, image frame composition 6, and image frame display 6 within time (namely, L6', where $L6'=4*T_Z-T_{Offset\_1}$, and $L6'<L6$) from the moment $t_{8.1}$ to the moment $t_{12}$. The electronic device and can complete drawing 7, rendering 7, image frame composition 7, and image frame display 7 within time (namely, L7', where $L7'=4*T_Z-T_{Offset\_1}$, and $L7'<L7$) from a moment $t_{9.1}$ to the moment $t_{13}$. In other words, in the method in this embodiment of this application, the response delay of the electronic device can be shortened, and the fluency of the electronic device can be improved.

It should be noted that in this embodiment of this application, the vertical synchronization signal 1 and the vertical synchronization signal 2 are adjusted to shorten the response delay of the electronic device. This does not additionally increase power consumption of the electronic device, and does not additionally increase load of the electronic device. In conclusion, in the method in this embodiment of this application, the response delay of the electronic device can be shortened and the fluency of the electronic device can be improved without increasing the load of the electronic device.

Embodiment 4

In this embodiment, a specific method for adjusting a vertical synchronization signal by the electronic device to shorten a touch response delay of the electronic device in Embodiment 1 is described.

For example, the electronic device may adjust the vertical synchronization signal by using methods corresponding to the following Implementation (1) and Implementation (2), to shorten the touch response delay of the electronic device.

Implementation (1): The electronic device adjusts a vertical synchronization signal 1 and/or a vertical synchronization signal 2, so that the vertical synchronization signal 1 and the vertical synchronization signal 2 are delayed by first delay time relative to a vertical synchronization signal 3.

The electronic device may delay arrival moments of the vertical synchronization signal 1 and the vertical synchronization signal 2, so that the vertical synchronization signal 1 and the vertical synchronization signal 2 are delayed by the first delay time relative to the vertical synchronization signal 3. Certainly, the electronic device may alternatively advance arrival moments of the vertical synchronization signal 1 and the vertical synchronization signal 2, so that the vertical synchronization signal 1 and the vertical synchronization signal 2 are delayed by the first delay time relative to the vertical synchronization signal 3.

An example in which the electronic device delays the arrival moment of the vertical synchronization signal 1 is used in this embodiment of this application to describe the method in Implementation (1). For example, as shown in FIG. 6A(a), before the electronic device adjusts the vertical synchronization signal, the vertical synchronization signal 1, the vertical synchronization signal 2, and the vertical synchronization signal 3 may all arrive at a moment $t_3$, a moment $t_4$, and a moment $t_5$. As shown in FIG. 6A(b), after the electronic device adjusts the vertical synchronization signal, the vertical synchronization signal 3 may arrive at the moment $t_3$, the moment $t_4$, and the moment $t_5$. However, the vertical synchronization signal 1 and the vertical synchronization signal 2 may arrive at a moment $t_{3.1}$, a moment $t_{4.1}$, a moment $t_{5.1}$, and a moment $t_{7.1}$. The moment $t_{3.1}$ is delayed by $T_{Offset\_1}$ relative to the moment $t_3$, the moment $t_{4.1}$ is delayed by $T_{Offset\_1}$ relative to the moment $t_4$, the moment $t_{5.1}$ is delayed by $T_{Offset\_1}$ relative to the moment $t_5$, and the moment $t_{7.1}$ is delayed by $T_{Offset\_1}$ relative to a moment $t_7$.

Implementation (2): The electronic device may adjust a vertical synchronization signal 3, so that a vertical synchronization signal 1 and a vertical synchronization signal 2 are delayed by first delay time relative to the vertical synchronization signal 3.

For example, the electronic device may advance an arrival moment of the vertical synchronization signal 3, so that the vertical synchronization signal 1 and the vertical synchronization signal 2 are delayed by the first delay time relative to the vertical synchronization signal 3.

Figure 7A:
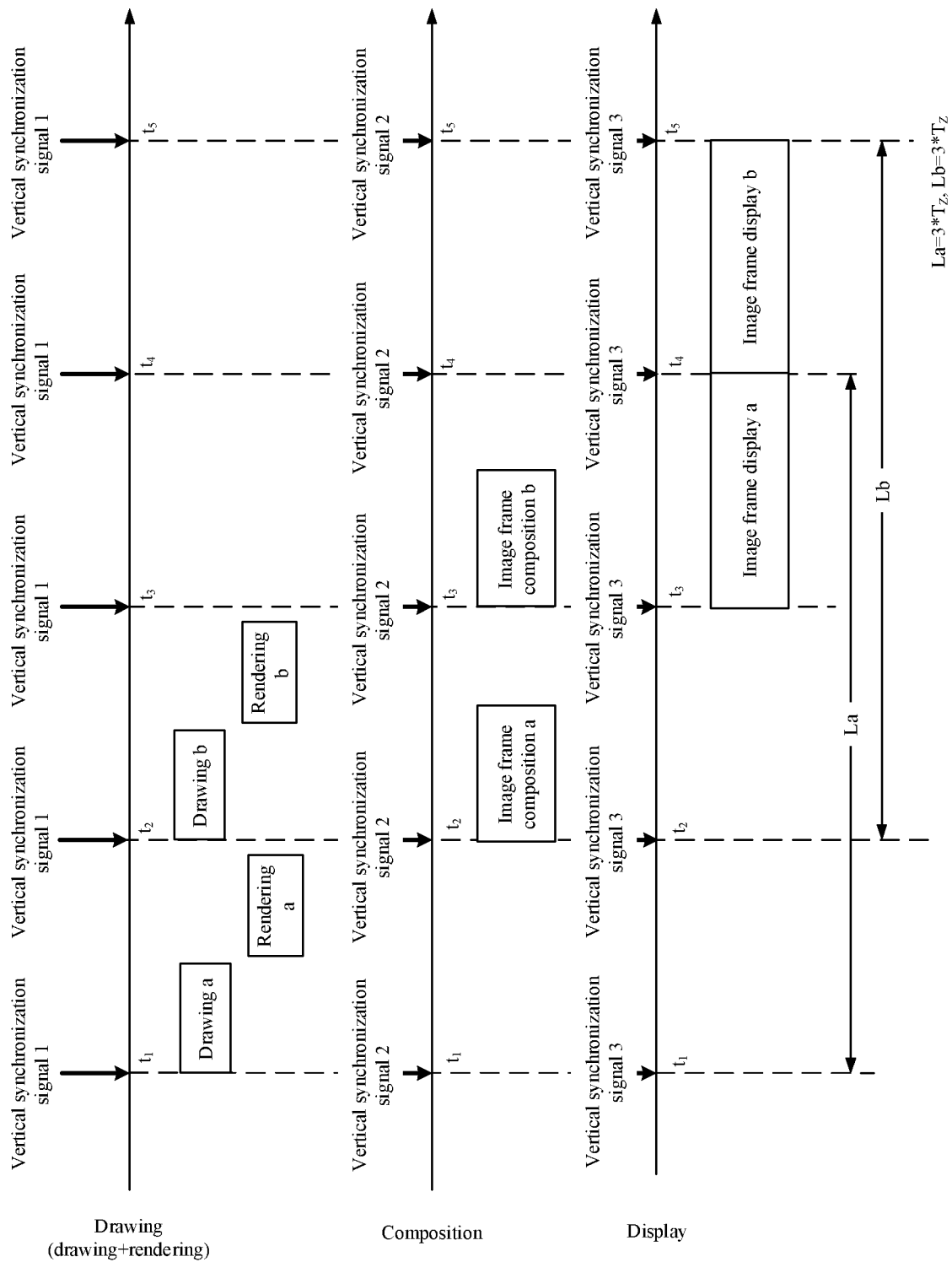
FIG. 7A(a) and FIG. 7A(b) are a schematic diagram of another vertical synchronization signal adjustment principle according to an embodiment of this application.
Figure 7A:
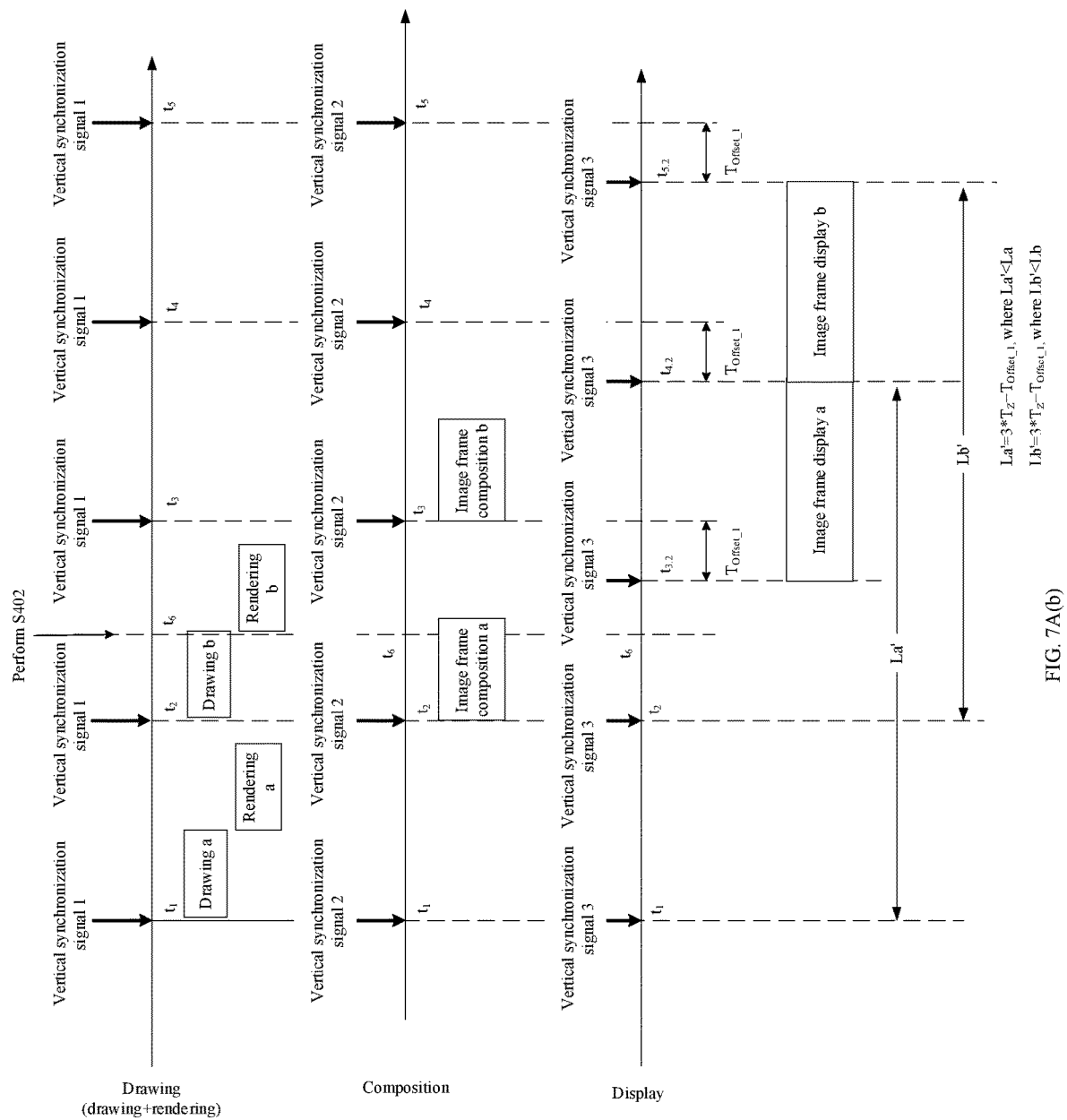

For example, as shown in FIG. 7A(a), before the electronic device adjusts delay time, the vertical synchronization signal 1, the vertical synchronization signal 2, and the vertical synchronization signal 3 may arrive all at a moment $t_3$, a moment $t_4$, and a moment $t_5$. As shown in FIG. 7A(b), after the electronic device adjusts the delay time, both the vertical synchronization signal 1 and the vertical synchronization signal 2 may arrive at the moment $t_3$, the moment $t_4$, and the moment $t_5$, but the vertical synchronization signal 3 arrives at a moment $t_{3.2}$, a moment $t_{4.2}$, and a moment $t_{5.2}$. The moment $t_{3.2}$ is advanced by $T_{Offset\_1}$ relative to the moment $t_3$, the moment $t_{4.2}$ is advanced by $T_{Offset\_1}$ relative to the moment $t_4$, and the moment $t_{5.2}$ is advanced by $T_{Offset\_1}$ relative to the moment $t_5$.

As shown in FIG. 7A(a) or FIG. 7A(b), a vertical synchronization signal 1 arrives at a moment $t_1$. In response to the vertical synchronization signal 1 at the moment $t_1$, the electronic device (namely, a UI thread of the electronic device) may perform drawing a to draw one or more layers. Then, the electronic device (for example, a rendering thread of the electronic device) may perform rendering a to render the layer drawn by performing drawing a.

As shown in FIG. 7A(a) or FIG. 7A(b), a vertical synchronization signal 2 arrives at a moment $t_2$. In response to the vertical synchronization signal 2 at the moment $t_2$, the electronic device (namely, a composition thread of the electronic device) may perform image frame composition a, that is, perform layer composition on the layer obtained by performing drawing a and rendering a, to obtain an image frame.

However, as shown in FIG. 7A(a), before S402 is performed, the electronic device (namely, an LCD of the electronic device) can perform image frame display a only in response to the vertical synchronization signal 3 at the moment $t_3$, to refresh and display the image frame obtained by performing image frame composition a. In other words, as shown in FIG. 7A(a), the electronic device can only wait for arrival of the vertical synchronization signal 3 within time from a moment at which image frame composition a is completed to the moment $t_3$. As a result, a "composition delay" is additionally increased.

In the method in this embodiment of this application, as shown in FIG. 7A(b), the electronic device adjusts the delay time of the vertical synchronization signal 1 and the vertical synchronization signal 2 relative to the vertical synchronization signal 3 at a moment $t_6$. Therefore, the vertical synchronization signal 3 may arrive at the moment $t_{3.2}$ after the moment $t_6$. The electronic device may perform image frame display a in response to the vertical synchronization signal 3 at the moment $t_{3.2}$, to refresh and display the image frame obtained by performing image frame composition a.

As shown in FIG. 7A(a), the electronic device can complete drawing a, rendering a, image frame composition a, and image frame display a only within time (namely, La, where $La=3*T_Z$) from the moment $t_1$ to the moment $t_4$. As shown in FIG. 7A(b), the electronic device can complete drawing a, rendering a, image frame composition a, and image frame display a within time (namely, La', where $La'=3*T_Z-T_{Offset\_1}$, and La'<La) from the moment $t_1$ to the moment $t_{4.2}$. Similarly, as shown in FIG. 7A(a), the electronic device can complete drawing b, rendering b, image frame composition b, and image frame display b only within time (namely, Lb, where $Lb=3*T_Z$) from the moment $t_2$ to the moment $t_5$. As shown in FIG. 7A(b), the electronic device can complete drawing b, rendering b, image frame composition b, and image frame display b within time (namely, Lb', where $Lb'=3*T_Z-T_{Offset\_1}$, and Lb'<Lb) from the moment $t_2$ to the moment $t_{5.2}$. In conclusion, in the method in this embodiment of this application, the response delay of the electronic device can be shortened, and fluency of the electronic device can be improved.

It should be noted that the electronic device advances the arrival moment of the vertical synchronization signal 3, so that the vertical synchronization signal 1 and the vertical synchronization signal 2 are delayed by the first delay time relative to the vertical synchronization signal 3. This can shorten the response delay of the electronic device. However, if the first delay time is relatively long, a vertical synchronization signal 3 may arrive when the electronic device does not complete refresh and display of a frame of image. In response to the vertical synchronization signal 3, the electronic device needs to refresh and display a new frame of image. Consequently, a picture displayed on the electronic device is torn, and user visual experience is affected.

Figure 7B:
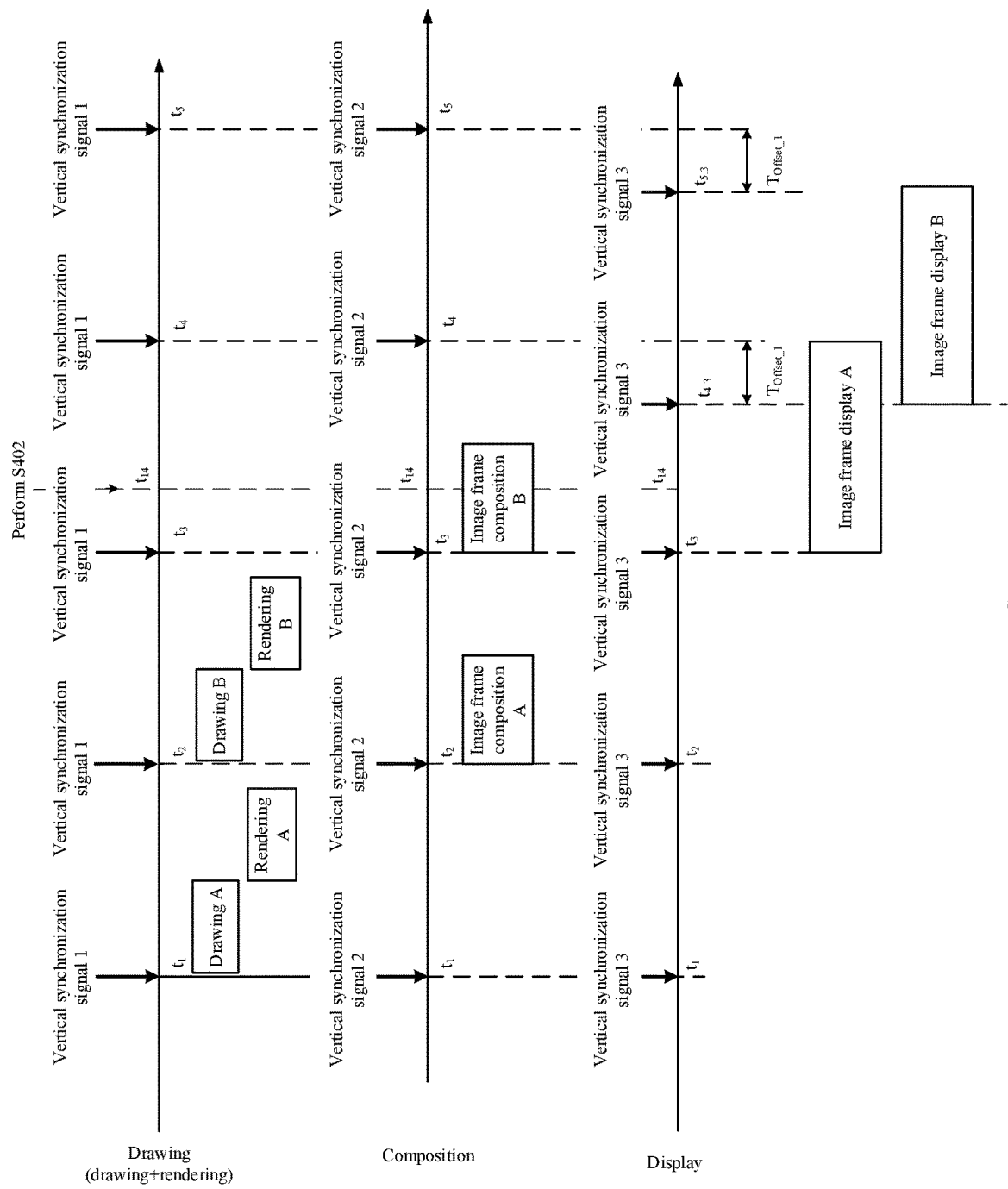
FIG. 7B is a schematic diagram of another vertical synchronization signal adjustment principle according to an embodiment of this application.

For example, as shown in FIG. 7B, it is assumed that the electronic device advances the arrival moment of the vertical synchronization signal 3 by $T_{Offset\_1}$ at a moment $t_{14}$. That is, a moment $t_{4.3}$ is advanced by $T_{Offset\_1}$ relative to the moment $t_4$, and a moment $t_{5.3}$ is advanced by $T_{Offset\_1}$ relative to the moment $t_5$. In this case, as shown in FIG. 7B, the electronic device performs image frame display A in response to the vertical synchronization signal 3 at the moment $t_3$, to refresh and display an image frame A. However, the electronic device advances the arrival moment of the vertical synchronization signal 3 by $T_{Offset\_1}$ at the moment $t_{14}$. Therefore, a vertical synchronization signal 3 arrives at the moment $t_{4.3}$. The electronic device performs image frame display B in response to the vertical synchronization signal 3 at the moment $t_{4.3}$, to refresh and display an image frame B. However, the electronic device does not complete display of the image frame A at the moment $t_{4.3}$. Consequently, a picture displayed on the electronic device is torn, and user visual experience is affected.

For another example, the electronic device may delay an arrival moment of the vertical synchronization signal 3, so that the vertical synchronization signal 1 and the vertical synchronization signal 2 are delayed by the first delay time relative to the vertical synchronization signal 3.

A principle that the electronic device delays the arrival moment of the vertical synchronization signal 3 to shorten the response delay of the electronic device is similar to the principle that the electronic device advances the arrival moment of the vertical synchronization signal 3 to shorten the response delay of the electronic device in the foregoing embodiment. Details are not described again in this embodiment of this application.

It should be noted that the electronic device delays the arrival moment of the vertical synchronization signal 3, so that the vertical synchronization signal 1 and the vertical synchronization signal 2 are delayed by the first delay time relative to the vertical synchronization signal 3. This can shorten the response delay of the electronic device. However, a processing delay of a frame of image (namely, duration of the frame of image from layer drawing, rendering, and composition to image frame display) is also prolonged.

Figure 7C:
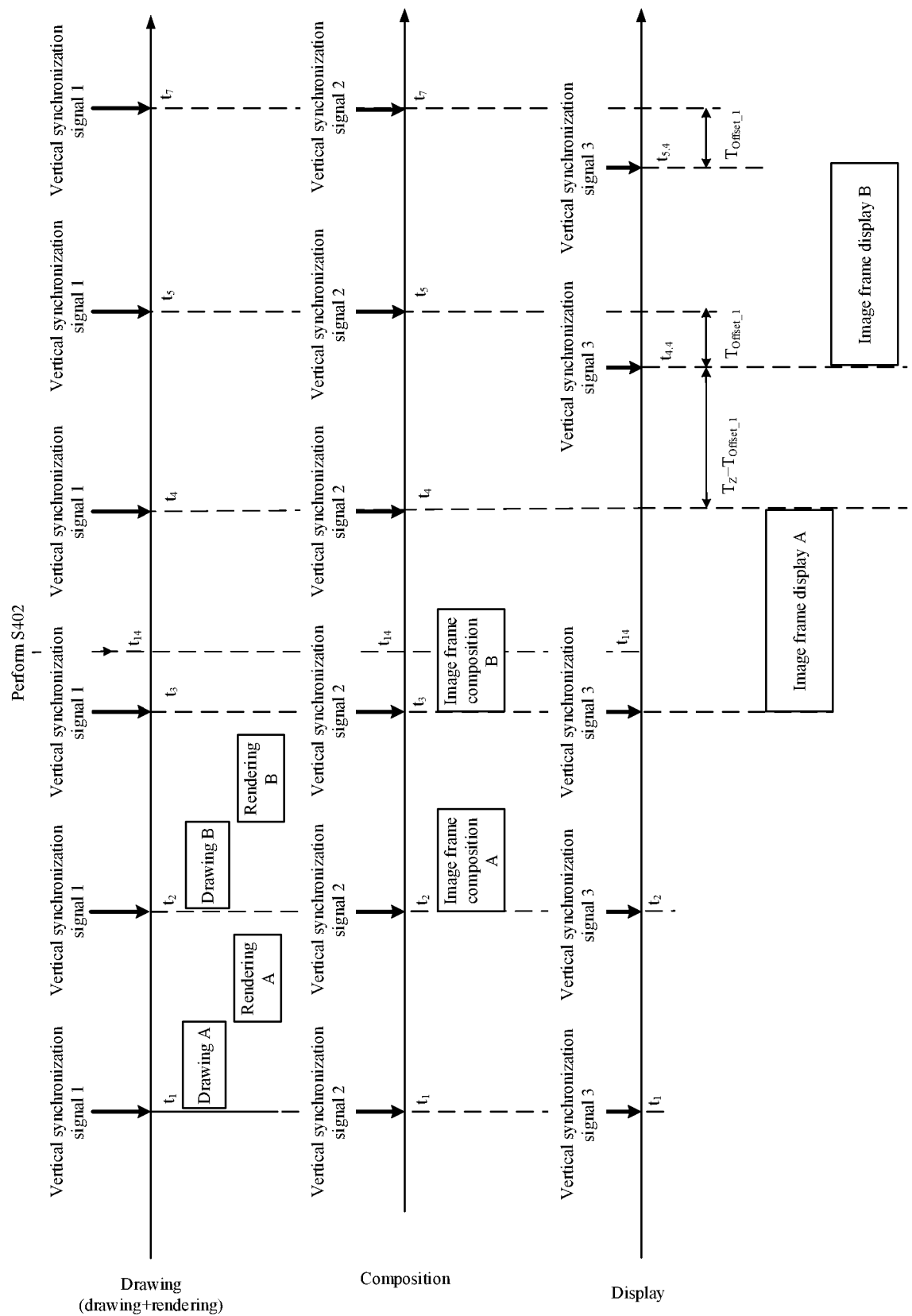
FIG. 7C is a schematic diagram of another vertical synchronization signal adjustment principle according to an embodiment of this application.

For example, as shown in FIG. 7C, it is assumed that the electronic device delays the arrival moment of the vertical synchronization signal 3 by $T_Z-T_{Offset\_1}$ at the moment $t_{14}$, so that the vertical synchronization signal 1 and the vertical synchronization signal 2 are later than the vertical synchronization signal by $T_{Offset\_1}$ in one synchronization period. A moment $t_{4.4}$ is advanced by $T_{Offset\_1}$ relative to the moment $t_5$, and a moment $t_{5.4}$ is advanced by $T_{Offset\_1}$ relative to the moment $t_7$.

As shown in FIG. 7C, after completing image frame composition B, the electronic device needs to wait for a vertical synchronization signal 3 at the moment $t_{4.4}$, and can perform image frame display B only in response to the vertical synchronization signal 3 at the moment $t_{4.4}$. The electronic device needs to wait for relatively long time to perform image frame display B, that is, a "composition delay" is additionally increased.

Embodiment 5

In this embodiment, an impact of a length of the first delay time in Embodiment 1 and Embodiment 2 on a length of a response delay of the electronic device is described by using test data.

A length of delay time (namely, the first delay time) of a vertical synchronization signal 1 and a vertical synchronization signal 2 relative to a vertical synchronization signal 3 affects a length of the response delay of the electronic device. For example, FIG. 7D is a run chart in which the response delay of the electronic device varies with the first delay time in a use scenario of a mobile phone (for example, a use scenario of a "contacts" application).

Figure 7D:
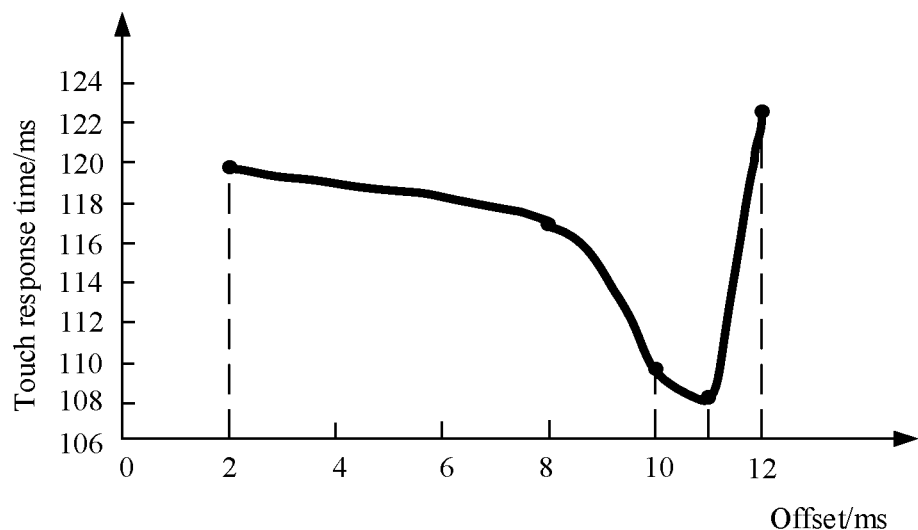
FIG. 7D is a schematic diagram of an example of a correspondence between touch response time and delay time according to an embodiment of this application.

As shown in FIG. 7D, when the delay time of the vertical synchronization signal 1 and the vertical synchronization signal 2 relative to the vertical synchronization signal 3 is 2 ms, that is, as shown in FIG. 7D, when offset=2 ms, touch response time of the electronic device is 120 ms. When the delay time of the vertical synchronization signal 1 and the vertical synchronization signal 2 relative to the vertical synchronization signal 3 is 8 ms, that is, when offset=8 ms, touch response time of the electronic device is 110 ms. When the delay time of the vertical synchronization signal 1 and the vertical synchronization signal 2 relative to the vertical synchronization signal 3 is 11 ms, that is, when offset=11 ms, touch response time of the electronic device is 108 ms. When the delay time of the vertical synchronization signal 1 and the vertical synchronization signal 2 relative to the vertical synchronization signal 3 is 12 ms, that is, when offset=12 ms, touch response time of the electronic device is 122 ms.

It may be learned from FIG. 7D that the touch response time of the mobile phone is gradually shortened as the offset (namely, the first delay time) increases within time starting from setting the offset to 2 ms to setting the offset to 11 ms. When the offset is set to 11 ms, the response delay of the mobile phone is the shortest. The touch response time of the mobile phone starts, only from setting the offset to 11 ms, to become longer as the offset (namely, the first delay time) increases.

It may be understood that if the offset is relatively large, a vertical synchronization signal 3 may arrive when the electronic device does not complete image frame composition performed in response to the vertical synchronization signal 2. In this case, the electronic device needs to wait for arrival of a next vertical synchronization signal 3 to refresh and display an image frame obtained through composition. As a result, the electronic device cannot refresh and display a new image frame in one synchronization period. Consequently, the touch response delay of the electronic device is prolonged by one synchronization period and increases greatly. For example, as shown in FIG. 7D, after the offset changes from 11 ms to 12 ms, the touch response delay of the mobile phone increases greatly.

In conclusion, the delay time of the vertical synchronization signal 1 and the vertical synchronization signal 2 relative to the vertical synchronization signal 3 is adjusted, so that the delay time by which the vertical synchronization signal 1 and the vertical synchronization signal 2 are later than the vertical synchronization signal 3 in one synchronization period falls within a specified range. This can shorten the response delay of the electronic device. It may be learned that, to shorten the response delay of the electronic device to a maximum degree, the length of the first delay time is particularly important.

Embodiment 6

An effect of shortening a response delay by the electronic device is further described in this embodiment.

Figure 8A:
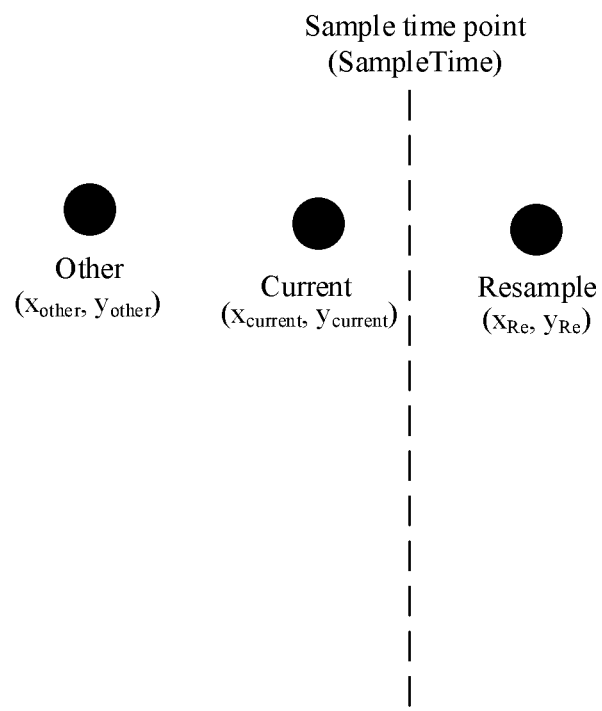
FIG. 8A is a schematic diagram of a principle of an interpolation algorithm according to an embodiment of this application.

In this embodiment of this application, a TP of the electronic device may perform touch point sampling by using an interpolation algorithm. Specifically, the electronic device periodically performs touch point sampling. A touch point sample period is the same as a signal period of a vertical synchronization signal 3. Then, as shown in FIG. 8A, in response to a vertical synchronization signal 1, the electronic device may select a touch point closest to a sample time point (namely, SampleTime) as a current point, select a touch point prior to the current point as an "other" point, and perform interpolation calculation based on the current point and the "other" point, to obtain a resample (resample) point (namely, an interpolation point). In other words, the electronic device may predict a to-be-sampled touch point (namely, the resample point) in response to the vertical synchronization signal 1. Then, the electronic device performs layer drawing and rendering for the resample point. The electronic device may calculate coordinates of the resample point by using the following formula (5):

$$x_{Re} = x_{current} + \text{alpha} * (x_{other} - x_{current})$$

$$y_{Re} = y_{current} \pm \text{alpha} * (y_{other} - y_{current}) \quad \text{formula (5)}$$

Coordinates of the current point are $(x_{current}, y_{current})$, coordinates of the "other" point are $(x_{other}, y_{other})$, and the coordinates of the resample point are $(x_{Re}, y_{Re})$, where $\text{alpha} = (t_{current} - t_{Sample})/(t_{Sample} - t_{other})$, $t_{current}$ is a time point at which the TP collects the current point, $t_{other}$ is a time point at which the TP collects the "other" point, and $t_{Sample}$ is the sample time point of the TP.

In this embodiment of this application, a principle of shortening the response delay of the electronic device in this embodiment of this application is described with reference to an example in which the electronic device performs touch point sampling by using the interpolation algorithm. With reference to FIG. 6A(a) and FIG. 6A(b), as shown in FIG. 8B(1) and FIG. 8B(2) or FIG. 8C(1) and FIG. 8C(2), it is assumed that in a sample period from a moment $t_2$ to a moment $t_3$, the TP collects two touch points: a touch point A and a touch point B.

Referring to FIG. 8B(1) and FIG. 8B(2), before the method in this embodiment of this application is performed, in response to a vertical synchronization signal 3 at the moment $t_3$, the electronic device may select the touch point B closest to a sample time point (namely, the moment $t_3$) as a current point, select the touch point A prior to the current point as an "other" point, and perform interpolation calculation based on the touch point B and the touch point A by using the foregoing formula (5), to obtain an Re1 point (namely, a resample point). As shown in FIG. 8B(1) and FIG. 8B(2), in response to a vertical synchronization signal 3 at a moment $t_4$, the electronic device may select a touch point D closest to a sample time point (namely, the moment $t_4$) as a current point, select a touch point C prior to the current point as an "other" point, and perform interpolation calculation based on the touch point D and the touch point C by using the foregoing formula (5), to obtain an Re2 point (namely, a resample point). As shown in FIG. 8B(1) and FIG. 8B(2), in response to a vertical synchronization signal 3 at a moment $t_5$, the electronic device may select a touch point F closest to a sample time point (namely, the moment $t_5$) as a current point, select a touch point E prior to the current point as an "other" point, and perform interpolation calculation based on the touch point F and the touch point E by using the foregoing formula (5), to obtain an Re3 point (namely, a resample point). As shown in FIG. 8B(1) and FIG. 8B(2), in response to a vertical synchronization signal 3 at a moment $t_6$, the electronic device may select a touch point H closest to a sample time point (namely, the moment $t_6$) as a current point, select a touch point G prior to the current point as an "other" point, and perform interpolation calculation based on the touch point H and the touch point G by using the foregoing formula (5), to obtain an Re4 point (namely, a resample point).

In this way, before the method in this embodiment of this application is performed, the touch response delay of the electronic device is from a moment at which a user inputs the foregoing resample point (for example, the Re1 point, the Re2 point, the Re3 point, or the Re4 point) to a moment at which an image frame is displayed, for example, as shown in FIG. 8B(1) and FIG. 8B(2), from the moment $t_3$ to a moment $t_7$ or from the moment $t_4$ to a moment $t_8$.

Referring to FIG. 8C(2), after the method in this embodiment of this application is performed, the vertical synchronization signal 1 is delayed by $T_{Offset\_1}$. The electronic device may collect a new touch point within $T_{Offset\_1}$ by which the vertical synchronization signal 1 is delayed. For example, as shown in FIG. 8C(1), the electronic device collects a touch point C within time (namely, $T_{Offset\_1}$) from a moment $t_3$ to a moment $t_{3.1}$. The electronic device collects a touch point E within time (namely, $T_{Offset\_1}$) from a moment $t_4$ to a moment $t_{4.1}$. The electronic device collects a touch point G within time (namely, $T_{Offset\_1}$) from a moment is to a moment $t_{5.1}$. The electronic device collects a touch point I within time (namely, $T_{Offset\_1}$) from a moment $t_7$ to a moment $t_{7.1}$.

In this embodiment of this application, the electronic device may perform interpolation calculation in response to the adjusted vertical synchronization signal 1, to obtain a resample point. The electronic device may draw one or more layers for the resample point. The electronic device may perform interpolation calculation by using the foregoing interpolation algorithm, to obtain the resample point. Specifically, in response to the adjusted vertical synchronization signal 1, the electronic device may perform interpolation calculation based on a touch point (which is used a current point) closest to an arrival moment of the vertical synchronization signal 1 by using the foregoing interpolation algorithm, to obtain the resample point.

For example, as shown in FIG. 8C(1) and FIG. 8C(2), in response to a vertical synchronization signal 1 at the moment $t_{3.1}$, the electronic device may select the touch point C closest to the moment $t_{3.1}$ as a current point, select a touch point B prior to the current point as an "other" point, and perform interpolation calculation based on the touch point C and the touch point B by using the foregoing formula (5), to obtain an Re1' point (namely, a resample point). For another example, as shown in FIG. 8C(1) and FIG. 8C(2), in response to a vertical synchronization signal 1 at the moment $t_{4.1}$, the electronic device may select the touch point E closest to the moment $t_{4.1}$ as a current point, select a touch point D prior to the current point as an "other" point, and perform interpolation calculation based on the touch point E and the touch point D by using the foregoing formula (5), to obtain an Re2' point (namely, a resample point). For another example, as shown in FIG. 8C(1) and FIG. 8C(2), in response to a vertical synchronization signal 1 at the moment $t_{5.1}$, the electronic device may select the touch point G closest to the moment $t_{5.1}$ as a current point, select a touch point F prior to the current point as an "other" point, and perform interpolation calculation based on the touch point G and the touch point F by using the foregoing formula (5), to obtain an Re3' point (namely, a resample point). For another example, as shown in FIG. 8C(1) and FIG. 8C(2), in response to a vertical synchronization signal 1 at the moment $t_{7.1}$, the electronic device may select the touch point G closest to the moment $t_{7.1}$ as a current point, select the touch point I prior to the current point as an "other" point, and perform interpolation calculation based on the touch point I and the touch point H by using the foregoing formula (5), to obtain an Re4' point (namely, a resample point).

In this way, after the method in this embodiment of this application is performed, the touch response delay of the electronic device is from a moment of the foregoing resample point (for example, the Re1' point, the Re2' point, the Re3' point, or the Re4' point) to a moment at which an image frame is displayed, for example, as shown in FIG. 8C(1) and FIG. 8C(2), from the moment $t_{3.1}$ to the moment $t_7$ or from the moment $t_{4.1}$ to a moment $t_8$.

Through comparison between FIG. 8B(1) and FIG. 8B(2) and FIG. 8C(1) and FIG. 8C(2), the following describes a principle of shortening the touch response delay of the electronic device and improving fluency of the electronic device in the method provided in this embodiment of this application.

As shown in FIG. 8B(1) and FIG. 8B(2), it is assumed that in response to a sliding operation of the user from the touch point A to the touch point H through the touch point B, the touch point C, the touch point D, the touch point E, the touch point F, and the touch point G, the electronic device may display an image of a smiley icon that is shown in FIG. 8B(1) and that moves with the sliding operation.

When a user finger slides to a location (namely, a location corresponding to a user finger (3)) between the touch point F and the touch point G at the moment is shown in FIG. 8B(1), the electronic device may display a smiley face (3) at a location corresponding to the resample Re1 point in response to a touch operation at the Re1 point. In this case, the electronic device performs image frame display 3 shown in FIG. 8B(2). As shown in FIG. 8B(1), a difference between the location of the user finger (3) and a location of the smiley face (3) is $\Delta S_X$.

When the user finger slides, at the moment $t_7$ shown in FIG. 8B(1), to the sample Re4 point (namely, a location corresponding to a user finger (4)) that is predicted based on the touch point H and the touch point G by using the interpolation algorithm, the electronic device may display a smiley face (4) at a location corresponding to the resample Re2 point in response to a touch operation at the Re2 point. In this case, the electronic device performs image frame display 4 shown in FIG. 8B(2). As shown in FIG. 8B(1), a difference between the location of the user finger (4) and a location of the smiley face (4) is $\Delta S_X$.

It should be noted that in FIG. 8B(1), the electronic device starts to display the smiley face (3) at the location corresponding to the Re1 point from the moment $t_5$, and the electronic device may display the smiley face (3) at the location corresponding to the Re1 point within time from the moment is to the moment $t_7$. In FIG. 8B(1), the electronic device starts to display the smiley face (4) at the location corresponding to the Re2 point from the moment $t_7$, and the electronic device may display the smiley face (4) at the location corresponding to the Re2 point within time from the moment $t_7$ to the moment $t_8$.

As shown in FIG. 8C(1) and FIG. 8C(2), it is assumed that in response to a sliding operation of the user from the touch point A to the touch point I through the touch point B, the touch point C, the touch point D, the touch point E, the touch point F, and the touch point G, the electronic device may display an image of a smiley icon that is shown in FIG. 8C(1) and that moves with the sliding operation.

When a user finger slides to a location (namely, a location corresponding to a user finger (3)) between the touch point F and the touch point G at the moment is shown in FIG. 8C(1), the electronic device may display a smiley face (3) at a location corresponding to the resample Re1' point in response to a touch operation at the Re1' point. In this case, the electronic device performs image frame display 3 shown in FIG. 8C(2). As shown in FIG. 8C(1), a difference between the location of the user finger (3) and a location of the smiley face (3) is $\Delta S_Y$.

When the user finger slides to a location (namely, a location corresponding to a user finger (4)) between the touch point H and the touch point I at the moment $t_7$ shown in FIG. 8C(1), the electronic device may display a smiley face (4) at a location corresponding to the resample Re2' point in response to a touch operation at the Re2' point. In this case, the electronic device performs image frame display 4 shown in FIG. 8C(2). As shown in FIG. 8C(1), a difference between the location of the user finger (4) and a location of the smiley face (4) is $\Delta S_Y$.

It should be noted that in FIG. 8C(1), the electronic device starts to display the smiley face (3) at the location corresponding to the Re1' point from the moment $t_5$, and the electronic device may display the smiley face (3) at the location corresponding to the Re1' point within time from the moment is to the moment $t_7$. In FIG. 8C(1), the electronic device starts to display the smiley face (4) at the location corresponding to the Re2' point from the moment $t_7$, and the electronic device may display the smiley face (4) at the location corresponding to the Re2' point within time from the moment $t_7$ to the moment $t_8$.

$\Delta S_Y$ shown in FIG. 8C(1) is less than $\Delta S_X$ shown in FIG. 8B(1). In other words, compared with the solution shown in FIG. 8B(1) and FIG. 8B(2), in the solution shown in FIG. 8C(1) and FIG. 8C(2), the electronic device may quickly respond to the touch operation of the user. In other words, in the method in this embodiment of this application, the touch response delay of the electronic device can be shortened, and the fluency of the electronic device can be improved.

It should be noted that in a process of using the electronic device, most touch operations performed by the user on a touchscreen are sliding touch operations. In this scenario, that the TP collects the sliding touch operation is a continuous process. Therefore, in the process in which the TP collects the sliding touch operation, even if the touch point C is not collected in a previous synchronization period, the touch point C may be collected in one or more subsequent synchronization periods. From a statistical perspective, a gain of shortening the touch response delay by the electronic device becomes relatively linear.

Embodiment 7

In this embodiment, a method for determining the first delay time in any one of the foregoing embodiments by the electronic device is described by using the following Implementation (I) and Implementation (II).

Implementation (I): The first delay time $T_{Offset\_1}$ is preset duration. In other words, the first delay time is fixed duration that is set on the electronic device.

Implementation (II): The first delay time is preset delay time corresponding to a foreground application.

A plurality of applications may be installed on the electronic device. For example, a plurality of applications such as a game application, an instant messaging application, a video application, a contacts application, a messages application, a calendar application, a phone application, and a photo application may be installed on the electronic device. In this embodiment of this application, preset delay time corresponding to each application in the plurality of applications may be prestored on the electronic device. Each application corresponds to a piece of preset delay time. Preset delay time corresponding to different applications may be different. The foreground application is an application corresponding to an interface currently displayed on the electronic device.

It may be understood that when the electronic device runs different applications in foreground, time (namely, an SF frame length) required for performing layer composition is different. Therefore, fixed preset delay time may be set for each application. A larger SF frame length required when the electronic device runs an application in foreground indicates shorter preset delay time corresponding to the application. A smaller SF frame length required when the electronic device runs an application in foreground indicates longer preset delay time corresponding to the application.

In an aspect, because load existing when the electronic device runs different applications in foreground is different, time (namely, an SF frame length) required for performing layer composition is different.

For example, load that is of the electronic device and that exists when the electronic device runs the contacts application in foreground is smaller than load existing when the electronic device runs the game application in foreground. Therefore, an SF frame length required when the electronic device runs the game application in foreground is greater than an SF frame length required when the electronic device runs the contacts application in foreground. In this case, preset delay time corresponding to the game application is less than preset delay time corresponding to the contacts application. In other words, larger load existing when the electronic device runs an application in foreground indicates shorter preset delay time corresponding to the application, and smaller load existing when the electronic device runs an application in foreground indicates longer preset delay time corresponding to the application.

In another aspect, because working frequencies of a processor of the electronic device that exist when the electronic device runs different applications in foreground are different, time (namely, an SF frame length) required for performing layer composition is different. The processor may include a CPU and/or a GPU of the electronic device. The working frequency f of the processor may be in a unit of hertz (Hz), kilohertz (kHz), megahertz (MHz), or gigahertz (GHz).

For example, a working frequency existing when the electronic device runs the video application in foreground is greater than a working frequency existing when the electronic device runs the calendar application in foreground. Therefore, an SF frame length required when the electronic device runs the video application in foreground may be less than an SF frame length required when the electronic device runs the calendar application in foreground. In this case, first delay time corresponding to the video application is greater than preset delay time corresponding to the calendar application. In other words, a larger working frequency existing when the electronic device runs an application in foreground indicates longer preset delay time corresponding to the application, and a smaller working frequency existing when the electronic device runs an application in foreground indicates shorter preset delay time corresponding to the application.

The preset delay time corresponding to each application may be determined by collecting statistics about a large quantity of SF frame lengths required when the electronic device runs a corresponding application in foreground.

Further, processors of different electronic devices have different capabilities, for example, a maximum working frequency of a processor of an electronic device is 800 MHz, and a maximum working frequency of a processor of another electronic device is 600 MHz. Therefore, preset delay time corresponding to a same application on different electronic devices may also be different.

When preset delay time corresponding to a same application on different electronic devices is different, preset delay time corresponding to an application on each electronic device may be determined by collecting statistics about a large quantity of SF frame lengths required when devices of a same type run the application in foreground.

In this embodiment of this application, considering that SF frame lengths required when the electronic device runs different applications in foreground are different, different preset delay time may be set for different applications. In this way, when running different applications in foreground, the electronic device can adjust a vertical synchronization signal by using different preset delay time. This can improve user experience.

Embodiment 8

In this embodiment, the first delay time may not be a preset fixed time length. The electronic device may collect statistics about time consumed by the electronic device for performing a plurality of times of layer composition, to dynamically adjust the first delay time.

It may be learned from the descriptions in the foregoing embodiment that, if fixed first delay time is set on the electronic device, an image frame may be lost. This affects user visual experience.

Specifically, an image frame obtained by the electronic device through composition is buffered in a frame buffer (frame buffer). An LCD of the electronic device refreshes and displays the image frame from the frame buffer. It may be understood that in a process of obtaining an image frame (for example, an image frame a) through composition by the electronic device, the LCD of the electronic device is also refreshing and displaying, from the frame buffer, a previous image frame (for example, an image frame b) obtained by the electronic device through composition. After obtaining the image frame a through composition, the electronic device needs to wait for the LCD to complete refresh of the image frame b from the frame buffer (in other words, the LCD completes refresh and display of the image frame b), that is, wait for arrival of a vertical synchronization signal 3, to refresh and display the image frame a.

However, if delay time (for example, the first delay time) of a vertical synchronization signal 1 and a vertical synchronization signal 2 relative to the vertical synchronization signal 3 is relatively large, the following problem may exist: When the vertical synchronization signal 3 arrives, if composition of the image frame a is not completed, the LCD cannot refresh and display the image frame a, and continues to display the image frame b. In other words, frame loss occurs in an image displayed on the display screen of the electronic device, that is, the display screen displays a repeated frame of image. This affects image display fluency of the display screen. It may be learned that, to shorten a response delay of the electronic device when it is ensured that no frame is lost, a length of the first delay time is particularly important.

Figure 8D:
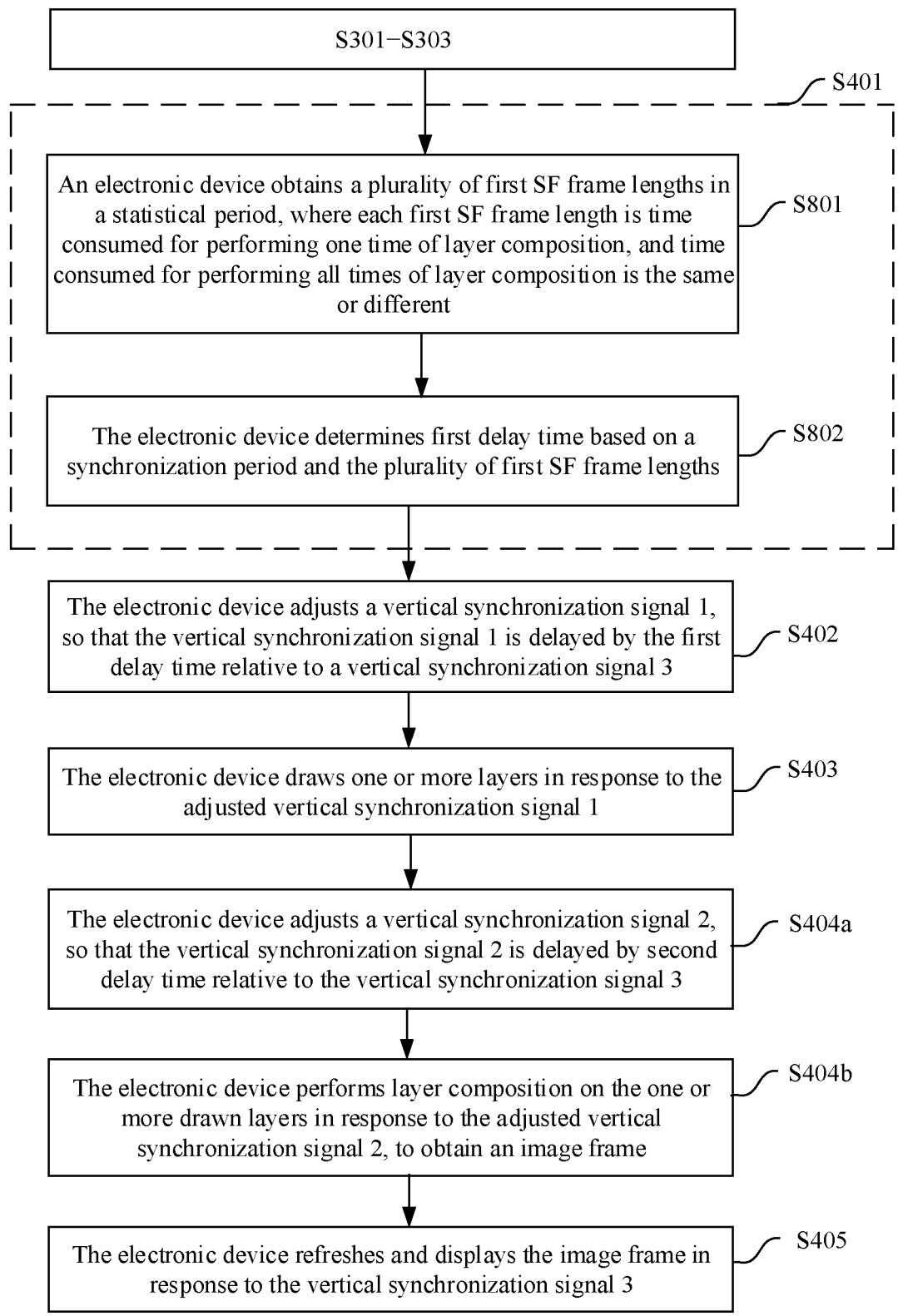
FIG. 8D is a flowchart of a control method based on a vertical synchronization signal according to an embodiment of this application.

To avoid the problem that an image frame is lost, the electronic device may collect statistics about time consumed by the electronic device for performing a plurality of times of layer composition, to dynamically adjust the first delay time. Specifically, a method for obtaining the first delay time by the electronic device may include S801 and S802. For example, as shown in FIG. 8D, S401 shown in FIG. 4B may include S801 and S802.

S801. The electronic device obtains a plurality of first SF frame lengths in a statistical period, where each first SF frame length is time consumed for performing one time of layer composition, and time consumed for performing all times of layer composition is the same or different.

For example, the statistical period in this embodiment of this application may be any duration such as 1 s, 2 s, 3 s, or 5 s. The electronic device may perform one time of layer composition in one synchronization period. One statistical period may include a plurality of synchronization periods. Therefore, the electronic device may perform a plurality of times of layer composition in one statistical period. For example, the statistical period is 1 s, and the synchronization period is 16.667 ms. The electronic device may perform 60 times of layer composition in a statistical period of 1 s. The electronic device may obtain a plurality of first SF frame lengths in each statistical period in the statistical period.

S802. The electronic device determines the first delay time based on the synchronization period and the plurality of first SF frame lengths.

It may be understood that a difference between a synchronization period and time (namely, a first SF frame length) consumed for performing layer composition in the synchronization period is a "composition delay" existing when the electronic device performs layer composition in the synchronization period. The "composition delay" may be used as a gain point for shortening the response delay by the electronic device in this embodiment of this application, namely, the delay time that can be adjusted and that is of the vertical synchronization signal 1 and the vertical synchronization signal 2 relative to the vertical synchronization signal 3. For example, the gain point may be time that is shown in FIG. 3 and that is from a moment at which "image frame composition" is completed to a moment at which "image frame display" is started. Therefore, the electronic device may determine the first delay time based on the synchronization period and time (namely, a plurality of first SF frame lengths) consumed for performing a plurality of times of layer composition in a statistical period, namely, the delay time of the vertical synchronization signal 1 and the vertical synchronization signal 2 relative to the vertical synchronization signal 3.

In this embodiment of this application, the electronic device may determine the first delay time in a statistical period, and then adjust a vertical synchronization signal (for example, the vertical synchronization signal 1 and the vertical synchronization signal 2) in a next statistical period of the statistical period, so that delays of the vertical synchronization signal 1 and the vertical synchronization signal 2 relative to the vertical synchronization signal 3 are the first delay time $T_{Offset\_1}$.

Figure 8E:
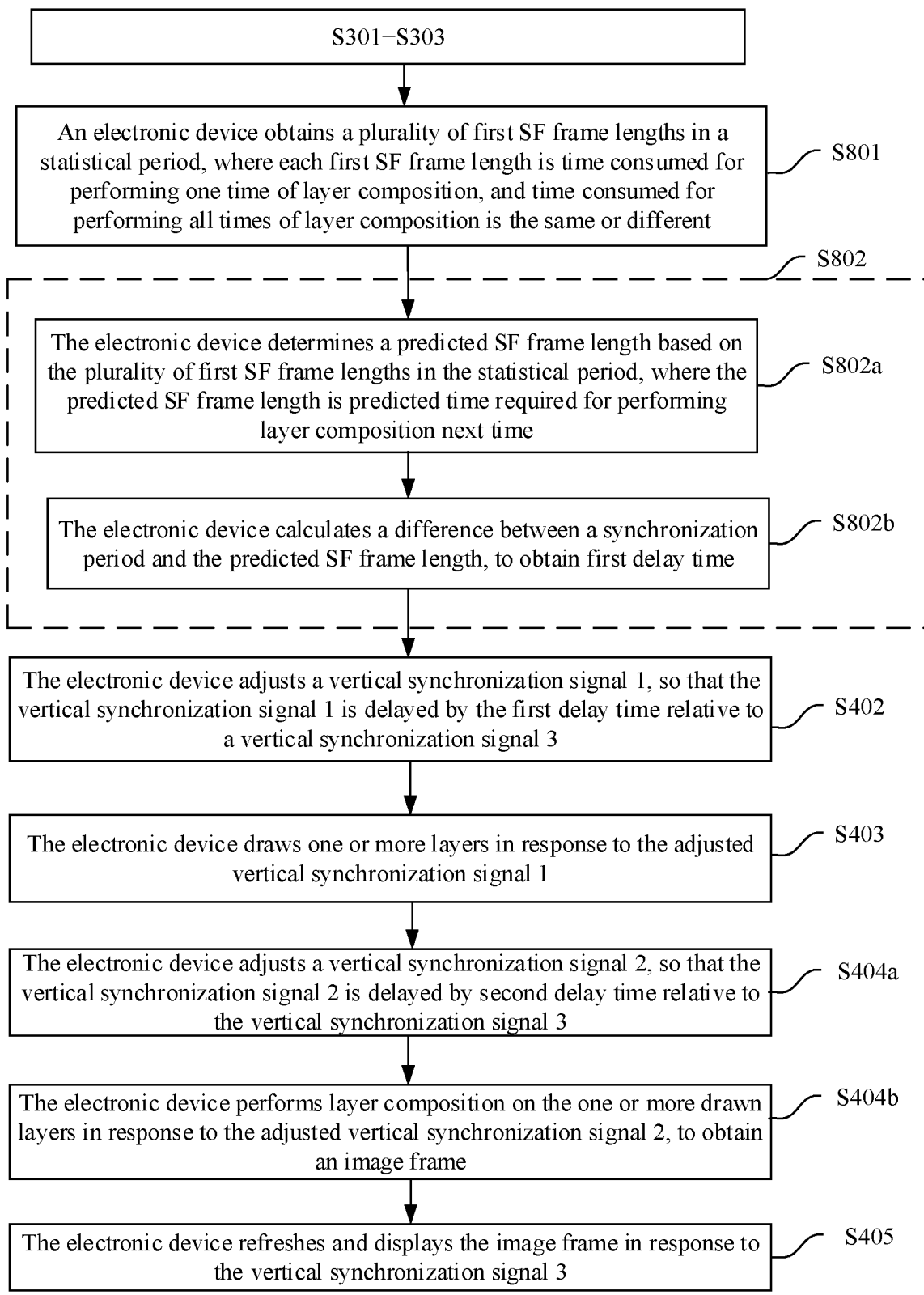
FIG. 8E is a flowchart of a control method based on a vertical synchronization signal according to an embodiment of this application.

For example, the electronic device may predict, based on a plurality of SF frame lengths in a statistical period, time (namely, a predicted SF frame length) required for performing layer composition next time, and then calculate the first delay time based on the synchronization period and the predicted SF frame length. Specifically, as shown in FIG. 8E, S802 shown in FIG. 8D may include S802a and S802b.

S802a. The electronic device determines a predicted SF frame length based on the plurality of first SF frame lengths in the statistical period, where the predicted SF frame length is predicted time required for performing layer composition next time.

In an implementation, the predicted SF frame length in the S802a may be an average SF frame length of the plurality of first SF frame lengths in the statistical period. For example, it is assumed that the electronic device performs five times of layer composition in a statistical period. SF frame lengths (namely, first SF frame lengths) corresponding to the five times of layer composition are respectively 12 ms, 13 ms, 10 ms, 11 ms, and 12 ms. In this case, the predicted SF frame length may be (12+13+10+11+12)/5=11.6 ms.

It may be understood that if the predicted SF frame length is relatively small, the first delay time obtained through calculation after S802b is performed is relatively large. As a result, an image frame is easily lost. To reduce a frame loss possibility of the image frame, in another implementation, the predicted SF frame length in S802a may be a maximum first SF frame length in the statistical period. With reference to the foregoing example, the electronic device may determine that the predicted SF frame length is 13 ms.

S802b. The electronic device calculates a difference between the synchronization period and the predicted SF frame length, to obtain the first delay time.

For example, the synchronization period is 16.667 ms, and the predicted SF frame length is 13 ms. The first delay time may be: 16.667−13=3.667 ms.

In this embodiment of this application, the electronic device may determine the first delay time based on a plurality of first SF frame lengths in a statistical period and the synchronization period. The plurality of first SF frame lengths in the statistical period may reflect actual time consumed by the electronic device for performing a plurality of times of layer composition in the statistical period. Therefore, the first delay time may accurately reflect a "composition delay" existing when the electronic device performs a plurality of times of layer composition in the statistical period. Therefore, when the delay time of the vertical synchronization signal 1 and the vertical synchronization signal 2 relative to the vertical synchronization signal 3 is adjusted by using the first delay time, the frame loss possibility of the image frame is relatively low.

In conclusion, in the method in this embodiment of this application, the response delay of the electronic device can be shortened and fluency of the electronic device can be improved when it is ensured that the LCD of the electronic device normally displays a picture.

Figure 9A:
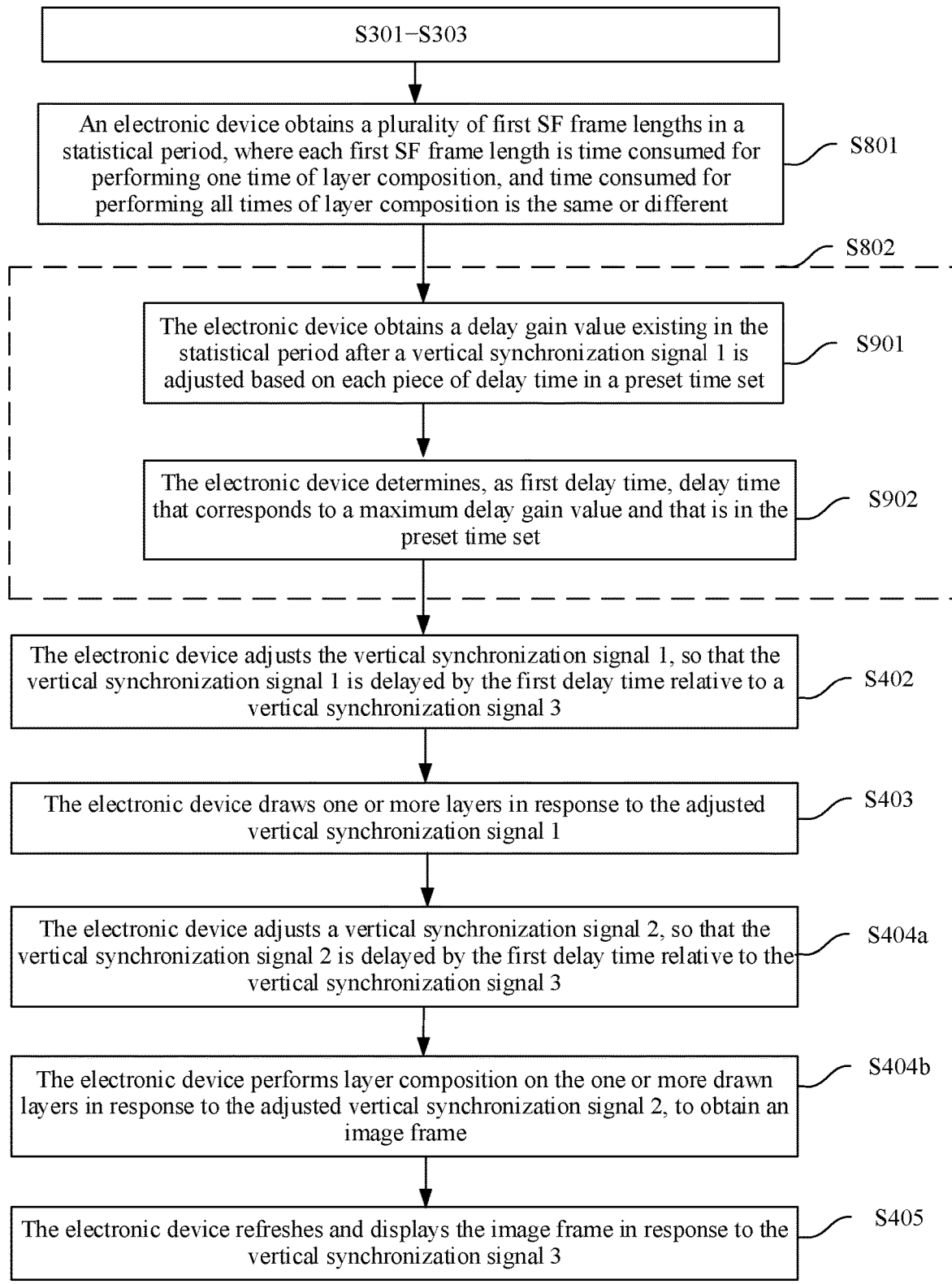
FIG. 9A is a flowchart of a control method based on a vertical synchronization signal according to an embodiment of this application.

In the foregoing embodiment, the electronic device may perform S802 to determine the first delay time by calculating the difference between the synchronization period and the predicted SF frame length. In some other embodiments, the electronic device may calculate a delay gain value existing in a statistical period after the vertical synchronization signal 1 and the vertical synchronization signal 2 are adjusted by using each piece of delay time in a preset time set, and then determine delay time corresponding to a maximum delay gain value as the first delay time. In this way, the response delay of the electronic device can be shortened to a maximum degree. Specifically, as shown in FIG. 9A, S802 shown in FIG. 8D may include S901 and S902.

S901. The electronic device obtains a delay gain value existing in the statistical period after the vertical synchronization signal 1 is adjusted based on each piece of delay time in a preset time set.

The preset time set includes a plurality of pieces of delay time with a value range of $[T_{Offset\_b}, T_Z)$. $T_{Offset\_D}$ is current delay time, and the current delay time is delay time of the vertical synchronization signal 1 and the vertical synchronization signal 2 currently relative to the vertical synchronization signal 3. The plurality of pieces of delay time may include a plurality of pieces of duration that start to gradually increase from $T_{Offset\_D}$ by using a preset stride. For example, the preset stride may be any duration such as 2 ms, 1 ms, or 0.5 ms. The preset stride may be preconfigured on the electronic device. Alternatively, the preset stride may be set by a user on the electronic device.

It may be understood that, at a current moment, the delay time of the vertical synchronization signal 1 and the vertical synchronization signal 2 currently relative to the vertical synchronization signal 3 may be zero, in other words, $T_{Offset\_D}=0$. Alternatively, at a current moment, the delay time of the vertical synchronization signal 1 and the vertical synchronization signal 2 currently relative to the vertical synchronization signal 3 may be adjusted by the electronic device, and the current delay time is $0<T_{Offset\_D}<T_Z$. For example, after the electronic device performs S402 and S404a, $T_{Offset\_D}$ is the first delay time.

For example, $T_{Offset\_D}=0$ ms, $T_Z=16.667$ ms, and the preset stride is 2.5 ms. The preset time set may be {0 ms, 2.5 ms, 5 ms, 7.5 ms, 10 ms, 12.5 ms, 15 ms}.

For another example, $T_{Offset\_D}=4$ ms, $T_Z=16.667$ ms, and the preset stride is 1 ms. The preset time set may be {4 ms, 5 ms, 6 ms, 7 ms, 8 ms, 9 ms, 10 ms, 11 ms, 12 ms, 13 ms, 14 ms, 15 ms, 16 ms}.

A delay gain value corresponding to a piece of delay time is a product of the delay time and a frame lossless ratio corresponding to the delay time. A sum of the frame lossless ratio and a frame loss ratio that correspond to the delay time is 1.

For example, the electronic device may calculate a delay gain value f (offset) corresponding to a piece of delay time (offset) by using the following formula (1):

$$f(\text{offset})=(\text{offset})*(1-P_{offset}) \quad \text{formula (1)}$$

$P_{offset}$ is a frame loss ratio corresponding to the delay time (offset), and $1-P_{offset}$ is a frame lossless ratio corresponding to the delay time (offset).

The electronic device may calculate a ratio that is of a quantity of frame loss times of an image frame to a total quantity of times in a statistical period and that exists after the delay time of the vertical synchronization signal 1 relative to the vertical synchronization signal 3 is adjusted based on a piece of delay time, to obtain a frame loss ratio corresponding to the delay time.

For example, it is assumed that the electronic device performs five times of layer composition in the foregoing statistical period. SF frame lengths (namely, first SF frame lengths) corresponding to the five times of layer composition are respectively 4 ms, 5 ms, 7.5 ms, 8 ms, and 6.8 ms. An example in which the preset time set is {0 ms, 2.5 ms, 5 ms, 7.5 ms, 10 ms, 12.5 ms, 15 ms} is used. In this case, the following result may be obtained.

If the delay time of the vertical synchronization signal 1 and the vertical synchronization signal 2 relative to the vertical synchronization signal 3 is adjusted based on the delay time of 0 ms in the preset time set, for the $1^{st}$ SF frame length of 4 ms corresponding to the five times of layer composition, 4+0<16.667 (namely, $T_Z$), and no frame loss occurs; for the $2^{nd}$ SF frame length of 5 ms, 5+0<16.667 (namely, $T_Z$), and no frame loss occurs; for the $3^{rd}$ SF frame length of 7.5 ms, 7.5+0<16.667 (namely, $T_Z$), and no frame loss occurs; for the $4^{th}$ SF frame length of 8 ms, 8+0<16.667 (namely, $T_Z$), and no frame loss occurs; and for the $5^{th}$ SF frame length of 6.8 ms, 6.8+0<16.667 (namely, $T_Z$), and no frame loss occurs. In this way, it may be learned that a frame loss ratio corresponding to the delay time of 0 ms in the preset time set is 0, and a frame lossless ratio corresponding to the delay time of 0 ms is 100%.

If the delay time of the vertical synchronization signal 1 and the vertical synchronization signal 2 relative to the vertical synchronization signal 3 is adjusted based on the delay time of 2.5 ms in the preset time set, for the $1^{st}$ SF frame length of 4 ms corresponding to the five times of layer composition, 4+2.5<16.667 (namely, $T_Z$), and no frame loss occurs; for the $2^{nd}$ SF frame length of 5 ms, 5+2.5<16.667 (namely, $T_Z$), and no frame loss occurs; for the $3^{rd}$ SF frame length of 7.5 ms, 7.5+2.5<16.667 (namely, $T_Z$), and no frame loss occurs; for the $4^{th}$ SF frame length of 8 ms, 8+2.5<16.667 (namely, $T_Z$), and no frame loss occurs; and for the $5^{th}$ SF frame length of 6.8 ms, 6.8+2.5<16.667 (namely, $T_Z$), and no frame loss occurs. In this way, it may be learned that a frame loss ratio corresponding to the delay time of 2.5 ms in the preset time set is 0, and a frame lossless ratio corresponding to the delay time of 2.5 ms is 100%.

If the delay time of the vertical synchronization signal 1 and the vertical synchronization signal 2 relative to the vertical synchronization signal 3 is adjusted based on the delay time of 5 ms in the preset time set, for the $1^{st}$ SF frame length of 4 ms corresponding to the five times of layer composition, 4+5<16.667 (namely, $T_Z$), and no frame loss occurs; for the $2^{nd}$ SF frame length of 5 ms, 5+5<16.667 (namely, $T_Z$), and no frame loss occurs; for the $3^{rd}$ SF frame length of 7.5 ms, 7.5+5<16.667 (namely, $T_Z$), and no frame loss occurs; for the $4^{th}$ SF frame length of 8 ms, 8+5<16.667 (namely, $T_Z$), and no frame loss occurs; and for the $5^{th}$ SF frame length of 6.8 ms, 6.8+5<16.667 (namely, $T_Z$), and no frame loss occurs. In this way, it may be learned that a frame loss ratio corresponding to the delay time of 5 ms in the preset time set is 0, and a frame lossless ratio corresponding to the delay time of 5 ms is 100%.

If the delay time of the vertical synchronization signal 1 and the vertical synchronization signal 2 relative to the vertical synchronization signal 3 is adjusted based on the delay time of 7.5 ms in the preset time set, for the $1^{st}$ SF frame length of 4 ms corresponding to the five times of layer composition, 4+7.5<16.667 (namely, $T_Z$), and no frame loss occurs; for the $2^{nd}$ SF frame length of 5 ms, 5+7.5<16.667 (namely, $T_Z$), and no frame loss occurs; for the $3^{rd}$ SF frame length of 7.5 ms, 7.5+7.5<16.667 (namely, $T_Z$), and no frame loss occurs; for the $4^{th}$ SF frame length of 8 ms, 8+7.5<16.667 (namely, $T_Z$), and no frame loss occurs; and for the $5^{th}$ SF frame length of 6.8 ms, 6.8+7.5<16.667 (namely, $T_Z$), and no frame loss occurs. In this way, it may be learned that a frame loss ratio corresponding to the delay time of 7.5 ms in the preset time set is 0, and a frame lossless ratio corresponding to the delay time of 7.5 ms is 100%.

If the delay time of the vertical synchronization signal 1 and the vertical synchronization signal 2 relative to the vertical synchronization signal 3 is adjusted based on the delay time of 10 ms in the preset time set, for the $1^{st}$ SF frame length of 4 ms corresponding to the five times of layer composition, 4+10<16.667 (namely, $T_Z$), and no frame loss occurs; for the $2^{nd}$ SF frame length of 5 ms, 5+10<16.667 (namely, $T_Z$), and no frame loss occurs; for the $3^{rd}$ SF frame length of 7.5 ms, 7.5+10>16.667 (namely, $T_Z$), and frame loss occurs; for the $4^{th}$ SF frame length of 8 ms, 8+10>16.667 (namely, $T_Z$), and frame loss occurs; and for the $5^{th}$ SF frame length of 6.8 ms, 6.8+10>16.667 (namely, $T_Z$), and frame loss occurs. In this way, it may be learned that a frame loss ratio corresponding to the delay time of 10 ms in the preset time set is 3/5=60%, and a frame lossless ratio corresponding to the delay time of 10 ms is 40%.

If the delay time of the vertical synchronization signal 1 and the vertical synchronization signal 2 relative to the vertical synchronization signal 3 is adjusted based on the delay time of 12.5 ms in the preset time set, for the $1^{st}$ SF frame length of 4 ms corresponding to the five times of layer composition, 4+12.5<16.667 (namely, $T_Z$), and no frame loss occurs; for the $2^{nd}$ SF frame length of 5 ms, 5+12>16.667 (namely, $T_Z$), and frame loss occurs; for the $3^{rd}$ SF frame length of 7.5 ms, 7.5+12.5>16.667 (namely, $T_Z$), and frame loss occurs; for the $4^{th}$ SF frame length of 8 ms, 8+12.5>16.667 (namely, $T_Z$), and frame loss occurs; and for the $5^{th}$ SF frame length of 6.8 ms, 6.8+12.5>16.667 (namely, $T_Z$), and frame loss occurs. In this way, it may be learned that a frame loss ratio corresponding to the delay time of 12.5 ms in the preset time set is 4/5=80%, and a frame lossless ratio corresponding to the delay time of 12.5 ms is 20%.

If the delay time of the vertical synchronization signal 1 and the vertical synchronization signal 2 relative to the vertical synchronization signal 3 is adjusted based on the delay time of 15 ms in the preset time set, for the $1^{st}$ SF frame length of 4 ms corresponding to the five times of layer composition, 4+15>16.667 (namely, $T_Z$), and frame loss occurs; for the $2^{nd}$ SF frame length of 5 ms, 5+15>16.667 (namely, $T_Z$), and frame loss occurs; for the $3^{rd}$ SF frame length of 7.5 ms, 7.5+15>16.667 (namely, $T_Z$), and frame loss occurs; for the $4^{th}$ SF frame length of 8 ms, 8+15>16.667 (namely, $T_Z$), and frame loss occurs; and for the $5^{th}$ SF frame length of 6.8 ms, 6.8+15>16.667 (namely, $T_Z$), and frame loss occurs. In this way, it may be learned that a frame loss ratio corresponding to the delay time of 15 ms in the preset time set is 5/5=100%, and a frame lossless ratio corresponding to the delay time of 15 ms is 0.

In conclusion, in the preset time set {0 ms, 2.5 ms, 5 ms, 7.5 ms, 10 ms, 12.5 ms, 15 ms}, the frame loss ratio corresponding to 0 ms is 0, and the frame lossless ratio corresponding to 0 ms is 100%; the frame loss ratio corresponding to 2.5 ms is 0, and the frame lossless ratio corresponding to 2.5 ms is 100%; the frame loss ratio corresponding to 5 ms is 0, and the frame lossless ratio corresponding to 5 ms is 100%; the frame loss ratio corresponding to 7.5 ms is 0, and the frame lossless ratio corresponding to 7.5 ms is 100%; the frame loss ratio corresponding to 10 ms is 60%, and the frame lossless ratio corresponding to 10 ms is 40%; the frame loss ratio corresponding to 12.5 ms is 80%, and the frame lossless ratio corresponding to 12.5 ms is 20%; and the frame loss ratio corresponding to 15 ms is 100%, and the frame lossless ratio corresponding to 15 ms is 0. It may be learned from the foregoing example that longer delay time indicates a higher frame loss ratio corresponding to the delay time and shorter delay time indicates a lower frame loss ratio corresponding to the delay time.

An example in which $T_M$=0 ms is used. In the preset time set {0 ms, 2.5 ms, 5 ms, 7.5 ms, 10 ms, 12.5 ms, 15 ms}, a delay gain value corresponding to 0 ms is f(0)=(0−0)*(1−0)=0; a delay gain value corresponding to 2.5 ms is f(2.5)=(2.5−0)*(1−0)=2.5; a delay gain value corresponding to 5 ms is f(5)=(5−0)*(1−0)=5; a delay gain value corresponding to 7.5 ms is f(7.5)=(7.5−0)*(1−0)=7.5; a delay gain value corresponding to 10 ms is f(10)=(10−0)*(1−60%)=4; a delay gain value corresponding to 12.5 ms is f(12.5)=(12.5−0)*(1−80%)=2.5; and a delay gain value corresponding to 15 ms is f(15)=(15−0)*(1−100%)=0.

S902. The electronic device determines, as the first delay time, delay time that corresponds to a maximum delay gain value and that is in the preset time set.

For example, with reference to the foregoing example, in the preset time set {0 ms, 2.5 ms, 5 ms, 7.5 ms, 10 ms, 12.5 ms, 15 ms}, the delay gain value corresponding to the delay time of 7.5 ms is the largest (for example, the delay gain value is 7.5). The electronic device may determine the delay time of 7.5 ms in the preset time set as the first delay time.

It may be learned from formula (1) and the foregoing example that, for each piece of delay time in the preset time set, larger delay time indicates a larger delay gain value corresponding to the delay time. However, as the delay time increases, the delay gain value corresponding to the delay time gradually decreases. Normal distribution shown in FIG. 9B exists between the delay time and the delay gain value corresponding to the delay time.

Figure 9B:
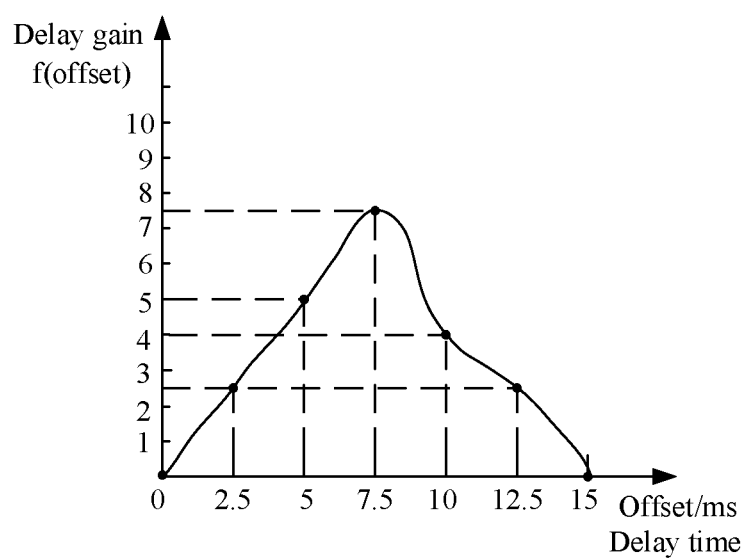
FIG. 9B is a schematic distribution diagram of delay time and a delay gain corresponding to the delay time according to an embodiment of this application.

Referring to FIG. 9B, it may be understood that in a preset time set, a delay gain value gradually increases as delay time increases. When the delay gain value increases to a specified value (7.5 ms shown in FIG. 9B), the delay gain value gradually decreases as the delay time increases. In this embodiment of this application, the electronic device starts to gradually increase delay time from minimum delay time in the preset time set by using the preset stride, to find delay time corresponding to a maximum delay gain value, and use the delay time as an optimal value (namely, the first delay time) to adjust the delay time of the vertical synchronization signal 1 and the vertical synchronization signal 2 relative to the vertical synchronization signal 3.

Optionally, in some embodiments, to reduce a frame loss ratio and ensure a specified frame lossless ratio, the first delay time may be delay time that corresponds to a maximum delay gain value and that is in delay time, in the preset time set, corresponding to a frame loss ratio less than a preset threshold. For example, the preset threshold may be any frame loss ratio threshold such as 8%, 10%, 12%, 15%, or 18%. The preset threshold may be preconfigured on the electronic device. Alternatively, the preset threshold may be set by the user on the electronic device.

An example in which the preset threshold is 10% is used. With reference to the foregoing example, in the preset time set {0 ms, 2.5 ms, 5 ms, 7.5 ms, 10 ms, 12.5 ms, 15 ms}, the delay gain value corresponding to 0 ms is 0, and the frame loss ratio corresponding to 0 ms is 0; the delay gain value corresponding to 2.5 ms is 2.5, and the frame loss ratio corresponding to 2.5 ms is 0; the delay gain value corresponding to 5 ms is 5, and the frame loss ratio corresponding to 5 ms is 0; the delay gain value corresponding to 7.5 ms is 7.5, and the frame loss ratio corresponding to 7.5 ms is 0; the delay gain value corresponding to 10 ms is 4, and the frame loss ratio corresponding to 10 ms is 60%; the delay gain value corresponding to 12.5 ms is 2.5, and the frame loss ratio corresponding to 12.5 ms is 80%; and the delay gain value corresponding to 15 ms is 0, and the frame loss ratio corresponding to 15 ms is 100%. In this case, the delay time corresponding to the frame loss ratio less than the preset threshold may include the delay time of 0 ms, 2.5 ms, 5 ms, and 7.5 ms. The delay time that corresponds to the maximum delay gain value and that is in the delay time corresponding to the frame loss ratio less than the preset threshold is 7.5 ms. In other words, the electronic device may determine the delay time of 7.5 ms in the preset time set as the first delay time.

In this embodiment of this application, the electronic device may traverse all delay time (namely, offset) in the preset time set to obtain a delay gain value and a frame loss ratio that correspond to each piece of delay time, and use, as the optimal value (namely, the first delay time), the delay time that corresponds to the maximum delay gain value and that is in the delay time corresponding to the frame loss ratio less than the preset threshold, to adjust the delay time of the vertical synchronization signal 1 and the vertical synchronization signal 2 relative to the vertical synchronization signal 3. Therefore, the response delay of the electronic device can be shortened to a maximum degree and fluency of the electronic device can be improved when it is ensured that the LCD of the electronic device normally displays a picture.

In some embodiments, before performing S802, the electronic device may first predict, based on a plurality of first SF frame lengths in a statistical period, whether duration consumed by the electronic device for performing layer composition in a next statistical period is less than a preset frame length threshold (the preset frame length threshold is less than the foregoing synchronization period). If the predicted duration is less than the preset frame length threshold, it indicates that the electronic device consumes relatively short duration in performing layer composition. After completing layer composition, the electronic device needs to wait for relatively long time to display an image frame obtained through composition, that is, the response delay of the electronic device is relatively large.

Figure 8F:
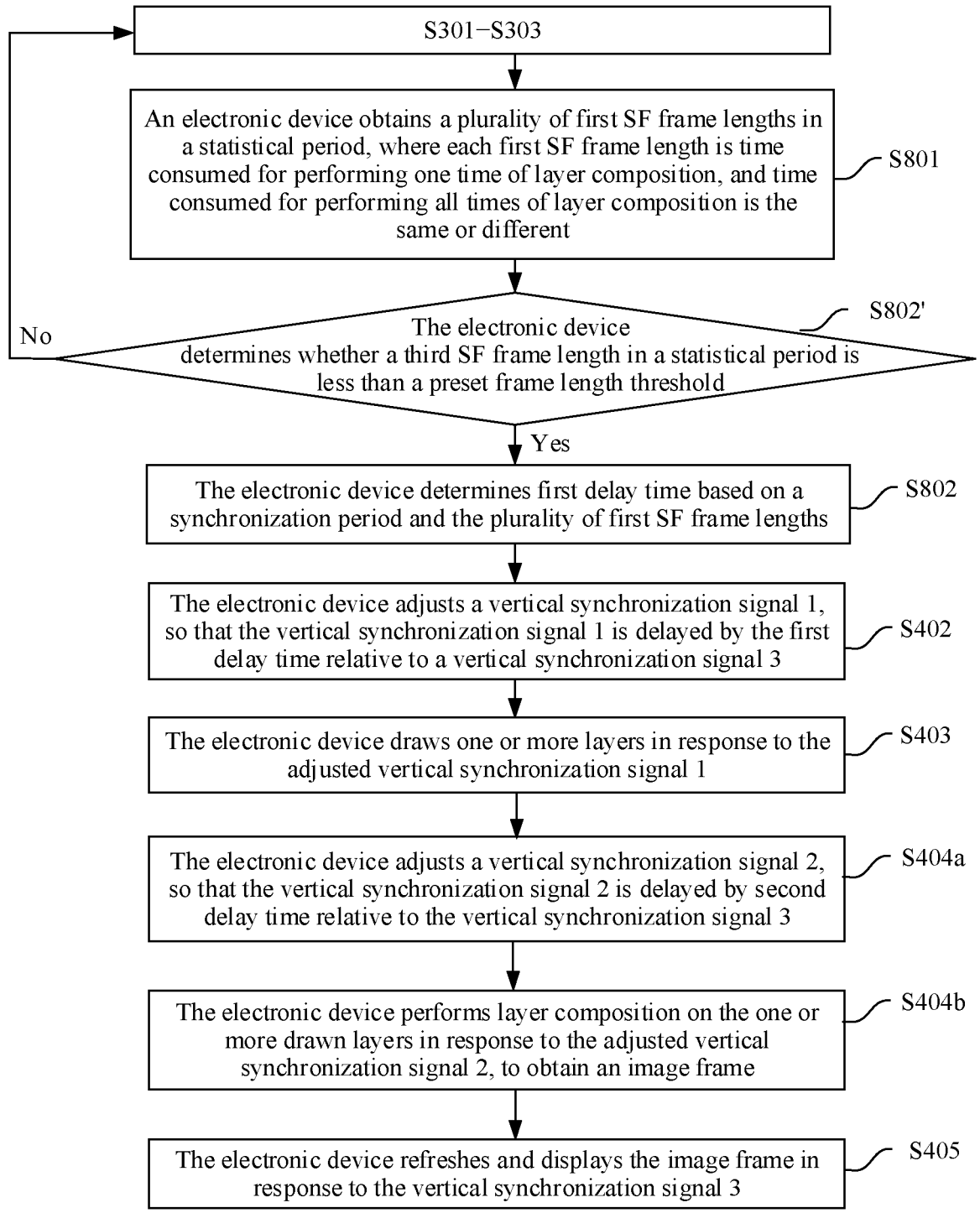
FIG. 8F is a flowchart of a control method based on a vertical synchronization signal according to an embodiment of this application.

In this case, the electronic device may perform S802 to determine the first delay time. Then, the electronic device may perform S402 to S405, to shorten the response delay of the electronic device by adjusting the vertical synchronization signal 1 and the vertical synchronization signal 2. Specifically, as shown in FIG. 8F, before S802, the method in this embodiment of this application may further include S802'.

S802'. The electronic device determines whether a third SF frame length in a statistical period is less than a preset frame length threshold.

For example, it is assumed that the synchronization period $T_Z$ is 16.667 ms. The preset frame length threshold may be any duration such as 10 ms, 8 ms, or 12 ms. The preset frame length threshold may be preconfigured on the electronic device. Alternatively, the preset frame length threshold may be set by the user on the electronic device. The statistical period in this embodiment of this application may be any duration such as 1 s, 2 s, 3 s, or 5 s.

For example, the electronic device may obtain a plurality of first SF frame lengths in the foregoing statistical period. Each first SF frame length is time consumed for performing one time of layer composition, and time consumed for performing all times of layer composition is the same or different. For a specific method for obtaining the plurality of first SF frame lengths in the foregoing statistical period by the electronic device, refer to detailed descriptions of S801 in the following embodiment. Details are not described again in this embodiment of this application. The third SF frame length may be an average value of the plurality of first SF frame lengths. Alternatively, the third SF frame length may be a maximum value in the plurality of first SF frame lengths.

Specifically, if a third SF frame length in a statistical period is less than the preset frame length threshold, it indicates that the electronic device consumes relatively short duration in performing layer composition in the statistical period. After completing layer composition, the electronic device needs to wait for relatively long time to display an image frame obtained through composition, and the response delay of the electronic device is relatively large. In this case, a response delay of the electronic device in a next statistical period may also be relatively large. As shown in FIG. 8F, the electronic device may perform S802 and a subsequent procedure, to shorten the response delay of the electronic device.

If a third SF frame length in a statistical period is greater than or equal to the preset frame length threshold, it indicates that the electronic device consumes relatively long duration in performing layer composition in the statistical period. After completing layer composition, the electronic device does not need to wait for relatively long time to display an image frame obtained through composition, and the response delay of the electronic device is relatively small. In this case, as shown in FIG. 8F, the electronic device may perform S301 to 303.

Optionally, in some embodiments, after performing S802 and S402 to S405, if the electronic device determines that a third SF frame length in a statistical period is greater than or equal to the preset frame length threshold, the electronic device may further adjust the vertical synchronization signal 1 and the vertical synchronization signal 2, so that the vertical synchronization signal 1 and the vertical synchronization signal 2 are not delayed relative to the vertical synchronization signal 3. Then, the electronic device may perform S301 to S303.

In the foregoing embodiment, the electronic device may determine the first delay time based on SF frame lengths and a delay gain value in each statistical period, and then adjust the delay time of the vertical synchronization signal 1 and the vertical synchronization signal 2 relative to the vertical synchronization signal 3. However, if the delay time of the vertical synchronization signal 1 and the vertical synchronization signal 2 relative to the vertical synchronization signal 3 is adjusted after each statistical period ends, a ping-pong phenomenon of delay time adjustment may occur.

Figure 10:
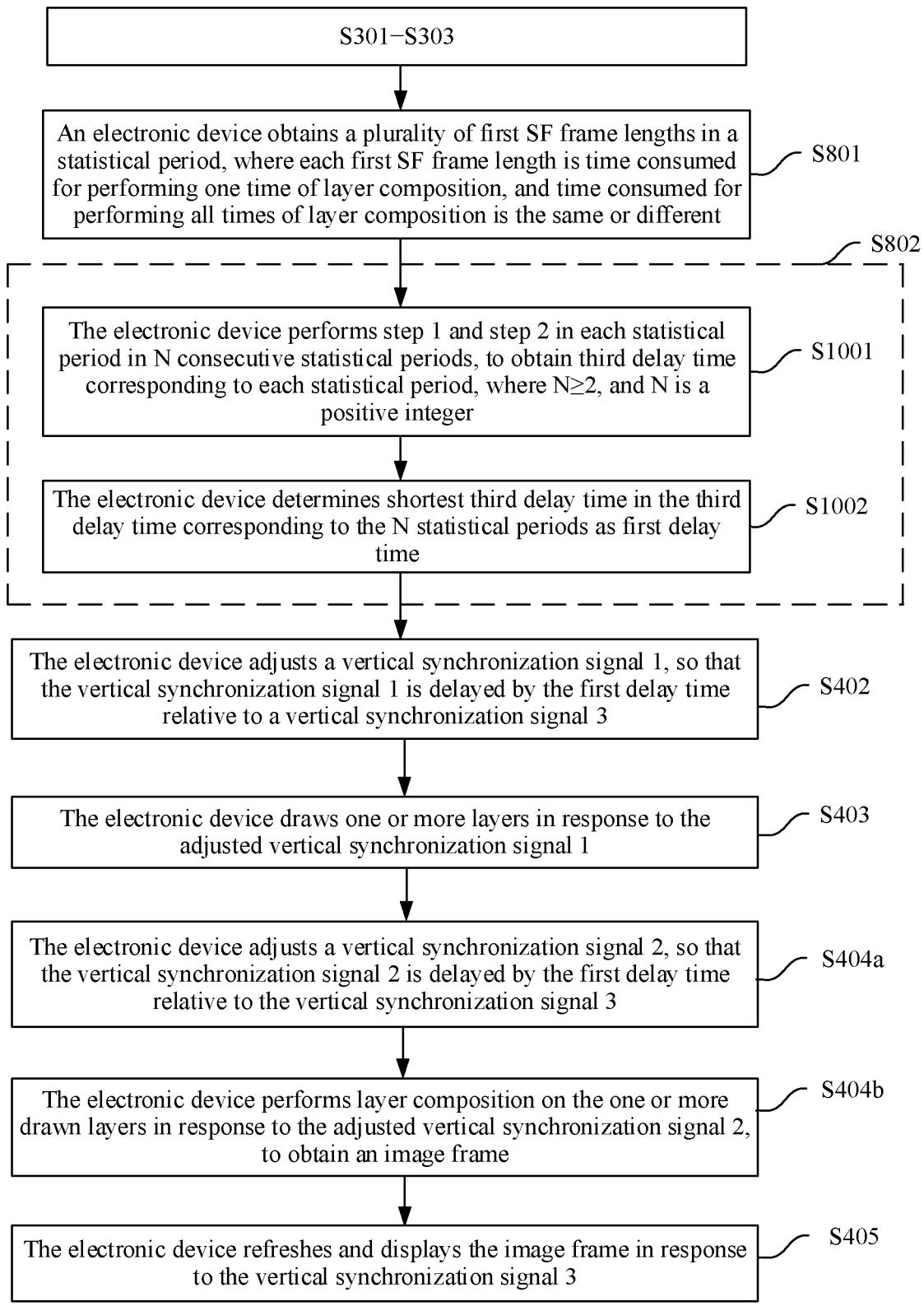
FIG. 10 is a flowchart of a control method based on a vertical synchronization signal according to an embodiment of this application.

In some embodiments, to prevent a ping-pong phenomenon from occurring when the delay time of the vertical synchronization signal 1 and the vertical synchronization signal 2 relative to the vertical synchronization signal 3 is adjusted, the electronic device may determine the first delay time based on delay time that corresponds to each statistical period in N consecutive statistical periods, that is in a preset time set, and that corresponds to a maximum delay gain value. Specifically, as shown in FIG. 10, S802 shown in FIG. 8D may include S1001 and S1002.

S1001. The electronic device performs step 1 and step 2 in each statistical period in N consecutive statistical periods, to obtain third delay time corresponding to each statistical period, where N≥2, and N is a positive integer.

For example, N may be any positive integer such as 5, 4, 3, 2, or 6.

Step 1: The electronic device obtains a delay gain value existing in a statistical period after the vertical synchronization signal 1 is adjusted based on each piece of delay time in the preset time set.

It should be noted that for the preset time set in step 1, current delay time $T_{Offset\_D}$, a delay gain value corresponding to a piece of delay time, the delay time, a frame loss ratio corresponding to the delay time, and a method for obtaining a delay gain value by the electronic device, refer to related descriptions of S901. Details are not described again in this embodiment of this application.

Step 2: The electronic device obtains third delay time corresponding to the statistical period, where the third delay time is delay time that corresponds to a maximum delay gain value and that is in the preset time set.

For example, with reference to the foregoing example, in the preset time set {0 ms, 2.5 ms, 5 ms, 7.5 ms, 10 ms, 12.5 ms, 15 ms}, the delay gain value corresponding to the delay time of 7.5 ms is the largest (for example, the delay gain value is 7.5 ms). The electronic device may determine the delay time of 7.5 ms as the third delay time corresponding to the statistical period.

Optionally, in some embodiments, to reduce a frame loss ratio and ensure a specified frame lossless ratio, the third delay time is delay time that corresponds to a maximum delay gain value and that is in delay time, in the preset time set, corresponding to a frame loss ratio less than a preset threshold. An example in which the preset threshold is 10% is used. With reference to the foregoing example, in the preset time set {0 ms, 2.5 ms, 5 ms, 7.5 ms, 10 ms, 12.5 ms, 15 ms}, the delay gain value corresponding to 0 ms is 0, and the frame loss ratio corresponding to 0 ms is 0; the delay gain value corresponding to 2.5 ms is 2.5, and the frame loss ratio corresponding to 2.5 ms is 0; the delay gain value corresponding to 5 ms is 5, and the frame loss ratio corresponding to 5 ms is 0; the delay gain value corresponding to 7.5 ms is 7.5, and the frame loss ratio corresponding to 7.5 ms is 0; the delay gain value corresponding to 10 ms is 4, and the frame loss ratio corresponding to 10 ms is 60%; the delay gain value corresponding to 12.5 ms is 2.5, and the frame loss ratio corresponding to 12.5 ms is 80%; and the delay gain value corresponding to 15 ms is 0, and the frame loss ratio corresponding to 15 ms is 100%. In this case, the delay time corresponding to the frame loss ratio less than the preset threshold may include the delay time of 0 ms, 2.5 ms, 5 ms, and 7.5 ms. The delay time that corresponds to the maximum delay gain value and that is in the delay time corresponding to the frame loss ratio less than the preset threshold is 7.5 ms. In other words, the electronic device may determine the delay time of 7.5 ms as the third delay time corresponding to the statistical period.

S1002. The electronic device determines shortest third delay time in the third delay time corresponding to the N statistical periods as the first delay time.

For example, N=5. It is assumed that in the five statistical periods, third delay time corresponding to the first statistical period is 6 ms, third delay time corresponding to the second statistical period is 7.5 ms, third delay time corresponding to the third statistical period is 6.5 ms, third delay time corresponding to the second statistical period is 6.6 ms, third delay time corresponding to the fourth statistical period is 7 ms, and third delay time corresponding to the fourth statistical period is 8 ms. In this case, the electronic device may determine that the first delay time is 6 ms.

In this embodiment of this application, the electronic device may obtain the third delay time corresponding to each statistical period in the N statistical periods, namely, the delay time that corresponds to each statistical period, that is in the preset time set, and that corresponds to the maximum delay gain value, or the delay time that corresponds to the maximum delay gain value and that is in the delay time corresponding to the frame loss ratio less than the preset threshold. Then, the electronic device uses the minimum third delay time in the third delay time corresponding to the N statistical periods as an optimal value (namely, the first delay time), to adjust the delay time of the vertical synchronization signal 1 and the vertical synchronization signal 2 relative to the vertical synchronization signal 3. Therefore, the response delay of the electronic device can be shortened to a maximum degree and fluency of the electronic device can be improved when it is ensured that the LCD of the electronic device normally displays a picture.

It may be learned from FIG. 7D that, in a process in which the offset increases from a small value to a large value, when the offset is a specified value (11 ms shown in FIG. 7D), the response delay of the mobile phone is the smallest. In this embodiment of this application, the electronic device may perform S1001 and S1002 to determine the delay time (denoted as delay time a) corresponding to the maximum delay gain value from the preset time set. Then, the electronic device may adjust the delay time of the vertical synchronization signal 1 and the vertical synchronization signal 2 relative to the vertical synchronization signal 3, so that the vertical synchronization signal 1 and the vertical synchronization signal 2 are later than the vertical synchronization signal 3 by the delay time a in one synchronization period. In this way, the response delay of the electronic device can be shortened to a maximum degree, and the fluency of the electronic device can be improved.

Figure 11A:
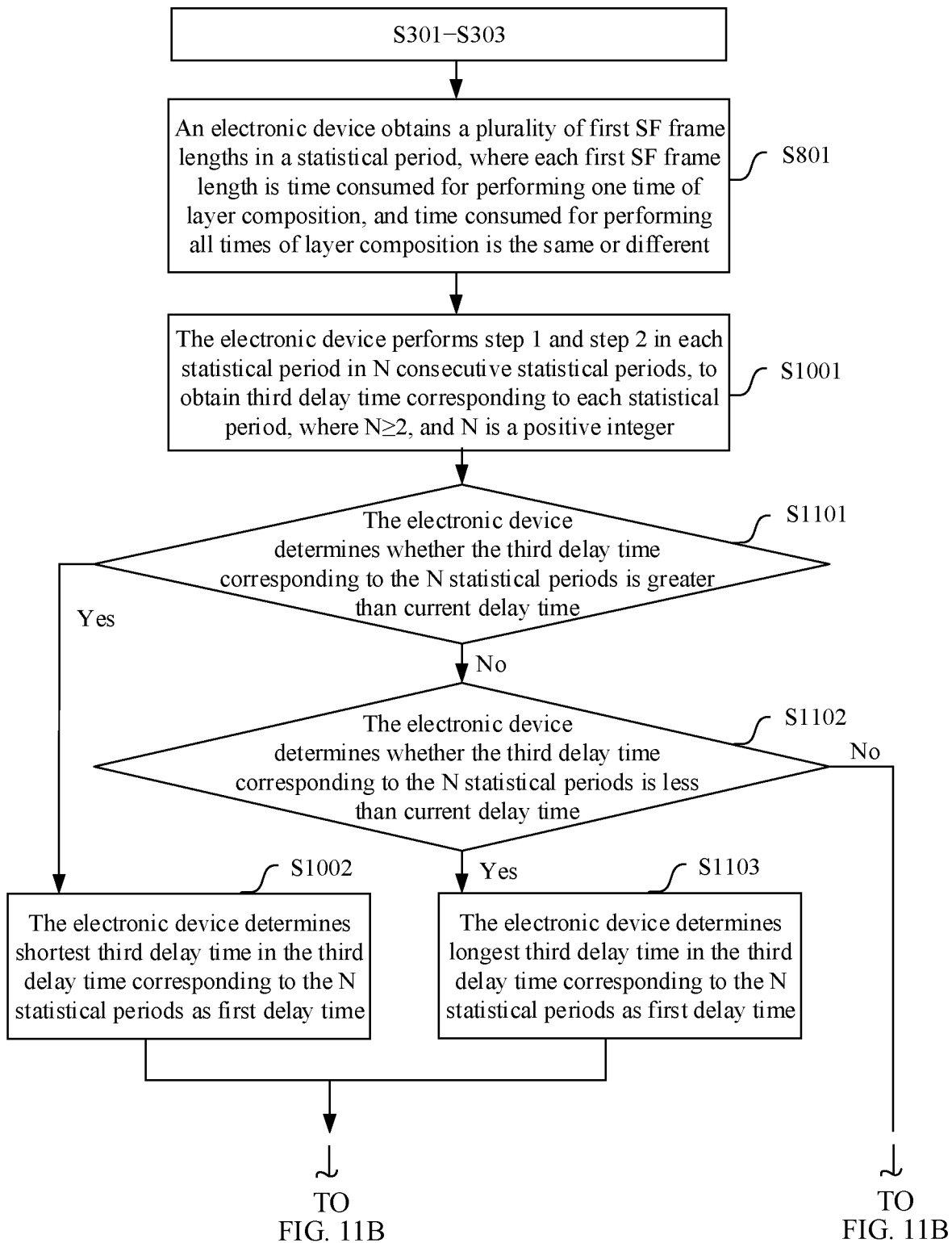
FIG. 11A and FIG. 11B are a flowchart of a control method based on a vertical synchronization signal according to an embodiment of this application.
Figure 11B:
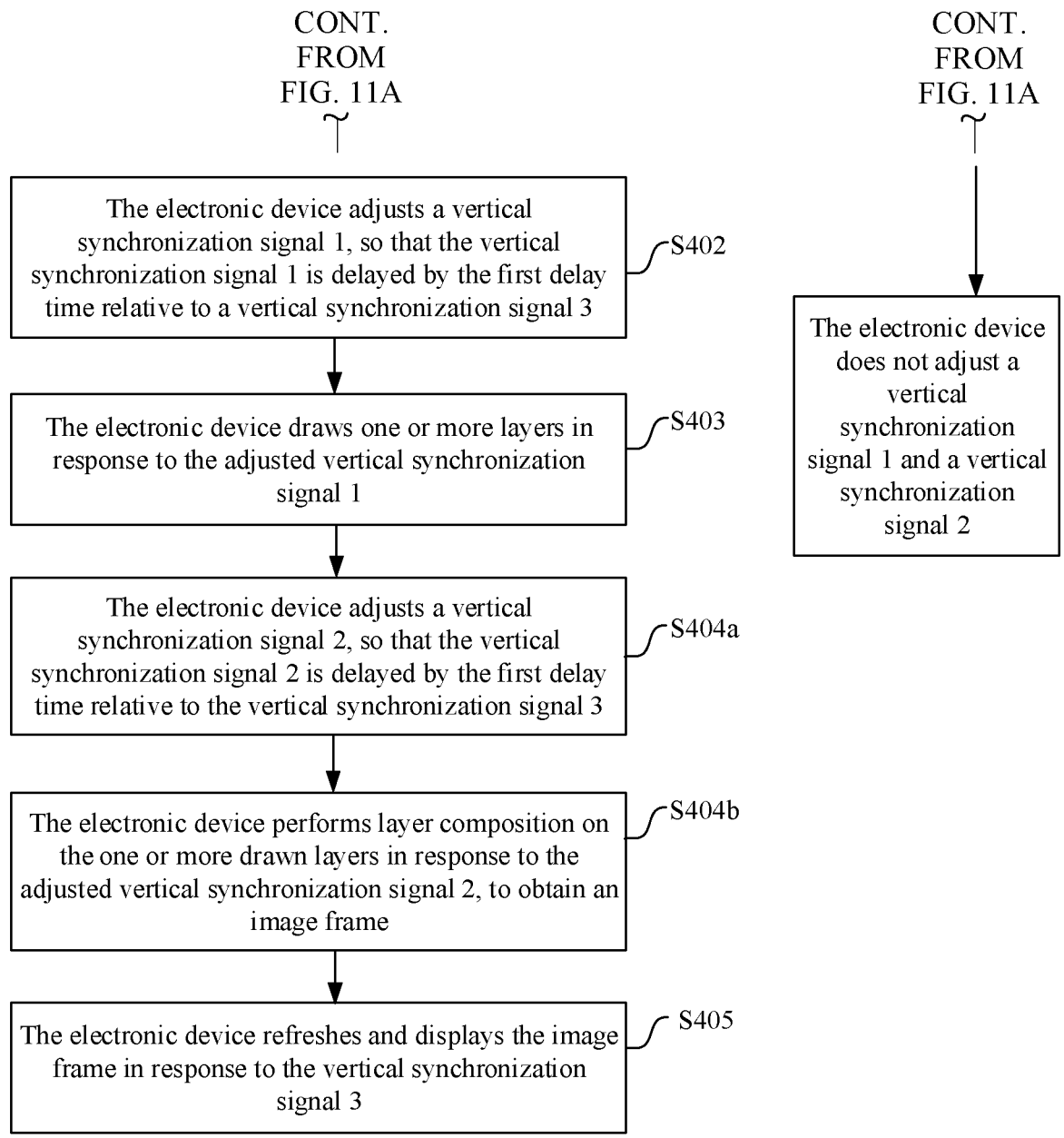

Further, as shown in FIG. 11A, before S1002 shown in FIG. 10, the method in this embodiment of this application may further include S1101. As shown in FIG. 11A, the method in this embodiment of this application may further include S1101, S1102, and S1103.

S1101. The electronic device determines whether the third delay time corresponding to the N statistical periods is greater than the current delay time.

It may be understood that if the delay time of the vertical synchronization signal 1 and the vertical synchronization signal 2 relative to the vertical synchronization signal 3 is greater than the current delay time, an image frame is lost. Therefore, if the third delay time corresponding to the N statistical periods is all greater than the current delay time $T_{Offset\_D}$, to reduce a frame loss possibility of the image frame, the electronic device may determine the shortest third delay time in the third delay time corresponding to the N statistical periods as the first delay time, to adjust the delay time of the vertical synchronization signal 1 and the vertical synchronization signal 2 relative to the vertical synchronization signal 3. In other words, the electronic device may perform S1002.

That at least one piece of third delay time in the third delay time corresponding to the N statistical periods is less than the current delay time may include the following two cases. In Case (1), the third delay time corresponding to the N statistical periods is all less than the current delay time. In Case (2), the third delay time corresponding to the N statistical periods is partially less than the current delay time. In the two cases, the electronic device may adjust the delay time of the vertical synchronization signal 1 and the vertical synchronization signal 2 relative to the vertical synchronization signal 3 by using different delay time. In this way, if the at least one piece of third delay time in the third delay time corresponding to the N statistical periods is less than the current delay time, the electronic device may perform S1102.

S1102. The electronic device determines whether the third delay time corresponding to the N statistical periods is less than the current delay time.

It may be understood that, when the third delay time corresponding to the N statistical periods is all less than the current delay time, to shorten the response delay of the electronic device to a maximum degree when it is ensured that the electronic device normally displays a picture, the electronic device may adjust the delay time of the vertical synchronization signal 1 and the vertical synchronization signal 2 relative to the vertical synchronization signal 3 by using longest third delay time in the third delay time corresponding to the N statistical periods. In other words, the electronic device may perform S1103 to determine the longest third delay time in the third delay time corresponding to the N statistical periods as the first delay time.

If a part of third delay time in the third delay time corresponding to the N statistical periods is greater than the current delay time, and the other part of third delay time is less than the current delay time, to avoid a ping-pong phenomenon of delay time adjustment, the electronic device does not adjust the delay time of the vertical synchronization signal 1 and the vertical synchronization signal 2 relative to the vertical synchronization signal 3 in a next statistical period of the N statistical periods.

S1103. The electronic device determines the longest third delay time in the third delay time corresponding to the N statistical periods as the first delay time.

For example, N=5. It is assumed that in the five statistical periods, third delay time corresponding to the first statistical period is 6 ms, third delay time corresponding to the second statistical period is 7.5 ms, third delay time corresponding to the third statistical period is 6.5 ms, third delay time corresponding to the second statistical period is 6.6 ms, third delay time corresponding to the fourth statistical period is 7 ms, third delay time corresponding to the fourth statistical period is 8 ms, and the current delay time is 8.5 ms. In this case, the electronic device may determine that the first delay time is 8 ms.

In this embodiment of this application, if the third delay time corresponding to the N statistical periods is all greater than the current delay time, the electronic device may determine the shortest third delay time in the third delay time corresponding to the N statistical periods as the first delay time, to adjust the delay time of the vertical synchronization signal 1 and the vertical synchronization signal 2 relative to the vertical synchronization signal 3. In this way, the frame loss possibility of the image frame can be reduced. Therefore, the response delay of the electronic device can be shortened to a maximum degree and the fluency of the electronic device can be improved when it is ensured that the LCD of the electronic device normally displays a picture.

If the third delay time corresponding to the N statistical periods is all less than the current delay time, the electronic device may use the longest third delay time in the third delay time corresponding to the N statistical periods as the first delay time, to adjust the delay time of the vertical synchronization signal 1 and the vertical synchronization signal 2 relative to the vertical synchronization signal 3. Therefore, the response delay of the electronic device can be shortened to a maximum degree and the fluency of the electronic device can be improved when it is ensured that the electronic device normally displays a picture.

Figure 12A:
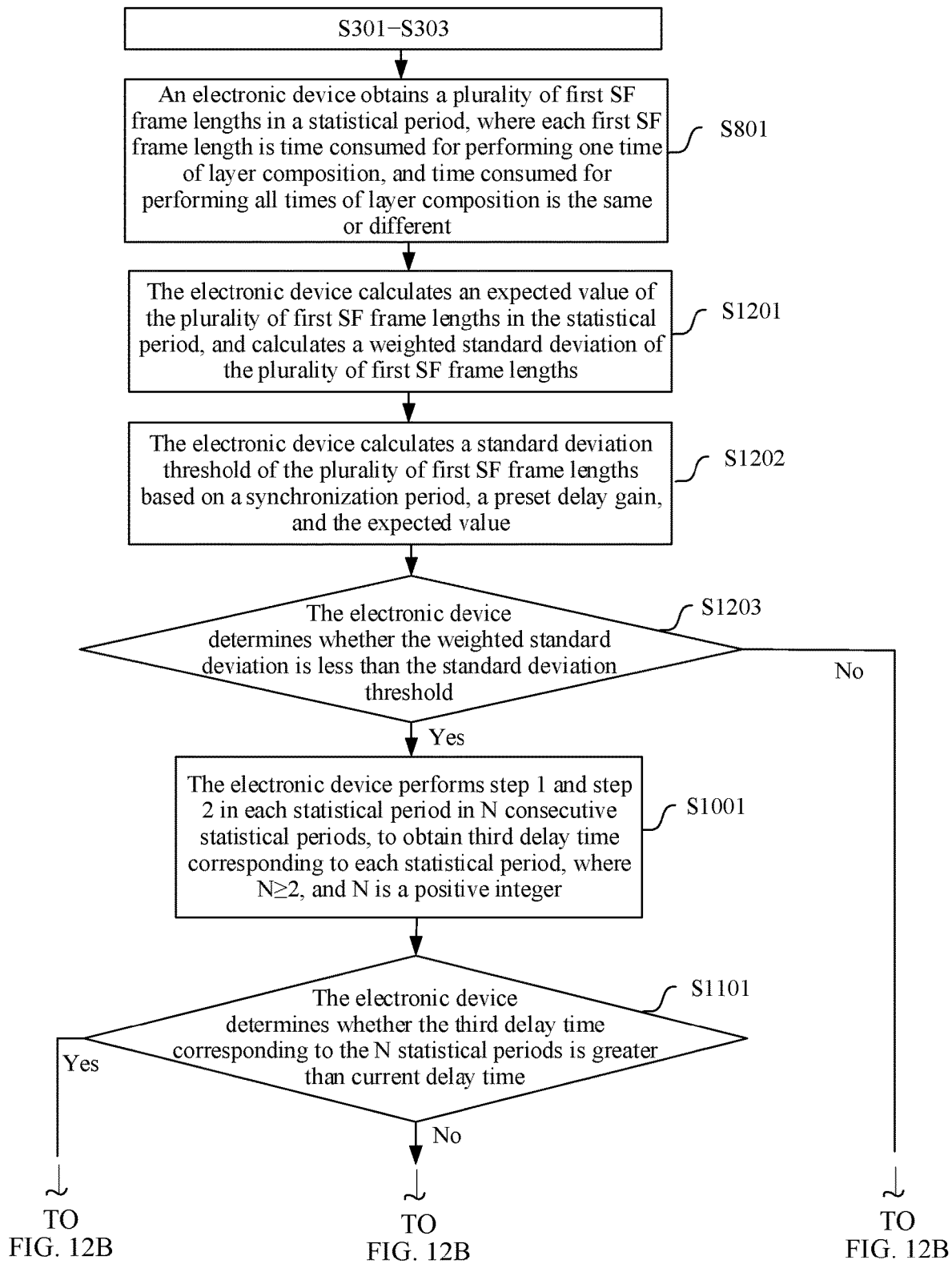
FIG. 12A and FIG. 12B are a flowchart of a control method based on a vertical synchronization signal according to an embodiment of this application.
Figure 12B:
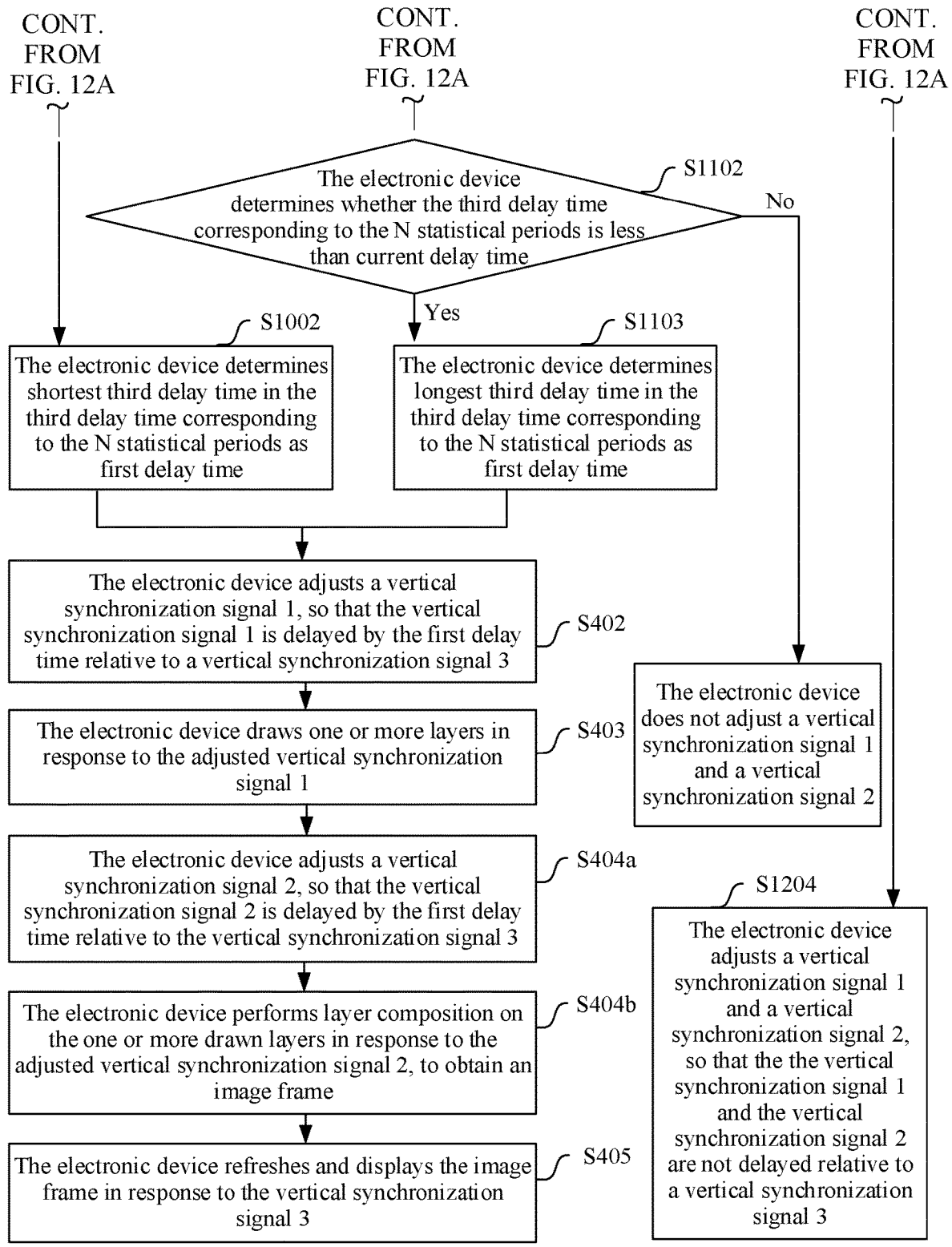

It may be understood that SF frame lengths in some statistical periods may fluctuate greatly, and SF frame lengths in a next statistical period of the statistical period may also fluctuate greatly. Therefore, a change amplitude of first delay time in the statistical period may be greater than a change amplitude of first delay time in another statistical period. In some embodiments, to ensure stability of an amplitude of the first delay time used when the electronic device adjusts the delay time of the vertical synchronization signal 1 and the vertical synchronization signal 2 relative to the vertical synchronization signal 3, the electronic device may determine the first delay time based on a related parameter in a statistical period only when changes of a plurality of SF frame lengths (namely, first SF frame lengths) in the statistical period are relatively stable. Specifically, before S802 (for example, S901 or step 1 in S1001), the method in this embodiment of this application may further include S1201 to S1204. For example, as shown in FIG. 12A and FIG. 12B, before S1001 shown in FIG. 11A, the method in this embodiment of this application may further include S1201 to S1204.

S1201. The electronic device calculates an expected value of the plurality of first SF frame lengths in the statistical period, and calculates a weighted standard deviation of the plurality of first SF frame lengths.

Before S1201, the electronic device performs S801 to obtain the plurality of first SF frame lengths in the statistical period. The expected value of the plurality of first SF frame lengths is an average value of the plurality of first SF frame lengths. For example, it is assumed that the electronic device performs five times of layer composition in a statistical period. SF frame lengths (namely, first SF frame lengths) corresponding to the five times of layer composition are respectively 12 ms, 13 ms, 10 ms, 11 ms, and 12 ms. In this case, an expected value µ of the five first SF frame lengths is (12+13+10+11+12)/5=11.6 ms.

For example, a method for calculating, by the electronic device, a weighted standard deviation of a plurality of first SF frame lengths in a statistical period may include S01 and S02.

S01. The electronic device calculates a standard deviation σ of the plurality of first SF frame lengths in the statistical period.

The electronic device may calculate a standard deviation σ of M first SF frame lengths based on the M first SF frame lengths in the statistical period and an expected value µ of the M first SF frame lengths by using the following formula (2):

$$\sigma = \sqrt{\sum_{i=1}^{M} \frac{(SF_i - \mu)^2}{M}} \qquad \text{formula (2)}$$

M≥2, M is a positive integer, and $SF_i$ is an $i^{th}$ first SF frame length in the M first SF frame lengths.

S02. The electronic device calculates a weighted standard deviation $\sigma_{JQ}$ based on the standard deviation σ, a standard deviation $\sigma_S$ in a previous statistical period of the statistical period, and a preset weighted value a by using the following formula (3):

$$\sigma_{JQ}=a*\sigma\pm(1-a)*\sigma_S \qquad \text{formula (3)}$$

For example, the preset weighted value a may be 70%, 60%, 65%, 80%, 85%, or the like.

It may be understood that a standard deviation of a group of data may reflect fluctuation of the group of data. In this case, a standard deviation σ of a plurality of first SF frame lengths in a statistical period may reflect fluctuation of the plurality of first SF frame lengths in the statistical period. The weighted standard deviation $\sigma_{JQ}$ of the plurality of first SF frame lengths in the statistical period may reflect fluctuation of the plurality of first SF frame lengths in the statistical period, and may also reflect a difference between fluctuation of the plurality of first SF frame lengths in the statistical period and fluctuation of a plurality of first SF frame lengths in the previous statistical period.

S1202. The electronic device calculates a standard deviation threshold of the plurality of first SF frame lengths based on the synchronization period, a preset delay gain value, and the expected value.

When a gain obtained by shortening the response delay is the preset delay gain value S, the SF frame length may be $T_Z-T_M-S$. It may be learned from the "3σ" rule of normal distribution that an interval (µ−3σ, µ+3σ) may be considered as an interval of an actual possible value of a random variable SF (namely, an SF frame length). It may be learned from SFE (µ−3σ, µ+3σ) that SF<µ+3σ. In this case, the standard deviation threshold in this embodiment of this application may be based on σ<(SF−µ)/3, that is, σ<($T_Z$−S−µ)/3. It may be learned that the standard deviation threshold of the plurality of first SF frame lengths may be ($T_Z$−S−µ)/3.

In other words, in this embodiment of this application, the electronic device may calculate the standard deviation threshold $\sigma_M$ of the plurality of first SF frame lengths based on the synchronization period $T_Z$, the preset delay gain value S, and the expected value µ by using the following formula (4):

$$\sigma_M=(T_Z-S-\mu)/3 \qquad \text{formula (4)}$$

S1203. The electronic device determines whether the weighted standard deviation is less than the standard deviation threshold.

It may be learned from the foregoing descriptions that a weighted threshold $\sigma_{JQ}$ of a plurality of first SF frame lengths in a statistical period needs to meet the following condition: $\sigma_{JQ}<\sigma_M$, that is, $\sigma_{JQ}<(T_Z-S-\mu)/3$.

Specifically, if the weighted standard deviation is less than the standard deviation threshold, the electronic device may perform S1001. If the weighted standard deviation is greater than or equal to the standard deviation threshold, the electronic device may perform S1204.

S1204. The electronic device adjusts the vertical synchronization signal 1 and the vertical synchronization signal 2, so that the vertical synchronization signal 1 and the vertical synchronization signal 2 are not delayed relative to the vertical synchronization signal 3.

It may be understood that if the weighted standard deviation is less than the standard deviation threshold, it indicates that SF frame lengths in a corresponding statistical period fluctuate slightly, and the electronic device may adjust the delay time of the vertical synchronization signal 1 and the vertical synchronization signal 2 relative to the vertical synchronization signal 3 based on a related parameter in the statistical period. If the weighted standard deviation is greater than or equal to the standard deviation threshold, it indicates that SF frame lengths in a corresponding statistical period fluctuate greatly, and the electronic device may start an exception protection mechanism, and adjust the delay time of the vertical synchronization signal 1 and the vertical synchronization signal 2 relative to the vertical synchronization signal 3, so that the vertical synchronization signal 3 and both the vertical synchronization signal 1 and the vertical synchronization signal 2 arrive simultaneously in one synchronization period.

In some embodiments, if a predicted SF frame length in each statistical period is greater than an SF frame length (namely, a first SF frame length) in the statistical period, an image frame may be lost. In this case, to prevent the image frame from being lost, the electronic device may perform S1204, so that the vertical synchronization signal 1 and the vertical synchronization signal 2 are not delayed relative to the vertical synchronization signal 3.

For example, after S402 and S404a, if a predicted SF frame length is less than or equal to a second SF frame length in a next statistical period, the electronic device may adjust the vertical synchronization signal 1 and the vertical synchronization signal 2, so that the vertical synchronization signal 1 and the vertical synchronization signal 2 are not delayed relative to the vertical synchronization signal 3. The predicted SF frame length is a difference between the synchronization period and the first delay time. The second SF frame length is time consumed for performing layer composition most recently in the next statistical period.

Optionally, after S1204, the electronic device may not adjust the vertical synchronization signal 1 and the vertical synchronization signal 2 within preset penalty time.

Embodiment 9

Figure 13:
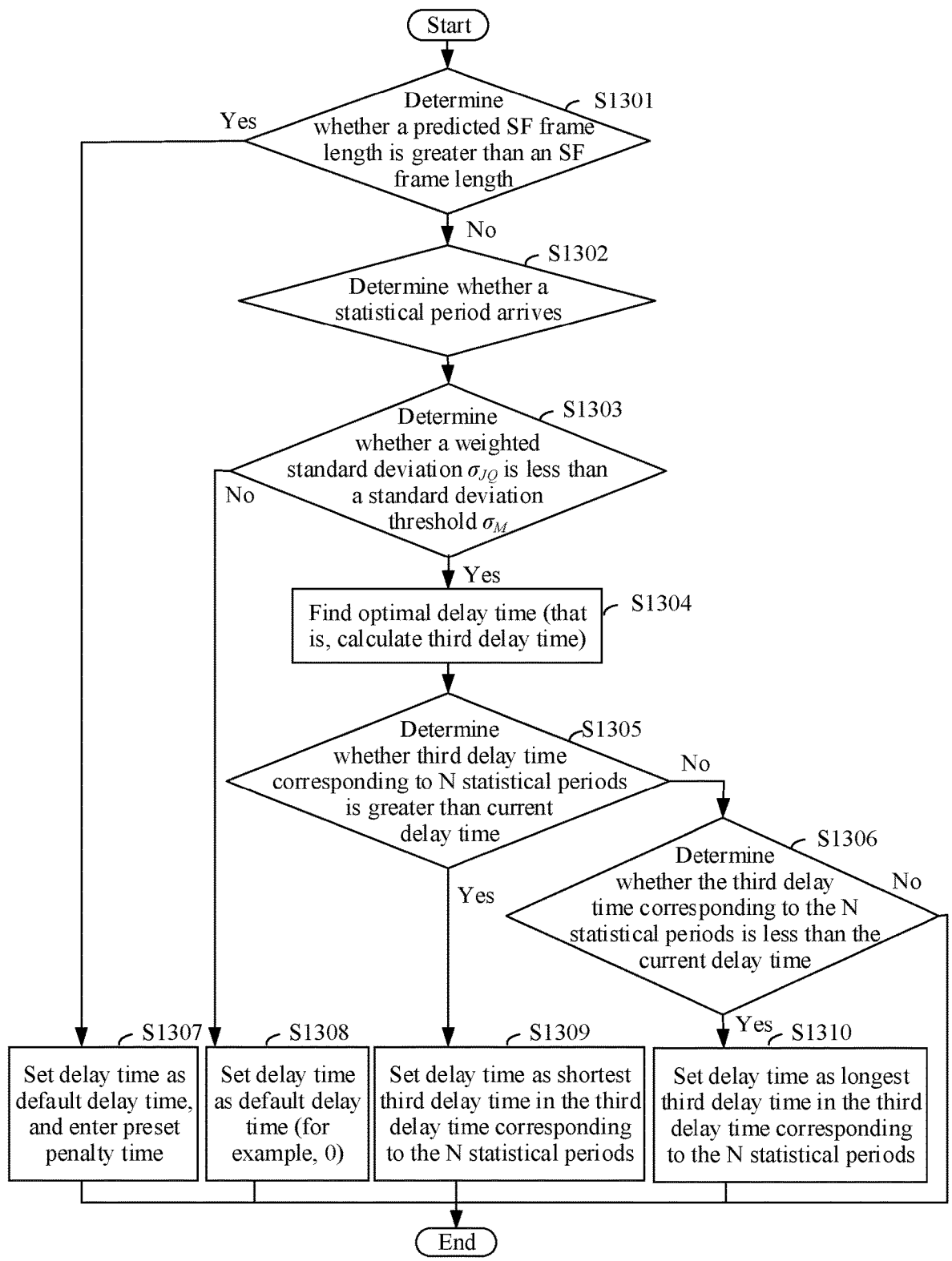
FIG. 13 is a flowchart of a control method based on a vertical synchronization signal according to an embodiment of this application.

FIG. 13 is a simplified flowchart of a control method based on a vertical synchronization signal according to an embodiment of this application.

As shown in FIG. 13, after each statistical period starts, an electronic device may successively determine whether a predicted SF frame length in a previous statistical period is greater than all SF frame lengths in a current statistical period (that is, perform S1301). If the predicted SF frame length is greater than any SF frame length in the current statistical period, the electronic device performs S1307. For detailed descriptions of S1307, refer to related descriptions of S1204 and the foregoing embodiments. Details are not described herein again. If the predicted SF frame length is less than or equal to the SF frame length, the electronic device performs S1302 to determine whether the statistical period arrives. If the statistical period does not arrive, the electronic device continues to perform S1301 to determine whether the predicted SF frame length is greater than a next SF frame length in the current statistical period. If the statistical period arrives, the electronic device continues to perform S1303 to determine whether a weighted standard deviation $\sigma_{JQ}$ in the current statistical period is less than a standard deviation threshold $\sigma_M$. For detailed descriptions of S1303, refer to related descriptions of S1203. Details are not described herein again.

If the weighted standard deviation $\sigma_{JQ}$ is greater than or equal to the standard deviation threshold $\sigma_M$, the electronic device performs S1308. For detailed descriptions of S1308, refer to related descriptions of S1204. Details are not described herein again. If the weighted standard deviation $\sigma_{JQ}$ is less than the standard deviation threshold $\sigma_M$, the electronic device performs S1304. For detailed descriptions of S1304, refer to related descriptions of S1001. Details are not described herein again.

After performing S1304, the electronic device may perform S1305 to determine whether third delay time corresponding to N statistical periods is greater than current delay time. For detailed descriptions of S1305, refer to related descriptions of S1101. Details are not described herein again.

If the third delay time corresponding to the N statistical periods is all greater than the current delay time, the electronic device performs S1309. For detailed descriptions of S1309, refer to related descriptions of S1002. Details are not described herein again. If at least one piece of third delay time in the third delay time corresponding to the N statistical periods is less than or equal to the current delay time, the electronic device performs S1306 to determine whether the third delay time corresponding to the N statistical periods is less than the current delay time. For detailed descriptions of S1306, refer to related descriptions of S1102. Details are not described herein again.

If the third delay time corresponding to the N statistical periods is all less than the current delay time, the electronic device performs S1310. For detailed descriptions of S1310, refer to related descriptions of S1103. Details are not described herein again. If a part of third delay time in the third delay time corresponding to the N statistical periods is less than the current delay time, and the other part of third delay time is greater than the current delay time, the electronic device does not adjust a vertical synchronization signal. In this case, a vertical synchronization signal adjustment procedure ends.

Embodiment 10

Figure 14:
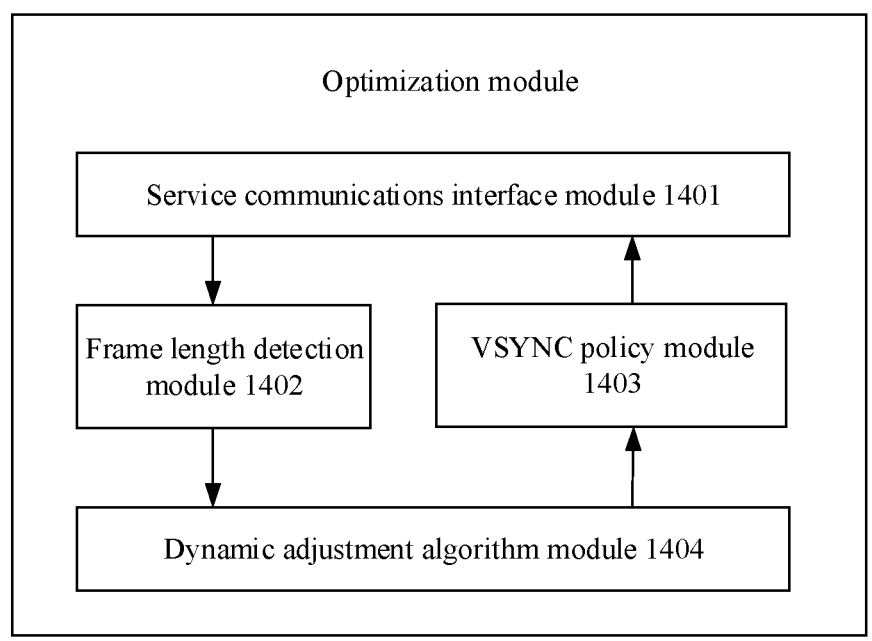
FIG. 14 is a schematic diagram of an optimization module according to an embodiment of this application.

FIG. 14 is a schematic diagram of an optimization module according to an embodiment of this application. The optimization module may be a functional module that is in a vertical synchronization signal adjustment apparatus or an electronic device and that is configured to implement the method in the embodiments of this application. As shown in FIG. 14, the optimization module may include a service communications interface module 1401, a frame length detection module 1402, a VSYNC policy module 1403, and a dynamic adjustment algorithm module 1404.

The frame length detection module 1402 is configured to: obtain a plurality of first SF frame lengths in a statistical period, and transmit the plurality of obtained first SF frame lengths to the dynamic adjustment algorithm module 1404. The frame length detection module 1402 may obtain the plurality of first SF frame lengths in the statistical period by using the service communications interface module 1401. For example, the frame length detection module 1402 is configured to support the electronic device in performing S801 in the foregoing method embodiments, or is configured to perform another technical process described in this specification.

The dynamic adjustment algorithm module 1404 is configured to: calculate first delay time, and transmit the calculated first delay time to the VSYNC policy module 1403. For example, the dynamic adjustment algorithm module 1404 is configured to support the electronic device in performing S401, S802, S802a, S802b, S901, S902, S1001, S1002, and S1201 to S1203 in the foregoing method embodiments, or is configured to perform another technical process described in this specification.

The VSYNC policy module 1403 is configured to adjust a vertical synchronization signal (for example, adjust a vertical synchronization signal 1 and/or a vertical synchronization signal 2, or adjust a vertical synchronization signal 3), so that the vertical synchronization signal 1 and the vertical synchronization signal 2 are not delayed relative to the vertical synchronization signal 3. The VSYNC policy module 1403 may send a control signal to a hardware display module 50 by using the service communications interface module 1401, to adjust the vertical synchronization signal. For example, the VSYNC policy module 1403 is configured to support the electronic device in performing S402, S404a, S1101, S1102, S1103, and S1204 in the foregoing method embodiments, or is configured to perform another technical process described in this specification.

Figure 15:
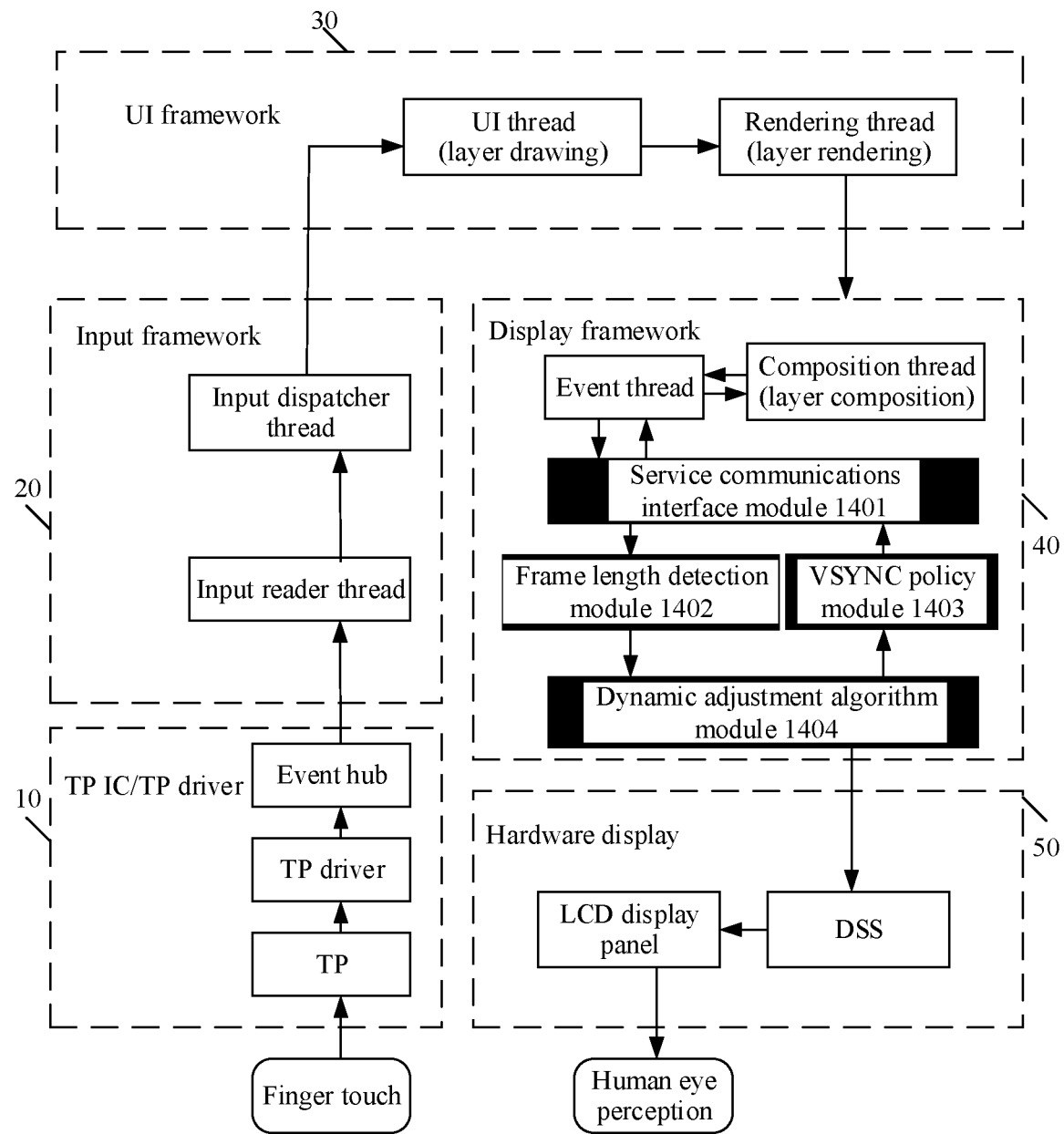
FIG. 15 is a schematic diagram of another software processing procedure in which an electronic device displays an image in response to a touch operation according to an embodiment of this application.

The optimization module may be implemented in the display framework 40 shown in FIG. 1A. For example, as shown in FIG. 15, the display framework 40 may include the service communications interface module 1401, the frame length detection module 1402, the VSYNC policy module 1403, and the dynamic adjustment algorithm module 1404. The service communications interface module 1401 may communicate with a composition thread (for example, doComposer) by using an event thread.

Embodiment 11

Figure 16:
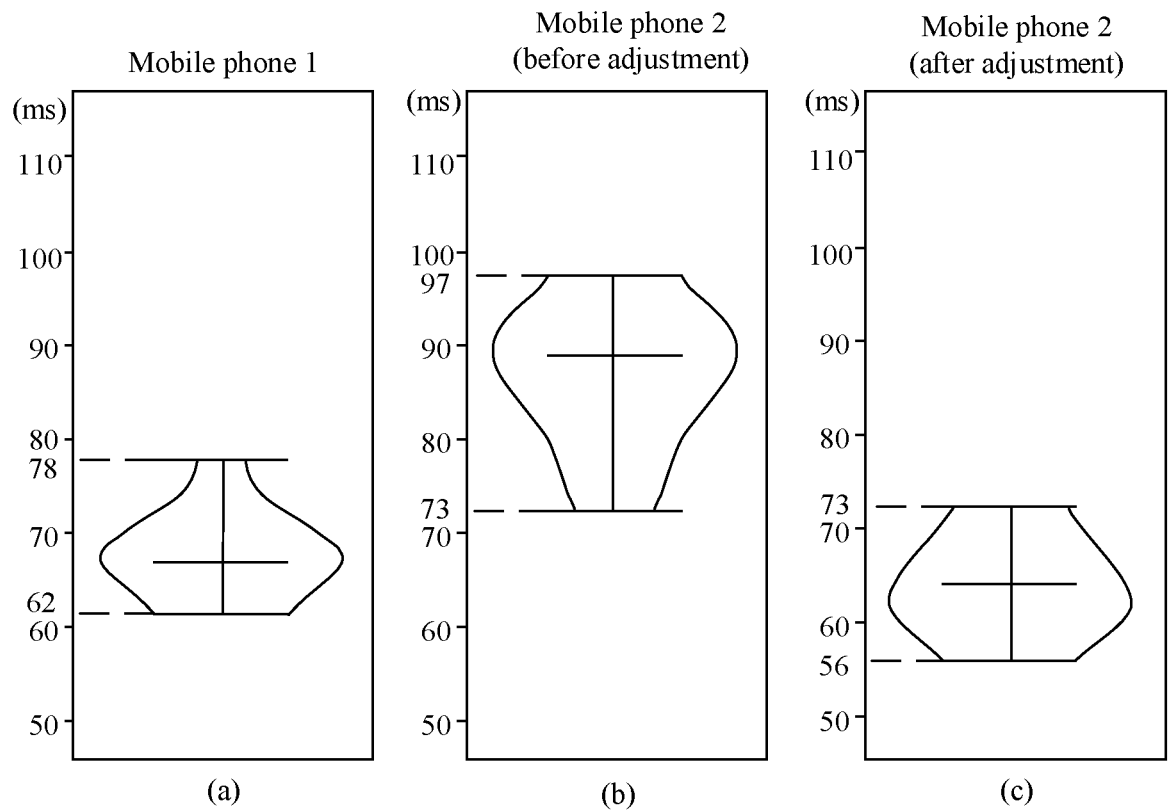
FIG. 16 is a schematic diagram of a test result in a test scenario according to an embodiment of this application.

FIG. 16 is a schematic diagram of test results of mobile phones of two brands in a sliding test scenario of a "Weibo" application when a robot hand speed is 600 millimeters (mm) per second.

A test result of a mobile phone 1 (a mobile phone such as an iPhone XS) of a brand in the sliding test scenario of the "Weibo" application when the robot hand speed is 600 mm/s is shown in (a) in FIG. 16. As shown in (a) in FIG. 16, touch response time of the mobile phone 1 is 62 ms to 78 ms.

A test result of a mobile phone 2 (such as a Huawei mobile phone) of another brand in the sliding test scenario of the "Weibo" application when the robot hand speed is 600 mm/s and before the method in the embodiments of this application is performed is shown in (b) in FIG. 16. As shown in (b) in FIG. 16, before the method in the embodiments of this application is performed, touch response time of the mobile phone 2 is 73 ms to 97 ms.

A test result of the mobile phone 2 in the sliding test scenario of the "Weibo" application when the robot hand speed is 600 min/s and after the method in the embodiments of this application is performed is shown in (c) in FIG. 16. As shown in (c) in FIG. 16, before the method in the embodiments of this application is performed, touch response time of the mobile phone 2 is 56 ms to 73 ms.

It may be learned through comparison between (c) in FIG. 16 and (b) in FIG. 16 that, when test is performed in a same test scenario by using a same robot hand speed (such as 600 mm/s), the touch response time of the mobile phone 2 after the method in the embodiments of this application is performed (briefly referred to as "touch response time-after", for example, 56 ms to 73 ms) is shorter than the touch response time of the mobile phone 2 before the method in the embodiments of this application (briefly referred to as "touch response time-before", for example, 73 ms to 97 ms). In other words, in the method in the embodiments of this application, a response delay of the electronic device can be shortened, and fluency of the electronic device can be improved.

It may be learned through comparison between (a) in FIG. 16 and (b) in FIG. 16 that, when test is performed in a same test scenario by using a same robot hand speed (such as 600 mm/s), the foregoing "touch response time-before" (for example, 73 ms to 97 ms) is longer than the touch response time (for example, 62 ms to 78 ms) of the mobile phone 1.

It may be learned through comparison between (a) in FIG. 16, (b) in FIG. 16, and (c) in FIG. 16 that, when test is performed in a same test scenario by using a same robot hand speed (such as 600 mm/s), the foregoing "touch response time-after" (for example, 56 ms to 73 ms) is shorter than the foregoing "touch response time-before" (for example, 73 ms to 97 ms), and is also shorter than the touch response time (for example, 62 ms to 78 ms) of the mobile phone 1.

It may be learned from the foregoing test scenario that, in the method in the embodiments of this application, a response delay of the electronic device can be shortened greatly, and fluency of the electronic device can be improved.

Embodiment 12

Some embodiments of this application provide an electronic device, and the electronic device may include a display screen (such as a touchscreen), a memory, and one or more processors. The display screen, the memory, and the processor are coupled. The memory is configured to store computer program code, and the computer program code includes computer instructions. When the processor executes the computer instructions, the electronic device may perform the functions or the steps performed by the electronic device in the foregoing method embodiments. For a structure of the electronic device, refer to the structure of the electronic device 200 shown in FIG. 2.

Figure 17:
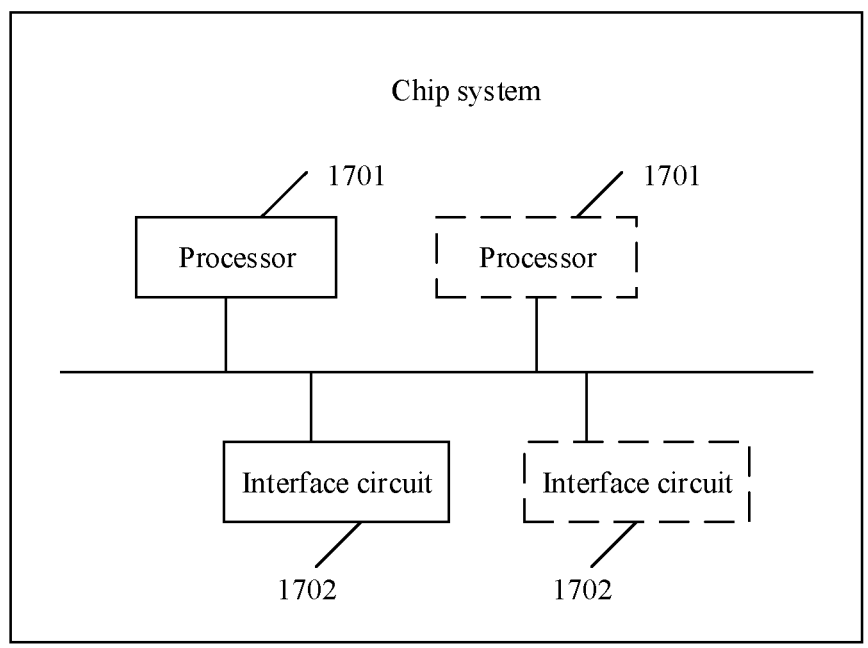
FIG. 17 is a schematic structural diagram of a chip system according to an embodiment of this application.

An embodiment of this application further provides a chip system. As shown in FIG. 17, the chip system includes at least one processor 1701 and at least one interface circuit 1702. The processor 1701 and the interface circuit 1702 may be interconnected by using a line. For example, the interface circuit 1702 may be configured to receive a signal from another apparatus (for example, a memory of an electronic device). For another example, the interface circuit 1702 may be configured to send a signal to another apparatus (for example, the processor 1701 or a touchscreen of an electronic device). For example, the interface circuit 1702 may read instructions stored in the memory, and send the instructions to the processor 1701. When the instructions are executed by the processor 1701, the electronic device may be enabled to perform the steps in the foregoing embodiments. Certainly, the chip system may further include another discrete component. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or the steps performed by the electronic device in the foregoing method embodiments.

An embodiment of this application further provides a computer program product. When the computer program product is run on a computer, the computer is enabled to perform the functions or the steps performed by the electronic device in the foregoing method embodiments.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A control method based on a vertical synchronization signal, wherein the method is applied to an electronic device comprising a display screen, and the method comprises:
    drawing, by the electronic device, one or more layers in response to a first vertical synchronization signal;
    refreshing and displaying, by the electronic device, an image frame in response to a second vertical synchronization signal, wherein the first vertical synchronization signal is on a same frequency as the second vertical synchronization signal;
    adjusting, by the electronic device, the first vertical synchronization signal, so that the adjusted first vertical synchronization signal is delayed by a first delay time relative to the second vertical synchronization signal;
    drawing, by the electronic device, one or more layers in response to the adjusted first vertical synchronization signal;
    performing, by the electronic device, layer composition on one or more drawn layers in response to a third vertical synchronization signal, to obtain an image frame;
    adjusting, by the electronic device, the third vertical synchronization signal, so that the adjusted third vertical synchronization signal is delayed by a second delay time relative to the second vertical synchronization signal, wherein the third vertical synchronization signal is on a same frequency as the second vertical synchronization signal; and
    performing, by the electronic device, layer composition on one or more drawn layers in response to the adjusted third vertical synchronization signal, to obtain an image frame.

2. The method according to claim 1, wherein the first delay time is less than a signal period of the second vertical synchronization signal.

3. The method according to claim 1, wherein the drawing, by the electronic device, one or more layers in response to the adjusted first vertical synchronization signal comprises:
    performing, by the electronic device, interpolation calculation in response to the adjusted first vertical synchronization signal, to obtain a resample point; and
    drawing, by the electronic device, the one or more layers for the resample point.

4. The method according to claim 1, wherein the drawing, by the electronic device, one or more layers in response to the first vertical synchronization signal comprises:
    when detecting a user operation or detecting that a user interface (UI) event occurs in the electronic device, drawing, by the electronic device, the one or more layers in response to the first vertical synchronization signal.

5. The method according to claim 1, wherein the one or more layers comprise a layer drawn by the electronic device by executing a drawing task corresponding to one or more applications, the one or more applications comprise at least one of one or more system-level applications and one or more user-level applications, and the system-level application comprises a status bar, a launcher, a navigation bar, and a wallpaper.

6. The method according to claim 1, wherein the second delay time is equal to the first delay time.

7. The method according to claim 1, wherein the first delay time is preset duration.

8. The method according to claim 1, wherein before the adjusting, by the electronic device, the first vertical synchronization signal, so that the adjusted first vertical synchronization signal is delayed by the first delay time relative to the second vertical synchronization signal, the method further comprises:
    determining, by the electronic device, a third surface flinger (SF) frame length in a statistical period based on a plurality of first SF frame lengths in the statistical period; and
    determining, by the electronic device, that the third SF frame length is less than a preset frame length threshold, wherein the third SF frame length is an average value of the plurality of first SF frame lengths or a maximum value in the plurality of first SF frame lengths.

9. The method according to claim 1, wherein before the adjusting, by the electronic device, the first vertical synchronization signal, so that the adjusted first vertical synchronization signal is delayed by the first delay time relative to the second vertical synchronization signal, the method further comprises:
    calculating, by the electronic device, an expected value of a plurality of first SF frame lengths in a statistical period, and calculating a weighted standard deviation of the plurality of first SF frame lengths, wherein the weighted standard deviation of the plurality of first SF frame lengths is used to represent fluctuation of the plurality of first SF frame lengths;
    calculating, by the electronic device, a standard deviation threshold of the plurality of first SF frame lengths based on the signal period of the second vertical synchronization signal, a preset delay gain value, and the expected value; and determining, by the electronic device, that the weighted standard deviation of the plurality of first SF frame lengths is less than the standard deviation threshold.

10. The method according to claim 1, wherein the method further comprises:
determining, by the electronic device, the first delay time based on a foreground application, wherein the foreground application is an application corresponding to an interface currently displayed on the display screen, and the foreground application is a user-level application.

11. The method according to claim 8, wherein the method further comprises:
determining, by the electronic device, the first delay time based on the plurality of first SF frame lengths in the statistical period, wherein each first SF frame length in the plurality of first SF frame lengths is time consumed for performing one time of layer composition, and time consumed for performing all times of layer composition is the same or different.

12. An electronic device, wherein the electronic device comprises a touchscreen, a non-transitory computer storage medium, and one or more processors, the touchscreen, the non-transitory computer storage medium, and the one or more processors are coupled, the non-transitory computer storage medium is configured to store computer program code, the computer program code comprises computer instructions, and when the processor executes the computer instructions, the electronic device is configured to perform the following method:
drawing, by the electronic device, one or more layers in response to a first vertical synchronization signal;
refreshing and displaying, by the electronic device, an image frame in response to a second vertical synchronization signal, wherein the first vertical synchronization signal is on a same frequency as the second vertical synchronization signal;
adjusting, by the electronic device, the first vertical synchronization signal, so that the adjusted first vertical synchronization signal is delayed by a first delay time relative to the second vertical synchronization signal;
drawing, by the electronic device, one or more layers in response to the adjusted first vertical synchronization signal;
performing, by the electronic device, layer composition on one or more drawn layers in response to a third vertical synchronization signal, to obtain an image frame;
adjusting, by the electronic device, the third vertical synchronization signal, so that the adjusted third vertical synchronization signal is delayed by a second delay time relative to the second vertical synchronization signal, wherein the third vertical synchronization signal is on a same frequency as the second vertical synchronization signal; and
performing, by the electronic device, layer composition on one or more drawn layers in response to the adjusted third vertical synchronization signal, to obtain an image frame.

13. A non-transitory computer storage medium comprising computer instructions, wherein when the computer instructions are run on a computer, the computer is configured to perform the following method:
drawing, by the electronic device, one or more layers in response to a first vertical synchronization signal;
refreshing and displaying, by the electronic device, an image frame in response to a second vertical synchronization signal, wherein the first vertical synchronization signal is on a same frequency as the second vertical synchronization signal;
adjusting, by the electronic device, the first vertical synchronization signal, so that the adjusted first vertical synchronization signal is delayed by a first delay time relative to the second vertical synchronization signal;
drawing, by the electronic device, one or more layers in response to the adjusted first vertical synchronization signal;
performing, by the electronic device, layer composition on one or more drawn layers in response to a third vertical synchronization signal, to obtain an image frame;
adjusting, by the electronic device, the third vertical synchronization signal, so that the adjusted third vertical synchronization signal is delayed by a second delay time relative to the second vertical synchronization signal, wherein the third vertical synchronization signal is on a same frequency as the second vertical synchronization signal; and
performing, by the electronic device, layer composition on one or more drawn layers in response to the adjusted third vertical synchronization signal, to obtain an image frame.

* * * * *